United States Patent [19]
Kaplan

[11] Patent Number: 5,963,916
[45] Date of Patent: *Oct. 5, 1999

[54] NETWORK APPARATUS AND METHOD FOR PREVIEW OF MUSIC PRODUCTS AND COMPILATION OF MARKET DATA

[75] Inventor: Joshua D. Kaplan, Berkeley, Calif.

[73] Assignee: Intouch Group, Inc., San Francisco, Calif.

[*] Notice: This patent is subject to a terminal disclaimer.

[21] Appl. No.: 08/741,915

[22] Filed: Oct. 31, 1996

Related U.S. Application Data

[63] Continuation-in-part of application No. 08/668,327, Jun. 26, 1996, abandoned, which is a continuation of application No. 08/282,153, Jul. 28, 1994, abandoned, which is a continuation of application No. 08/035,661, Mar. 23, 1993, abandoned, which is a continuation of application No. 07/957,444, Oct. 6, 1992, Pat. No. 5,237,157, which is a continuation of application No. 07/582,253, Sep. 13, 1990, abandoned.

[51] Int. Cl.⁶ .................................................. G06F 17/60
[52] U.S. Cl. .............................................................. 705/26
[58] Field of Search ............................. 235/462; 705/10, 705/26, 27

[56] References Cited

U.S. PATENT DOCUMENTS

| | | | |
|---|---|---|---|
| 3,648,385 | 3/1972 | Barlow et al. | 35/8 A |
| 3,659,030 | 4/1972 | Scott | 35/8 A |
| 3,689,930 | 9/1972 | Strickland | 346/1 |
| 3,702,302 | 11/1972 | Wilson | 252/70 |
| 3,718,906 | 2/1973 | Lightner | 235/381 |
| 3,724,100 | 4/1973 | Surel | 35/35 C |
| 3,775,864 | 12/1973 | Bisinger et al. | 35/9 A |
| 3,795,989 | 3/1974 | Greenberg et al. | 35/9 B |
| 3,886,671 | 6/1975 | Liu | 35/35 C |
| 3,913,443 | 10/1975 | Jewett | 84/1.28 |
| 3,947,972 | 4/1976 | Freeman | 35/8 A |
| 3,990,710 | 11/1976 | Hughes | 369/34 |
| 3,996,671 | 12/1976 | Foster | 35/8 A |
| 4,001,947 | 1/1977 | Kilby | 35/9 B |
| 4,027,405 | 6/1977 | Schloss | 35/35 C |

(List continued on next page.)

FOREIGN PATENT DOCUMENTS

| | | | |
|---|---|---|---|
| WO 95/17794 | 12/1994 | WIPO | H04N 5/76 |
| WO 95/24687 | 3/1995 | WIPO | G06F 17/60 |
| WO 95/29453 | 4/1995 | WIPO | G06F 17/60 |

OTHER PUBLICATIONS

De Groot, "New Media expo–interactive advertising & media expo," Newsbytes, Apr. 13, 1994.

"Internet Shopping Network launches Interactive Home Music Shopping Service with Intouch Group Inc. for Internet Users Worldwide," Business Wire, Apr. 11, 1995.

(List continued on next page.)

*Primary Examiner*—Emanuel Todd Voeltz
*Assistant Examiner*—Alexander Kalinowski
*Attorney, Agent, or Firm*—Dergosits & Noah LLP

[57] ABSTRACT

A system for on-line user-interactive multimedia based point-of-preview. The system provides for a network web site and accompanying software and hardware for allowing users to access the web site over a network such as the internet via a computer. The user is uniquely identified to the web site server through an identification name or number. The hardware associated with the web site includes storage of discrete increments of pre-selected portions of music products for user selection and preview. After user selection, a programmable data processor selects the particular prerecorded music product from data storage and then transmits that chosen music product over the network to the user for preview. Subscriber selection and profile data (i.e. demographic information) can optionally be collected and stored to develop market research data. Since the system provides for multiple embodiments, the system contemplates previewing of audio programs such as music on compact discs, video programs such as movies and text from books and other written documents. Furthermore, it is contemplated that the network web site can be accessed from a publicly accessible kiosk, available, e.g. at a retail store location, or from a desk top computer.

18 Claims, 82 Drawing Sheets

U.S. PATENT DOCUMENTS

| | | | |
|---|---|---|---|
| 4,245,404 | 1/1981 | Yoshinari | 434/312 |
| 4,359,631 | 11/1982 | Lockwood et al. | 235/381 |
| 4,380,438 | 4/1983 | Okamoto | 434/157 |
| 4,414,467 | 11/1983 | Gould et al. | 235/381 |
| 4,423,304 | 12/1983 | Satoh et al. | 369/32 |
| 4,464,124 | 8/1984 | Romero et al. | 434/321 |
| 4,484,328 | 11/1984 | Schlafly | 370/85 |
| 4,490,810 | 12/1984 | Hon | 364/900 |
| 4,495,608 | 1/1985 | Kimura et al. | 369/33 |
| 4,528,643 | 7/1985 | Freeny, Jr. | 364/900 |
| 4,552,535 | 11/1985 | Steffel | 434/315 |
| 4,674,055 | 6/1987 | Ogaki et al. | 364/410 |
| 4,723,212 | 2/1988 | Mindrum et al. | 364/401 |
| 4,749,354 | 6/1988 | Kerman | 434/321 |
| 4,766,581 | 8/1988 | Korn et al. | 235/381 |
| 4,780,599 | 10/1988 | Baus | 235/385 |
| 4,866,661 | 9/1989 | de Prins | 235/385 |
| 5,041,921 | 8/1991 | Scheffler | 360/13 |
| 5,047,614 | 9/1991 | Bianco | 235/385 |
| 5,237,157 | 8/1993 | Kaplan | 235/375 |
| 5,351,146 | 9/1994 | Chan et al. | 359/118 |
| 5,365,381 | 11/1994 | Scheffler | 360/15 |
| 5,369,571 | 11/1994 | Metts | 364/401 |
| 5,418,654 | 5/1995 | Scheffler | 360/13 |
| 5,418,713 | 5/1995 | Allen | 364/403 |
| 5,445,295 | 8/1995 | Brown | 221/3 |
| 5,459,306 | 10/1995 | Stein et al. | 235/383 |
| 5,465,213 | 11/1995 | Ross | 364/468 |
| 5,497,502 | 3/1996 | Castille | 455/5.1 |
| 5,499,019 | 3/1996 | Burgan et al. | 340/825.22 |
| 5,500,514 | 3/1996 | Veeneman et al. | 235/381 |
| 5,502,601 | 3/1996 | Scheffler | 360/32 |
| 5,504,675 | 4/1996 | Cragun et al. | 364/401 |
| 5,513,117 | 4/1996 | Small | 364/479 |
| 5,523,551 | 6/1996 | Scott | 235/381 |
| 5,539,635 | 7/1996 | Larson, Jr. | 364/401 R |
| 5,550,735 | 8/1996 | Slade et al. | 364/401 |
| 5,563,947 | 10/1996 | Kikinis | 380/4 |
| 5,569,082 | 10/1996 | Kaye | 463/17 |
| 5,576,951 | 11/1996 | Lockwood | 395/227 |
| 5,629,867 | 5/1997 | Goldman | 364/514 R |
| 5,664,111 | 9/1997 | Nahan et al. | 705/27 |
| 5,712,979 | 1/1998 | Graber et al. | 395/200 |

OTHER PUBLICATIONS

An article entitled "Got Cookies" from the Personal Technology section of the Mar. 11, 1997 edition of the San Francisco Chronicle.

Sony Auto Disc Loader CDK–006.

Digidesign Sound Tools.

TOPIX CD Premaster/Encoding System.

K. Hedlund, "CD–ROM," *Computer Reseller News* Mar. 21, 1988.

J. Rothfeder and J. Bartimo, "How Software is Making Food Sales a Piece of Cake," *Business Week* Jul. 2, 1990.

M. Bluestone, "Thanks to CDs, Listening Booths are Making a Comeback," *Business Week* May 9, 1988.

Virgin Records, Votan, Inc., Fremont, California.

D. Steinberg, "McKesson Data Kiosks Build Business for Its Customers," *PC Week* Mar. 3, 1988.

*Los Angeles Times,* "Automated Movie Ticket Machines Due".

Pollack, "A Credit Card Offshoot Blossoms," *New York Times* v:139 col. 3 pC1(N) pD1(N) Aug. 3, 1990.

Val J. Golding, *Telephone Software Connection, Inc.* May 1980.

C. Barney, "Business Software Moves Over Phones," *Electronics* Jul. 28, 1983.

J. Beckett, "Safeway to Let Customers Do Self–Checkout," *The San Francisco Chronicle.*

"Introduction to Personics: New Revenues for Artists, Songwriters, Publishers, Record Companies and Retailers," The Personics System.

"Executive Summary" PICS Preview from *The Retail Network.*

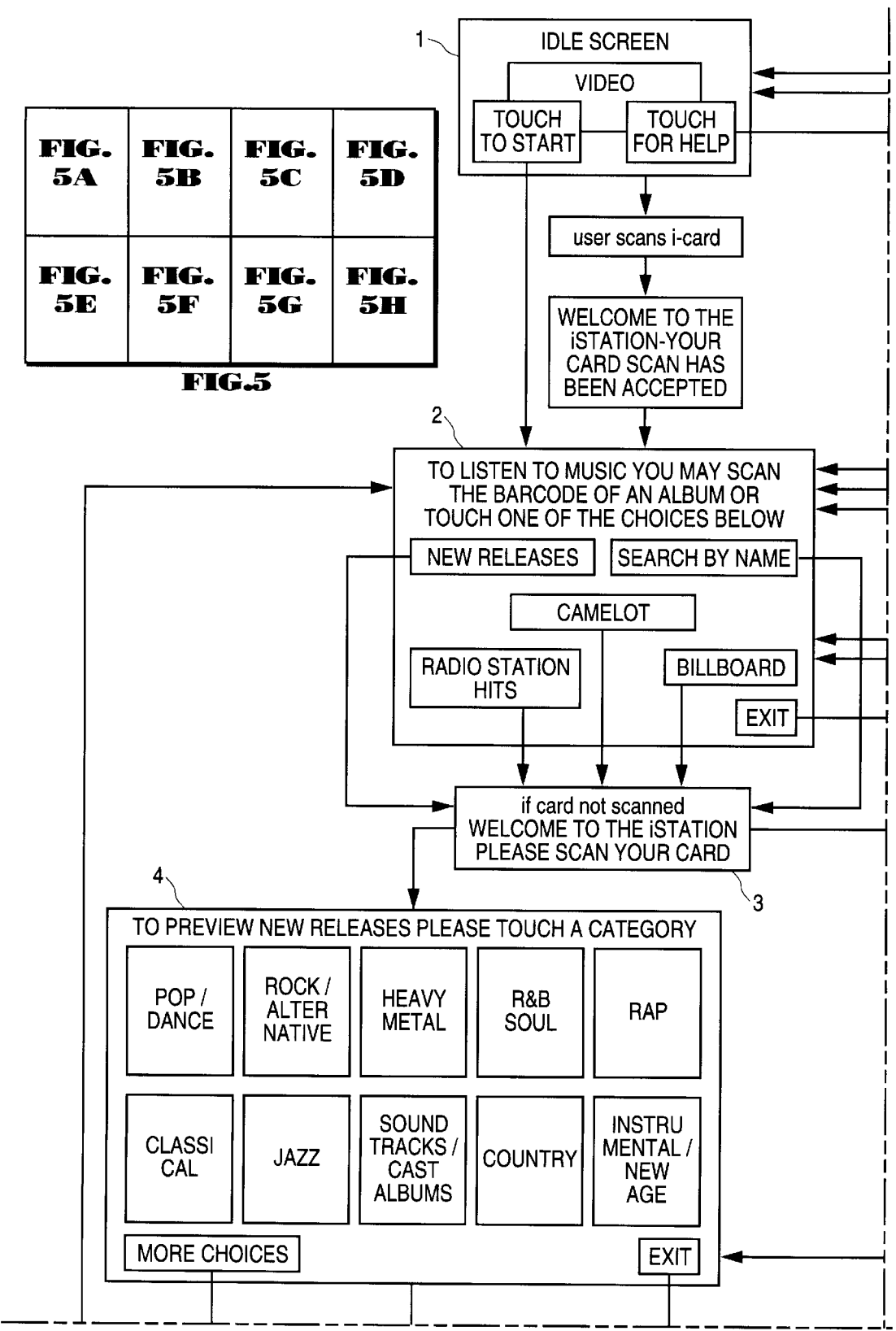

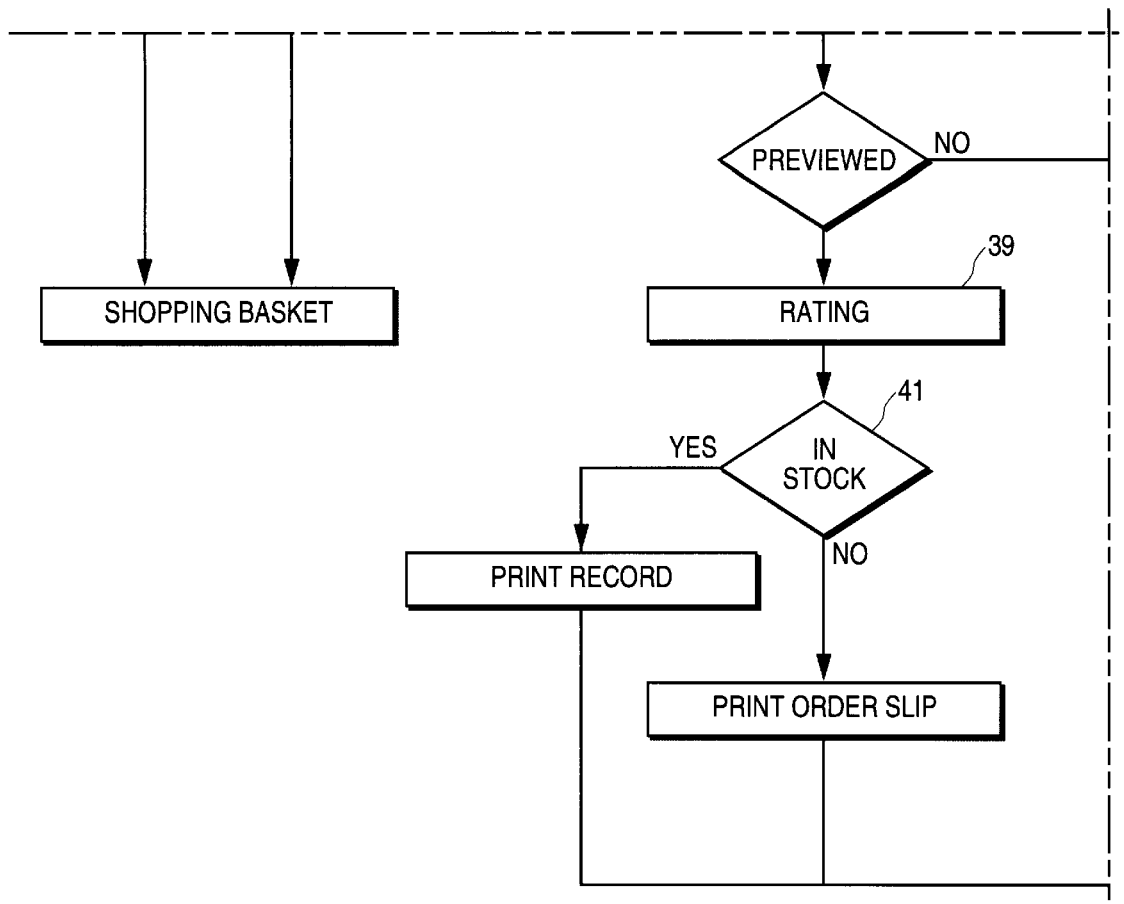
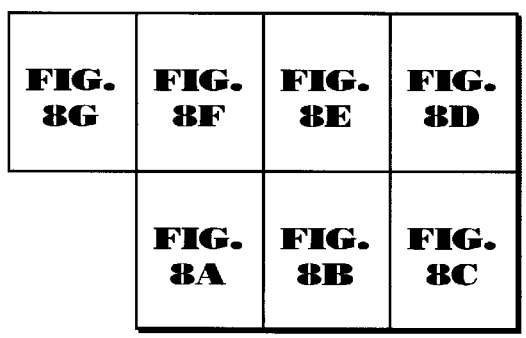
FIG. 8A

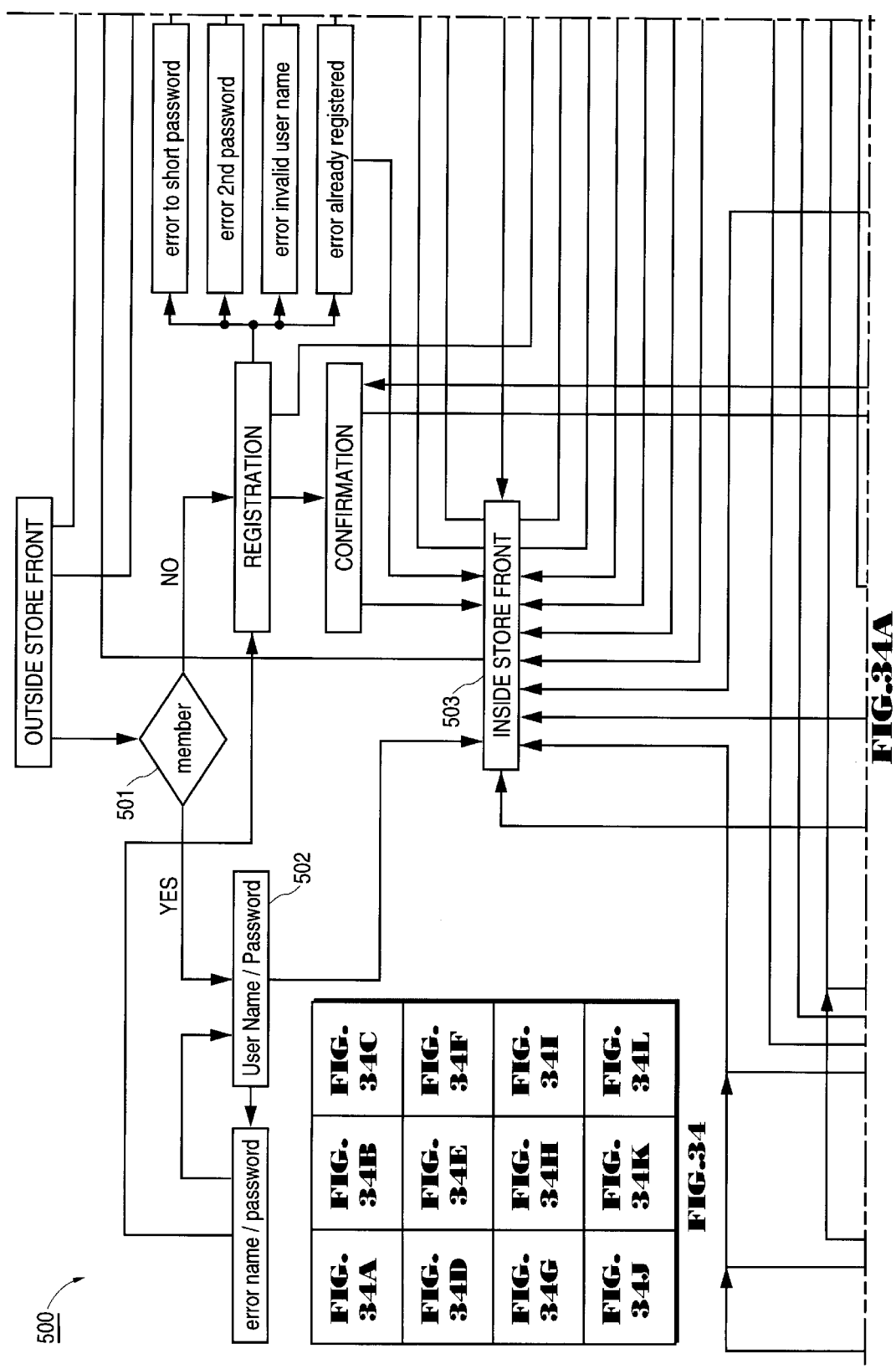

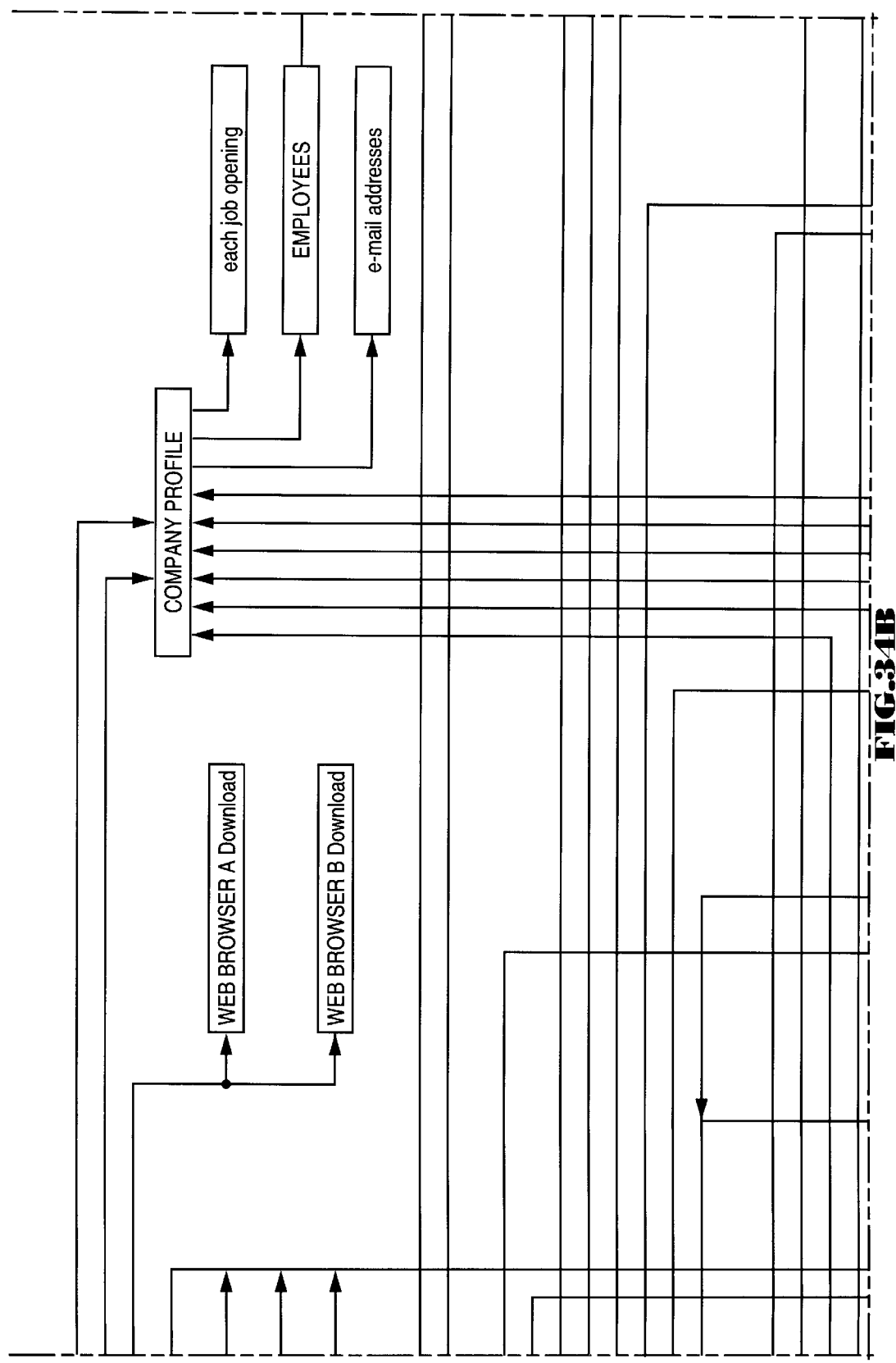

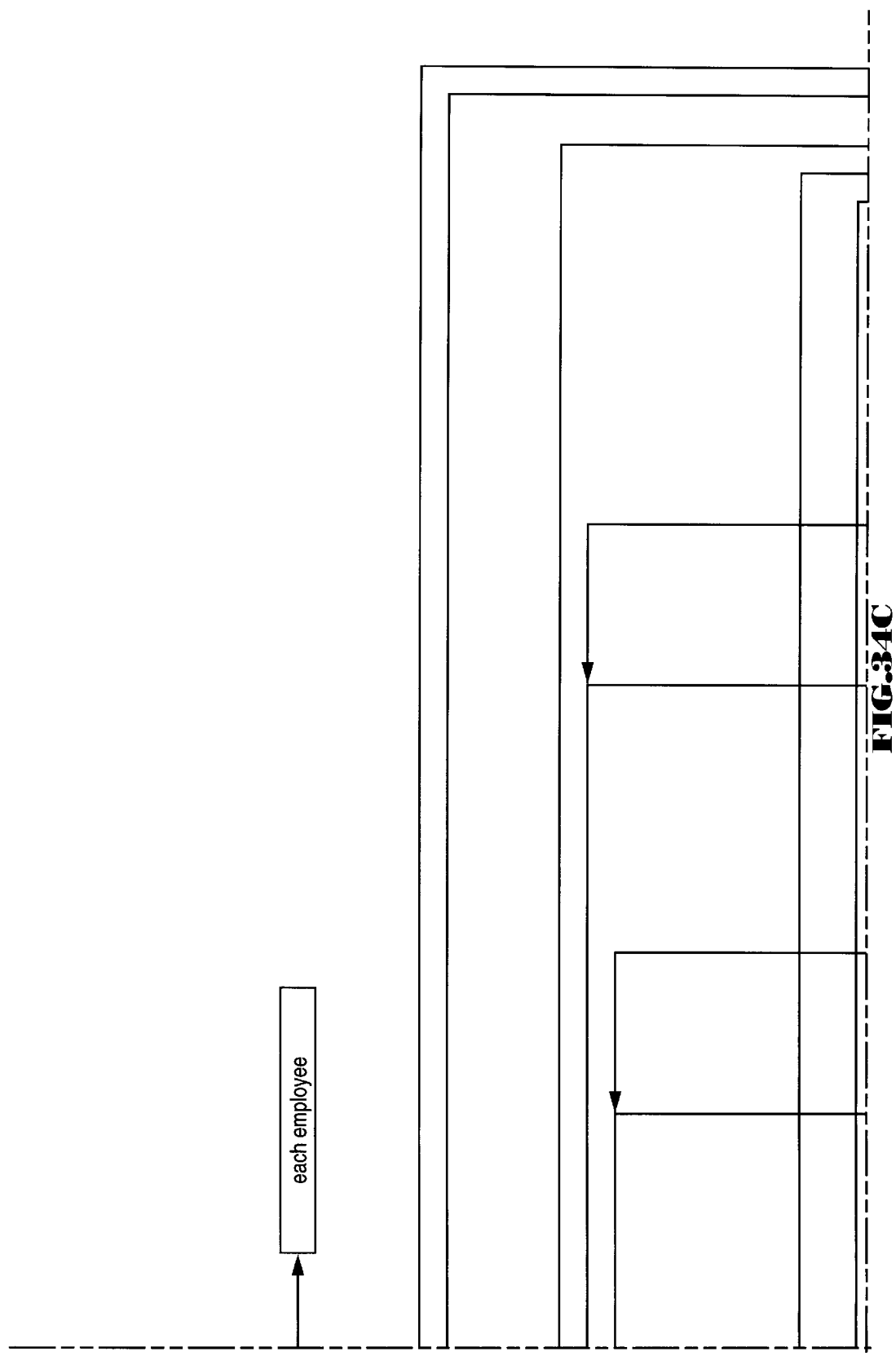

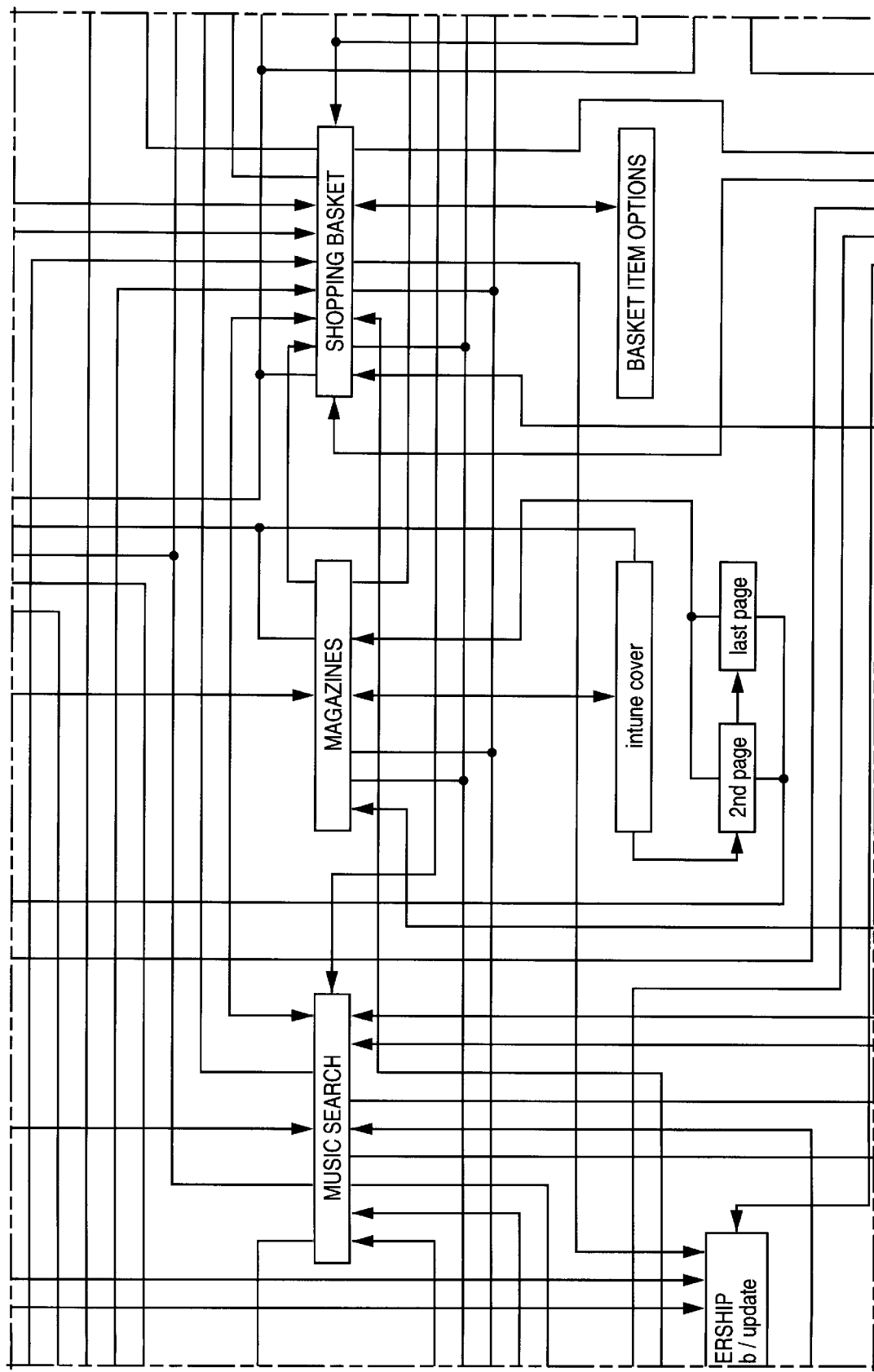

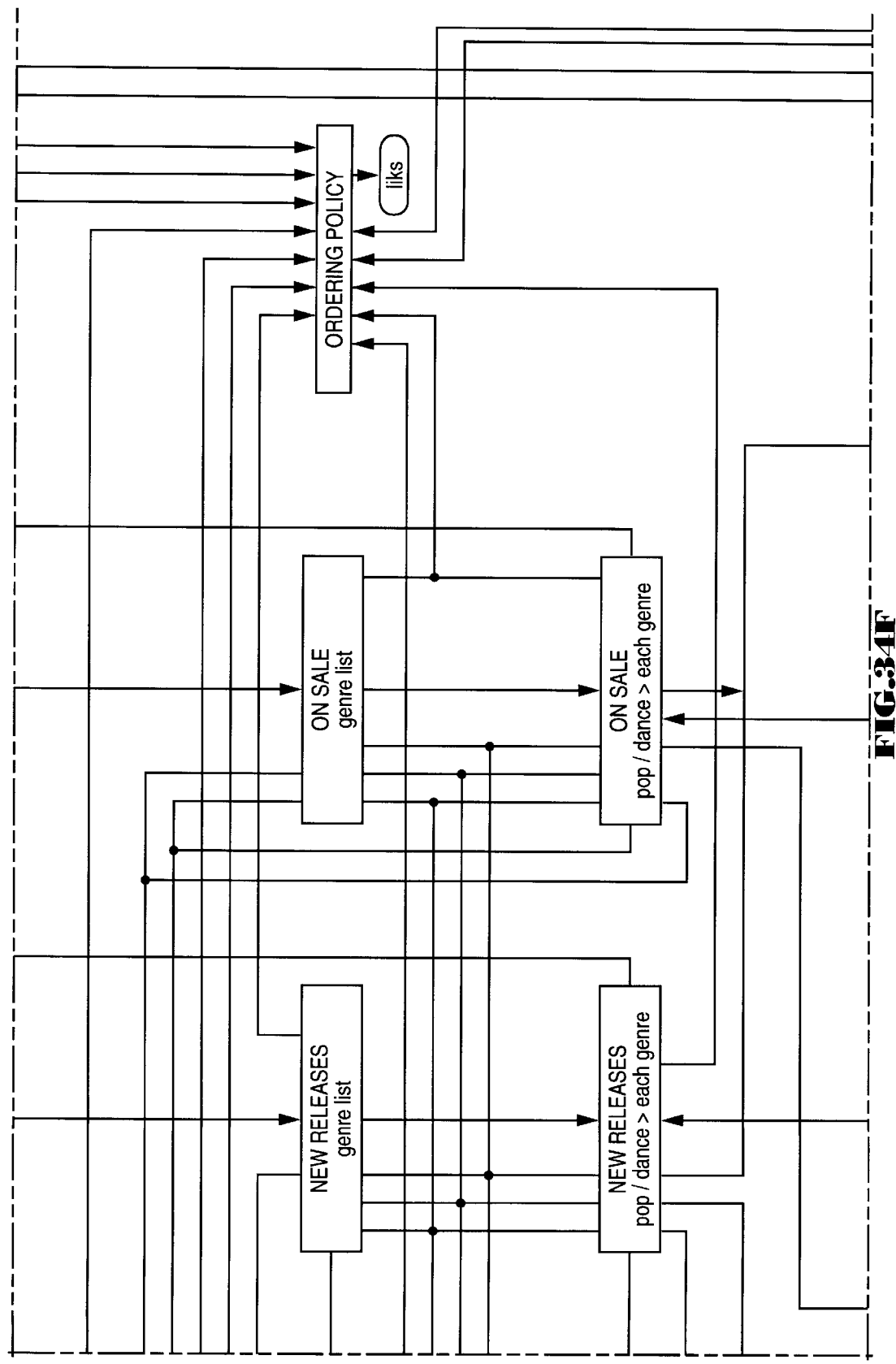

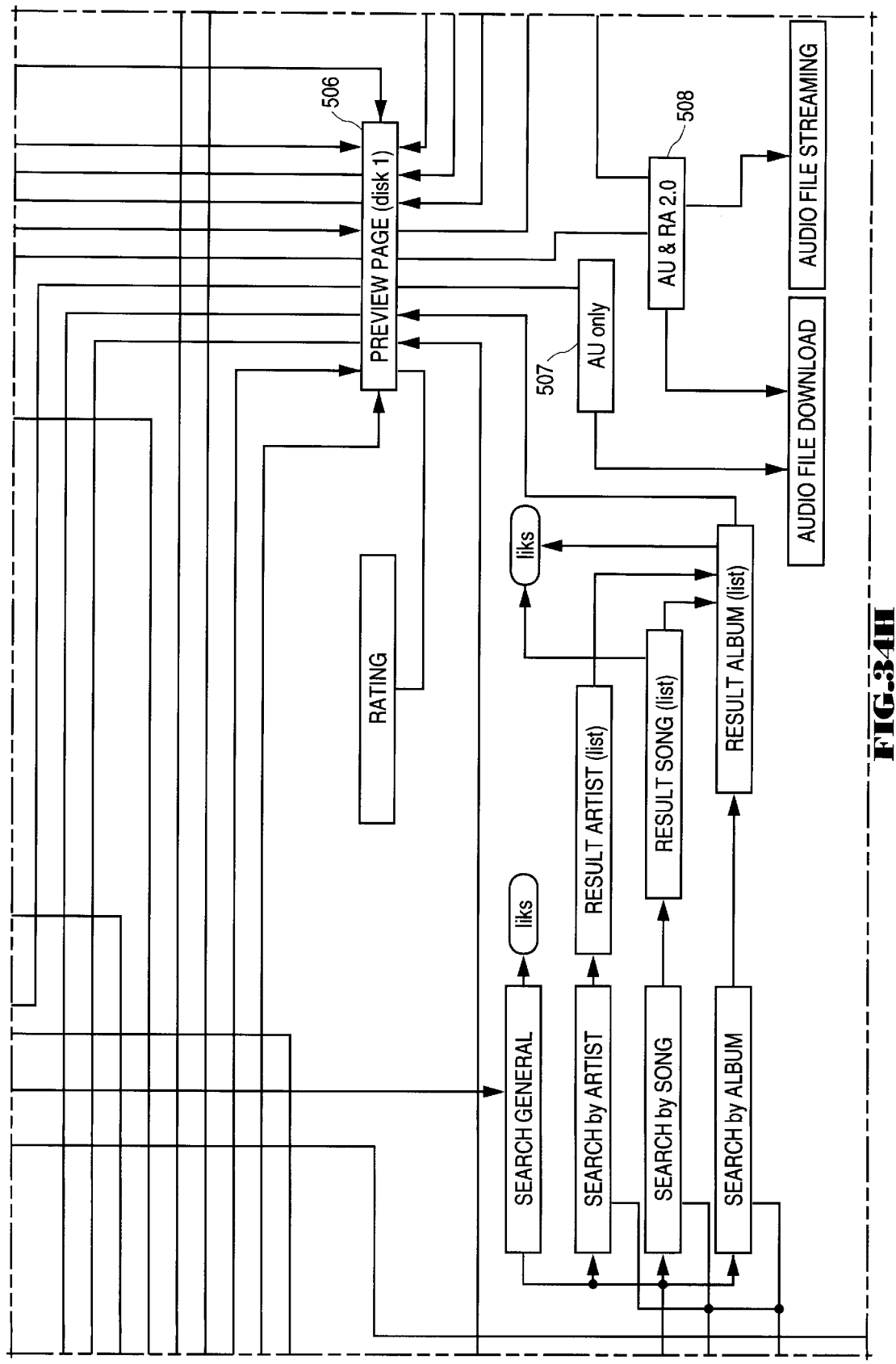

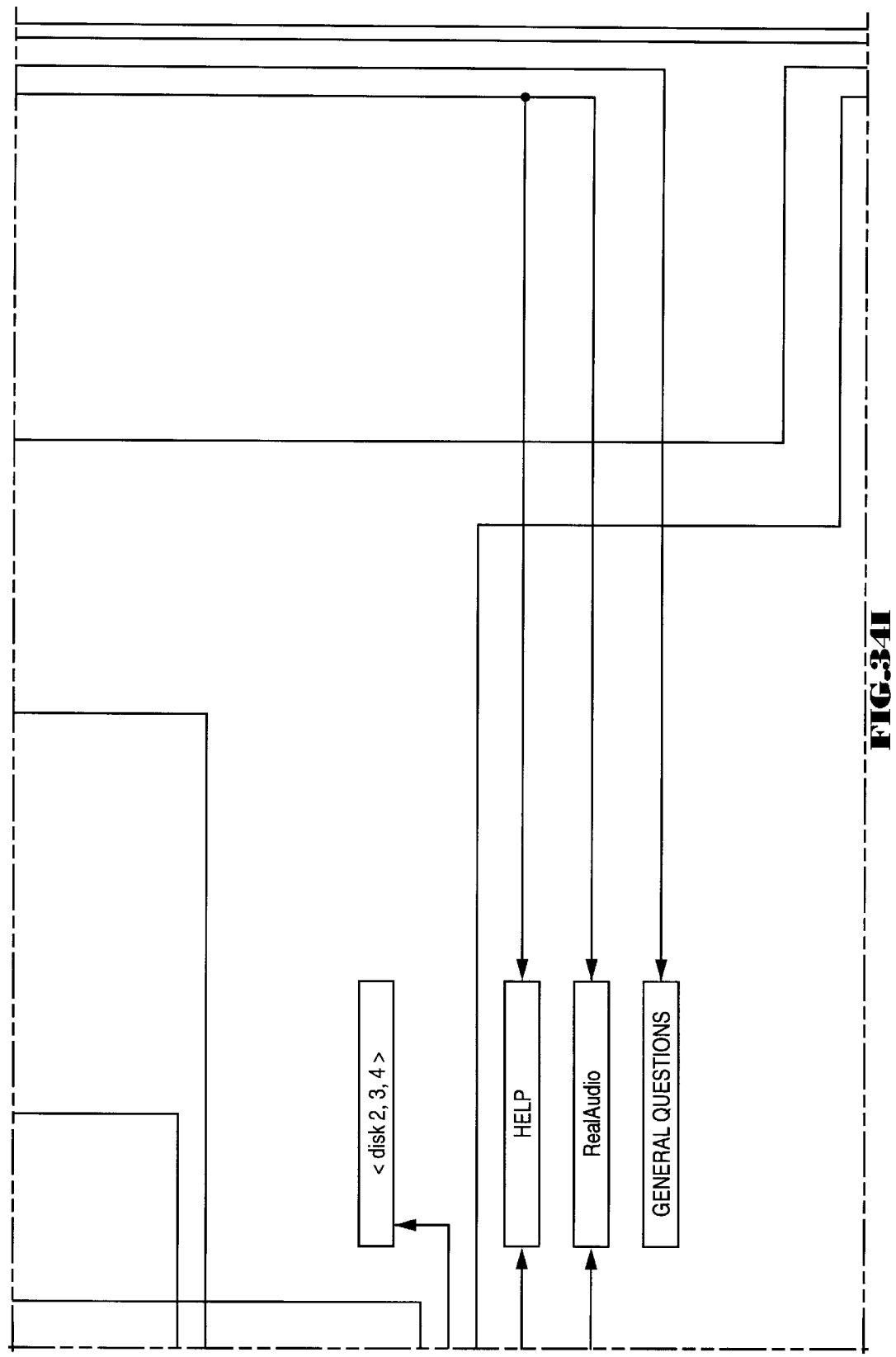

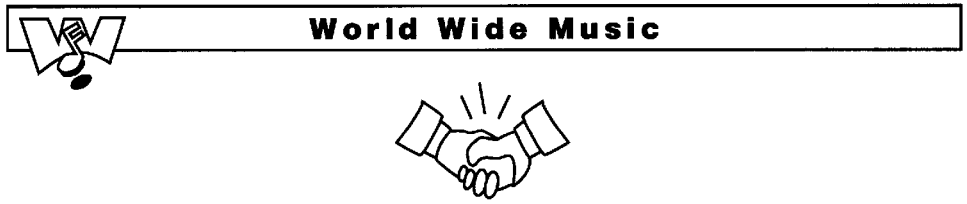

Update Your World Wide Music Club Membership Information

You can just change your username and a password if you want.
All your information is kept completely confidential.

First Name: Joshua   Last Name: Kaplan
E-mail Address: josh@intouchgroup.com
Zip Code: 94107
Date of Birth (MM/DD/YY) 07/20/1961
Marital Status: ○ Single  ● Married
Gender: ○ Male  ○ Female
Highest level of education you've completed: Some College
Which best describes your ethnic or racial background: White/Caucasian
Approximate annual household income (in US $) (optional) : $100,000 or more
Credit cards you use:
☐ VISA  ☐ Mastercard  ☐ Discover  ☐ American Express  ☐ Other
Computers you use:
☒ Mac-OS based  ☐ Windows based  ☐ DOS based  ☐ UNIX based  ☐ OS/2 based  ☐ Other
Online services you use:
☒ The Internet/The Web  ☐ America Online  ☐ CompuServe  ☐ Prodigy  ☐ Other
☐ Microsoft Network  ☐ Genie  ☐ Delphi  ☐ Other
Slowest speed at which you often connect to the Web:
28,800 baud Video games machines you use:
☐ Sega  ☐ Nintendo  ☐ 3DO  ☐ Sony Playstation  ☐ Atari  ☐ Other
Hobbies/Interests (pick a few):
☐ Cars  ☐ Movies  ☐ Sports  ☐ Books  ☐ Magazines  ☐ Business/Financial
☒ The Web/The Internet

FIG. 36

☐ Video Games/CD-ROMs Software
User Name you would like to use: Josh
Password you would like to use: 
Please enter your password again:

①ntouch™
Copyright © 1995 intouch group, inc.
All rights reserved

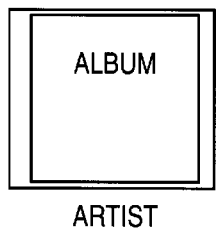
ARTIST
Intouch™
Copyright © 1995 intouch group, inc.
All rights reserved
FIG.45

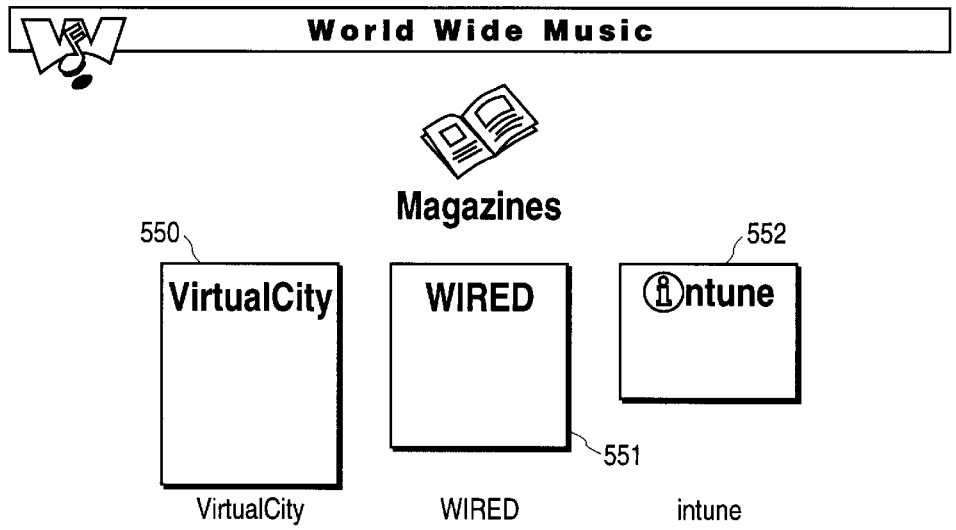
FIG. 51

Order Form

Please fill in all of the information below, and then click the "Continue Order" button.

What is your address?

Please enter our BILLING address, and a shipping address if necessary, below. State sales tax will be displayed below and charged if your order is being shipped to California, Minnesota or texas. Click the "Update" button to see the sales tax, if any.

First Name: [    ]  M.I. [ ]  Last Name: [    ]
Street Address: [    ]  Apt.#: [ ]
Extra Address Line: [    ]
City: [    ]  State: [ ]  Zip: [ ]

If this is a gift, or if you want your order shipped to an address other than the one above, please enter it below. If not, you can leave this blank.

First Name: [    ]  M.I. [ ]  Last Name: [    ]
Street Address: [    ]  Apt.#: [ ]
Extra Address Line: [    ]
City: [    ]  State: [ ]  Zip: [ ]

Do you want to send a greeting with your order?

Greeting line one: [    ]
Greeting line two: [    ]

How do you want your order shipped?

● US Mail Priority ($4.95). Your order should arrive in 2-4 business days.

○ 2nd Day Air ($7.45). Your order will arrive in 2 business days.

○ Overnight ($10.90). Your order will arrive the next business day.

Your merchandise subtotal is:

Your CA sales tax is:  If we have this wrong, call 1-800-219-6752 9am-5pm Pacific Time.

Your shipping charge is:

Your total cost is:

[ Update ]

FIG.56

NETWORK APPARATUS AND METHOD FOR PREVIEW OF MUSIC PRODUCTS AND COMPILATION OF MARKET DATA

This is a continuation-in-part of U.S. patent application Ser. No. 08/668,327 filed on Jun. 26, 1996 abandoned which is a continuation of U.S. patent application Ser. No. 08/282,153 filed on Jul. 28, 1994 abandoned, which is a continuation of U.S. patent application Ser. No. 08/035,661 filed on Mar. 23, 1993 abandoned, which is a continuation of U.S. patent application Ser. No. 07/957,444 filed on Oct. 6, 1992, now U.S. Pat. No. 5,237,157, which is a continuation of U.S. patent application Ser. No. 07/582,253 filed on Sep. 13, 1990 abondoned.

FIELD OF THE INVENTION

This invention relates generally to user controlled preview of a plurality of different pre-recorded products. More particularly, this invention relates to the use of an on-line network web site for interactive preview of a portion of a pre-recorded product by the user.

BACKGROUND OF THE INVENTION

The 1980s witnessed a tremendous rise in consumer demand for home entertainment products, particularly, the compact disc (CD) player. Wide consumer acceptance has been the result of more affordable ownership costs, superior fidelity (compared with LPs and cassettes) and remarkable ease-of-use. In the United States alone, total sales of CD players skyrocketed from 1.2 million units in 1985 to over 17 million units in 1989 (over three times the growth rate of VCRs). CD players now represent one third of all new audio component sales with projections pointing to total U.S. sales topping 30 million players in the U.S. by 1991—making the CD player the fasted growing consumer electronics product in the last twenty-five years.

Despite the explosion of CD player sales, most consumers own very few CDs (studies indicate the average CD player owner posses only nine discs). In large part, this is due to the fact that when it comes to purchasing a specific compact disc, the consumer is faced with several constraints and dilemmas. For example, compact discs are roughly twice the retail price ($14–$16) of LPs and cassettes and as a result, consumers are more reluctant to explore new and/or unproven artists for fear of wasting money. Moreover, there is the issue of "selection stress," a common problem for the average music buyer who is confronted with an enormous catalogue from which to choose and few mechanisms to assist her in evaluating these choices. This is exemplified by typical retail music stores which have developed the "super-store" format in which to promote its products. Unfortunately, the salespeople generally have not kept up with the sophistication of the market. Hence, consumers are at a clear disadvantage. Consumers often cannot sample or interact with the product while in the music store and they cannot return products they do not like. Therefore, although many consumers wish to build larger music collections, purchasing decisions are often risky and mistakes can be costly.

At the artist level, the proliferation of new music markets, styles and tastes has caused the number of record labels to increase dramatically. The record industry has expanded from several major labels in the 1970s to more than 2,500 distributed and independent labels today. Each year more than 2,500 new artists are introduced into an already crowded market.

Currently, label executives have no way to test market their respective acts or albums before dollars are committed to the production, promotion and distribution process. Furthermore, there is no current methodology to provide consumer exposure to a particular artist's work outside of radio and television or concert tours. Therefore, print media is heavily utilized by retail music stores to draw attention to new and old labels and special promotions. Music labels recognize this and consequently subsidized these efforts to promote their individual artists.

The problem of consumer awareness is aggravated by the glut of records on the market which inhibits consumer exposure at the retail level and over the airways. Because each record label is responsible for the recruitment, development and promotion of their artists, some record companies have been compelled to establish marketing promotions where records are given away to promote awareness of certain acts.

Labels managers have also acknowledged that because a greater investment of time, money and creativity is required to develop many of today's acts, they are more likely than ever to cut short promotion in order to cut their losses quickly on albums that don't show early signs of returning the investment. This strongly limits the potential for success because some artists require longer and more diverse promotion in order to succeed.

In order to provide for greater consumer exposure to artist's works, a number of different inventions have been designed. For example, a music sampling device called PICS Previews has been developed. Although it permits some in store sampling, its use is severely limited because its primary format is based on a particular hardware configuration which is not easily modifiable.

The PICS preview device incorporates a television screen with a large keypad covered with miniature album covers, and these are locked into a laser disk player. A master disk which holds a fixed number of videoclips—usually about 80—is used as the source of music information. The consumer is permitted to view a video which represents a selection from the album. However, information from only those artists who have made a video and who are featured on the PICS preview system can be accessed. The consumer cannot make her own selection. The selections are not necessarily those that are in the store inventory.

Another in-store device, known as the Personics System, provides users with the ability to make customized tapes from selected music stored on the machines. A drawback with this device is that it is expensive to use and time consuming to operate. Furthermore, exposure to various artists is limited. Still further, the device is viewed by record production companies as cannibalistic. Therefore record production companies have been reluctant to permit new songs from their top artists to be presented on these devices.

Perhaps the greatest advance in market exposure of a prerecorded product as of its issuance is U.S. Pat. No. 5,237,157 (the '157 patent) to Kaplan, from which this application continues. The '157 patent is directed to a user-interactive multi-media based point-of-preview system. In particular, interactive digital music sampling kiosks are provided to the retail music industry. In essence, the listening booth of the 1950s has been reborn and through the application of software and hardware technology has been brought into the next century.

Through the kiosk station which acts as a computer age "listening booth," the consumer, as a subscriber, is exposed to her potential purchases by being offered the ability to preview music before purchasing selections at record stores. The guesswork is thereby taken out of music purchasing by allowing consumers to make more informed purchasing decisions comparable with those available for other consumer products.

The kiosk station provides access to music products through the sampling of individual selections as discrete increments of information. This allows the subscriber to make more educated purchases. The kiosk station thereby dramatically changes the way in which consumers purchase music. This increases buying activity and improves overall customer satisfaction. Moreover, the kiosk system stimulates sales gains for the record stores and provides record companies a cheaper and more effective promotional alternative which can sample consumer opinions at the point-of-sale level.

The device described in the '157 patent utilizes a graphical interface software, a hi-resolution touchscreen monitor, and unprecedented storage capacity. Each system can offer the consumer the ability to preview selections from up to 25,000 albums, thus allowing more informed purchasing decisions by listening to songs on an album in a mode as uninhibited as using a telephone. The customer simply takes any music selection in the store display and approaches the kiosk. After scanning their user/subscriber card (free to the user and available at the store counter) across the UPC bar code reader, the customer scans their chosen audio selection. The touch screen monitor then displays an image of the album cover in full color with songs from the album. The user then simply touches the name of the desired song on the screen, and, through the privacy of headphones, listens to a 30 second clip of the audio program. Additional options include full motion MTV videos or Rolling Stone record reviews. The listening booth of the 1950s is effectively reborn and improved and through the application of software and hardware technology, brought into the 1990s.

Because of the high level of software content, the device described in the '157 patent remains flexible and dynamic. The interactive touchscreen can be programmed to accommodate multiple applications running under one environment on one system. Touchscreen interface can be continually modified with additional features added over time. This encourages subscriber interest and permits a competitive advantage over competitors who have locked their design into predominately hardware based configurations with little value-added software content.

The selection and input data from the subscriber is collected from each kiosk location and is transmitted to a central database for analysis by the central processing unit. Through the central processing unit, the subscriber selection and subscriber profile data can be analyzed, packaged, and distributed as information products to the entire music industry as timely and focused market research.

It was therefore an object of the '157 patent to provide a computer age "listening booth." Consumers would be offered the ability to preview music before purchasing selections at record stores. Preview and associated purchase data would be collected and stored to provide music industry market research data.

Another object of the '157 patent was to take the "guesswork" out of music buying by allowing for more informed purchasing decisions comparable with what was previously available. The '157 patent allows for access to prerecorded products through sampling of individual selections and allow the consumer to make more educated purchases. This increases buying activity and improves overall customer satisfaction.

While the '157 patent provides for a convenient and effective system for allowing a user to preview selected portions of a pre-recorded product, improvements may be incorporated. What is needed is an improvement that allows for rapid and up-to-date changes in the pre-recorded product selections that are available to users located at multiple locations across the world. What is further needed is an improvement for providing convenient centralized reprogramming of the controlling software. What is still further needed is am improvement that allows for access to the system by subscribers using publicly accessible kiosks or from private computers. What is further needed is an improvement that allows for purchasing over a network such as the internet. What is still further needed is an improvement that allows for relational previewing wherein musical works related to the user's selected work, is conveniently available to the user.

SUMMARY OF THE INVENTION

The present invention provides for an improvement to the '157 patent by integrating a network web site as the source of the pre-recorded products and the controlling software.

In a preferred embodiment, the present invention provides for a method for enabling a user to preview a portion of a pre-recorded music product from a network web site containing pre-selected portions of different pre-recorded music products, using a computer, a computer display and a telecommunications link, the method comprising the steps of: a) using the computer to establish a telecommunications link to the network web site wherein the network web site contains pre-selected portions of different pre-recorded music products; b) transmitting user identification data from the computer to the network web site thereby providing user access to the network web site; c) choosing at least one pre-selected portion of the pre-recorded music products from the network web site; d) receiving the selected portion of the pre-recorded products; and e) interactively previewing the received chosen pre-selected portion of the pre-recorded music product.

The preferred method may also comprise the step of rating the chosen pre-selected portion of the pre-recorded music products. Furthermore, it is contemplated that the computer and the display are housed within a kiosk. The kiosk can further include a product code scanner coupled to the computer for allowing the user to scan a product code located on a product which the user desires to preview.

The preferred method may also include a plurality of compact disc-read only memory (CD-ROMs) or a RAID array drive for storing the portions of pre-recorded products.

The present invention also provides for a preferred network web site for allowing a remote user to preview a pre-selected portion of a pre-recorded music product, using a computer, a computer display and a telecommunications link, the network web site comprising: a) a processor for controlling the network web site; b) memory for storing pre-selected portions of a plurality of different pre-recorded music products, the memory coupled to the processor; c) identification (ID) means for recognizing a user ID which specifically identifies the user to the network web site; d) reception means for receiving and processing a request from the user to transmit a pre-selected portion of at least one of the pre-recorded products back to the user; e) transmission means for transmitting the requested pre-selected portion to the user; f) control means for providing the user with interactive control over the transmission of the pre-selected portion of the pre-recorded music products.

The preferred network web site also contemplates the portions of the plurality of different pre-selected pre-recorded music products being identified and called from the memory using unique product codes. The preferred network web site can further included a purchasing means for allowing the user to place an order for purchasing at least one of the portions of the pre-selected pre-recorded music products; a listing means for providing the user with dynamic lists of the pre-selected portions of the plurality of different pre-recorded music products that have been previewed the most; a recording means for providing the user with a record of previous previews by the user; a ratings means for prompting the user for a user rating of a particular one of the pre-selected portions of the plurality of different pre-recorded music products and storing the rating; a first market research means for correlating the user rating with the user ID, for compiling market research data and a second market research means for correlating the user ID with all previews performed by the user, for compiling market research data; and a means for collecting demographic information regarding the user. It is further contemplated that the demographic information is selected from the group of informational types consisting of age, sex, income, ethnicity, education level, marital status, hobbies, and occupation.

BRIEF DESCRIPTION OF THE DRAWINGS

FIGS. 35–57 are screen shots of display screens that are accessible by a user in the network embodiment of the present invention independent from a kiosk.

DETAILED DESCRIPTION OF THE PREFERRED EMBODIMENT

The Original Kiosk Embodiment

Figure 1:
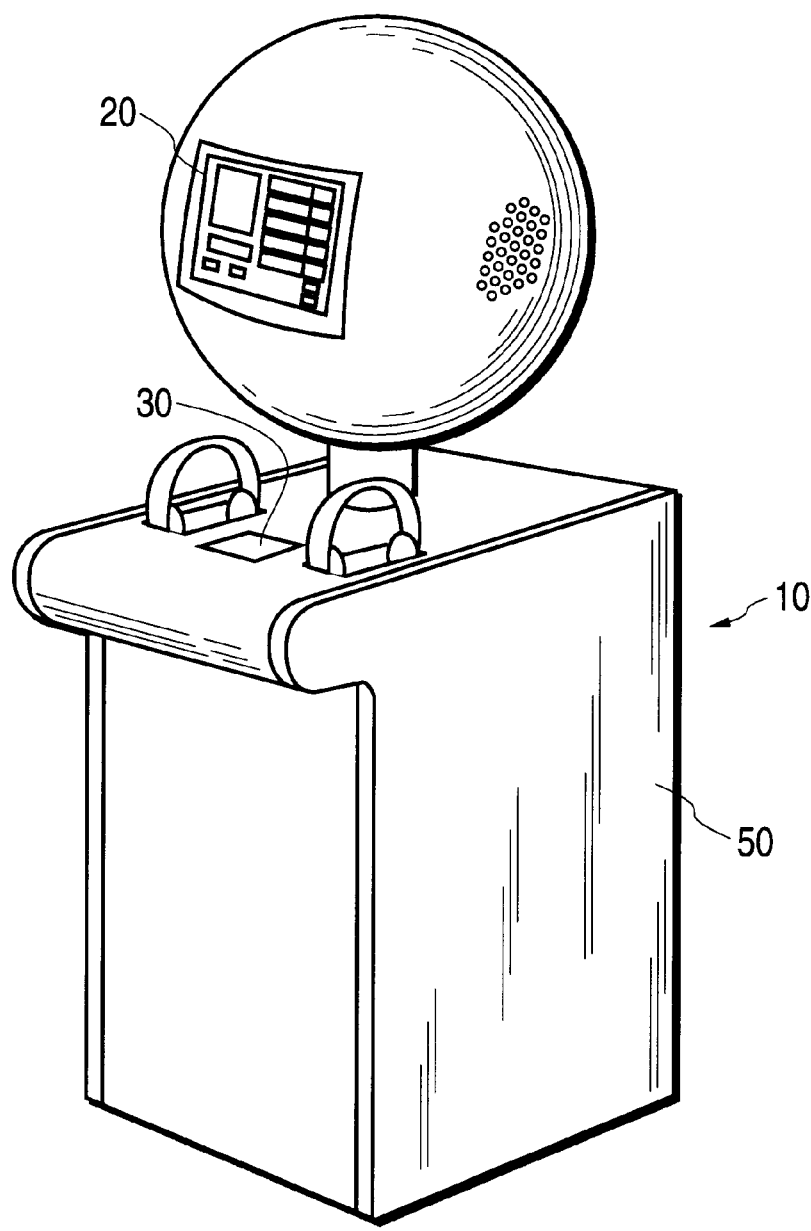
FIG. 1 is a perspective view of a typical apparatus used in the parent kiosk embodiment.

Referring to FIG. 1 of the drawings, there is a kiosk station 10 shown embodying the principles of this invention. The kiosk station 10 utilizes a custom, graphical interface (not shown), proprietary software, a hi-resolution touch-screen monitor 20, and data storage capacity. Each kiosk station 10 is provided with data compression technology which is state-of-the-art. The data compression technology is available from Fredericks and Shoe (Chicago, Ill.). The core of the kiosk station 10 is this digital compression technology, coupled with the storage and playback design. An application specific integrated circuit (ASIC) chip serves in the data compression and decoding component of the kiosk station 10. This ASIC firmware is integrated onto a custom-designed board which delivers 24 bit graphics, full motion video digital signal processing and decompression of the audio information to the subscriber. The new combination of bus technology provides for a high resolution, high quality, user friendly subscriber interface at the kiosk station 10.

On an ongoing basis, music CDs are identified for addition to the kiosk station 10 storage. Once the audio samples are identified, the samples are encoded at the CD authoring station. Music CDs are digitized and encoded for storage on a CD ROM discs. The record jacket associated with each preview album is scanned and digitized. A MacIntosh Sound Tool, which is a stereo direct-to-disc recording and playback system is used to process the digital signal to the CD. A Topiz CD Premaster/Encoding System or the like is used. In addition, manufacturers' UPC bar code data corresponding to the selected albums is copied and stored. The compression technology permits high capacity storage on CD ROM discs in the kiosk body 50. Each kiosk station 10 can offer the subscriber the ability to preview selections from up to 25,000 albums, thereby allowing more informed purchasing decisions by listening to songs on an album in a mode as uninhibited as using a telephone. Preview selections may be expanded or changed by altering the data on the CD-ROM discs. The CD-ROM discs are stored in a CD automatic disc loader. For example, the Sony Auto Disc Loader CDK-006 can be used. This loader can house up to 60 CD ROM discs and is controlled by an external 8-bit microprocessor control system. When a subscriber scans an album and touches particular selections, the disc loader will automatically scan to the appropriate slot on the disk tray. Am Apple MacIntosh platform is used with a CDSC which is like a CD-ROM drive capable of reading data and audio disks or the like. CD-ROM interface can be accomplished with a Hypercard or its equivalent. In addition, the database code will create a file for data collection each time a subscriber begins a preview session. This will identify a specific subscriber with the selections and ratings which were processed and the kiosk station.

To excite the subscriber, and inspire her to pick up an album from the CD rack and preview it on the kiosk station, the retail store can also be provided with a library of CD ROM discs. For example, 600 minutes of top 200 song cuts can be offered on a single CD ROM disc. These discs can be played for an entire 10 hours period without changing. The length of the CD means that there is no recurring pattern or loop. Musical selections will vary from Rock, to Jazz, to Classical, etc. with widespread appeal. This CD ROM disc sampler will contain songs from albums found on the kiosk station. In that way, a subscriber can become interested in a cut heard over the store's in-house sound system, approach the clerk and ask for the album or the artist responsible, and then proceed to pick out their selection.

To use the invention, the subscriber takes any music selection in the store display and approaches the kiosk station 10. The subscriber is provided with an access card, similar to a credit card, which is used to activate the kiosk station 10. The system interface is based on a touchscreen 20 and activated by the access card which is passed over a UPC scanner. There is no keyboard to add to levels of confusion or intimidation.

Each customer can complete a brief membership application which asks for basic demographic information, general music listening preferences and buying habits and an access card will then be generated for that subscriber. Each subscriber will have a bar code on their access card which will immediately identify them when beginning a session on the kiosk station 10. The subscriber identification can be further interfaced with the music store cash register so that with each music purchase following CD preview, the transaction will be identified as a kiosk-related sale.

A program similar to an airline frequent flyer club can be generated. The central database 60 can maintain a library of subscribers with subscriber profile information and specific preview activity. In order to provide subscribers with an incentive to use the kiosk station 10 regularly, subscribers will earn bonus points for answering the rating questions after previewing selections at the kiosk station 10. Earned bonus points will also accumulate for kiosk-related purchases. Through a combination of rating and purchase bonus points, subscribers will become eligible for discounted and even free music sponsored by music industry participants.

Subscribers may additionally be sent quarterly statements showing a list of albums previewed and kiosk-related purchases. Listings of new releases on the kiosk stations 10, as well as various promotions sponsored by recording labels and music stores, can be disseminated to the subscribers by generation of a news letter update. Subscriber mailing lists can be used to send additional promotional material.

After scanning the access card across the bar code reader 30 which can use multiple mirrors to enhance the scan rate for a dense scan (such as the MS 700 manufactured by Metrologic of Camden, N.J.), the subscriber scans the bar code of the CD chosen, and up on the touchscreen 20 appears the album cover in full color photographs along with songs from the album. The subscriber then touches the desired song at the desired location of the touchscreen 20 and through the headphones 40 listens to a 30 second clip. Additional options include full motion MTV videos or record reviews.

The access card which is used to activate the kiosk station 10 can be used to monitor all subscriber activities and generate, for example, demographic information and market research.

Figure 2:
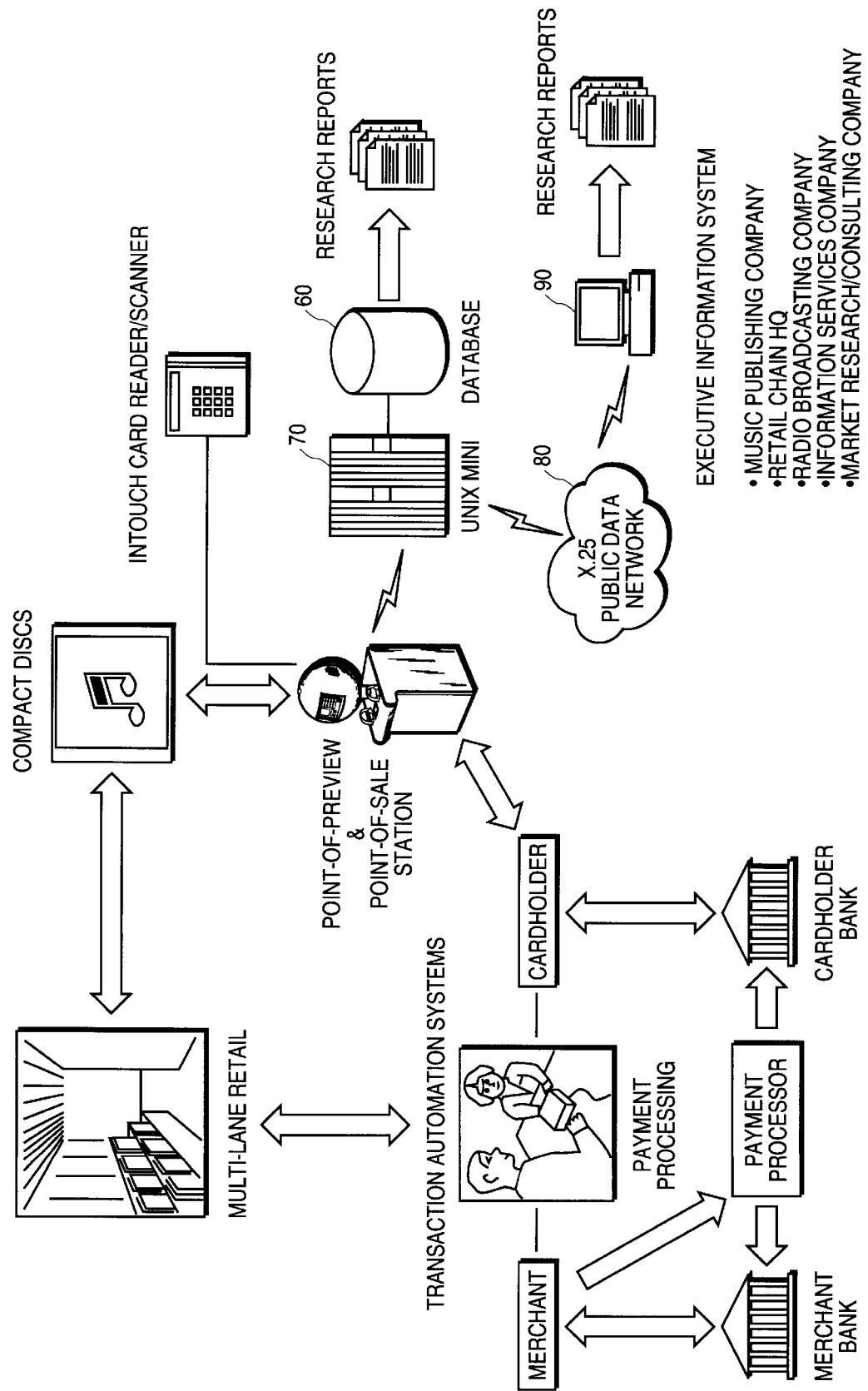
FIG. 2 is a block diagram showing the functions of devices which comprise the apparatus of the parent kiosk embodiment.

Referring now to FIG. 2 there is shown a block diagram demonstrating the apparatus including the storage and transmission to a centralized database 60 for analysis by the central processing unit 70. Each time a subscriber activates the kiosk at the scanner 50 to begin a session, a data file is created identifying the subscriber and generating a selection preview. Additional information in the form of responses to rating questions for the selected CD and purchase indications can also be captured in the data file. The centralized database 60 can poll each kiosk station 10 at all of the remote locations through a telecommunications link. The information gathered will be analyzed and packaged into market research products for distribution in the record industry and radio stations.

FIG. 2. demonstrates that the selection choice and subscriber data can be transmitted via a public data network 80 for analysis by use of an Execution Information System (EIS) 90. Such systems provide the capabilities to analyze vast amounts of data and to convert this data into useful information on a real-time basis. EIS's allow non-programmers access to large quantities of data through an intuitive user interface. EIS's have built in tools which make modeling much easier than conventional spreadsheet or database software. The software and technical support of a major telecommunications and information network, such as Comshare, can be used. This EIS software operates in a distributed and portable environment. In addition, the EIS used will be supported on multiple platforms and operating systems. This provides for delivery of proprietary data and its analysis appropriate to the business needs of the record industry. A key attribute to most EIS systems is the provision for multidimensional data dimensions, which, in the music industry, may include unit sales, time periods, geographic markets, specific music categories, configuration breakdowns, and demographic profiles of the subscriber bases. The capabilities of CD-ROM discs will allow for the periodic delivery of market research to the record industry on CD-ROM discs.

Figure 3:
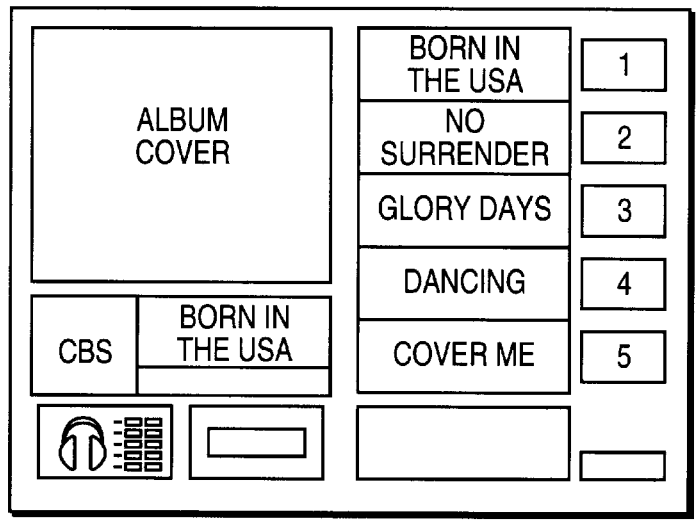
FIG. 3 is a view of a typical touchscreen software generated display interface used in the apparatus of the parent kiosk embodiment.
Figure 4:
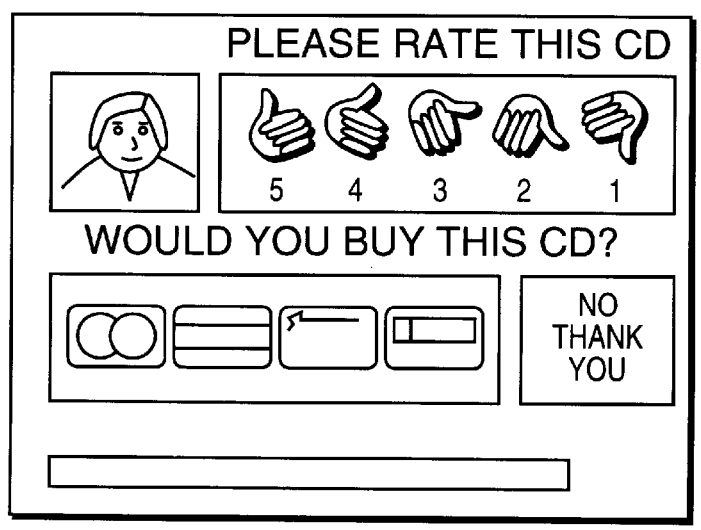
FIG. 4 is a different view of a typical touchscreen software generated display interface used in the apparatus of the parent kiosk embodiment, further having a point-of-purchase capacity.
Figure 5B:
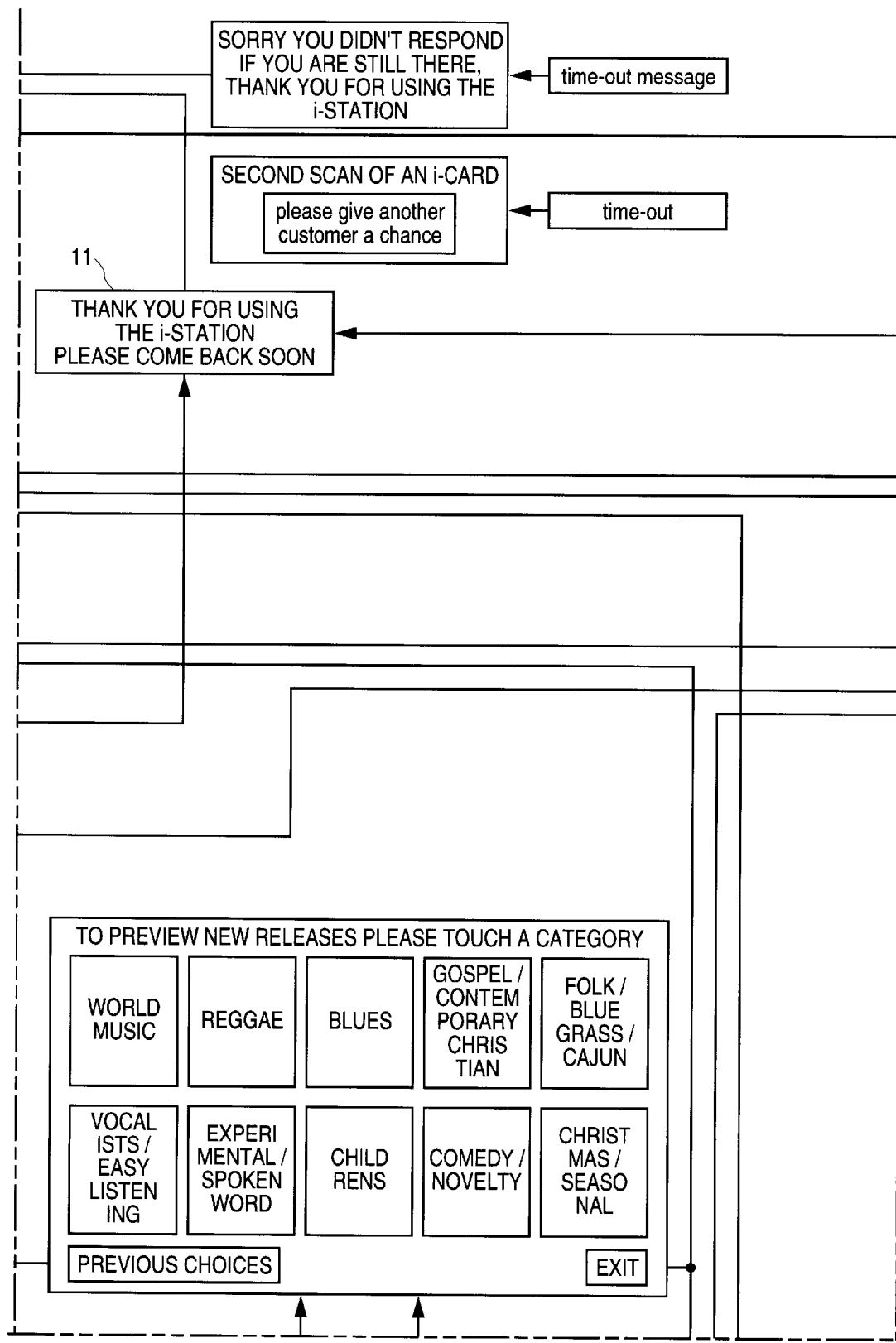
FIG. 5 is a flow diagram of the possible paths accessible by a user of the original kiosk invention.
Figure 5C:
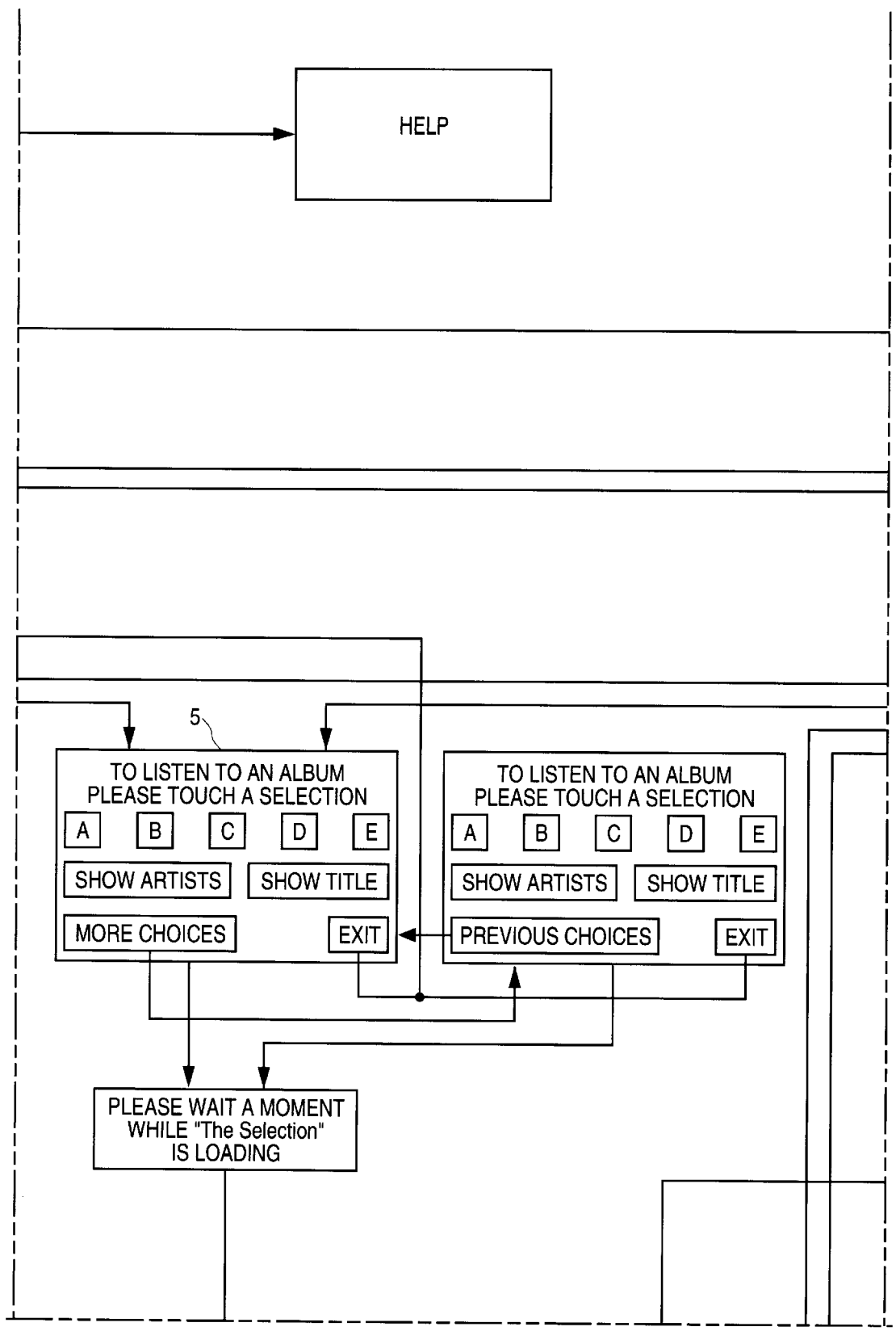
Figure 5D:
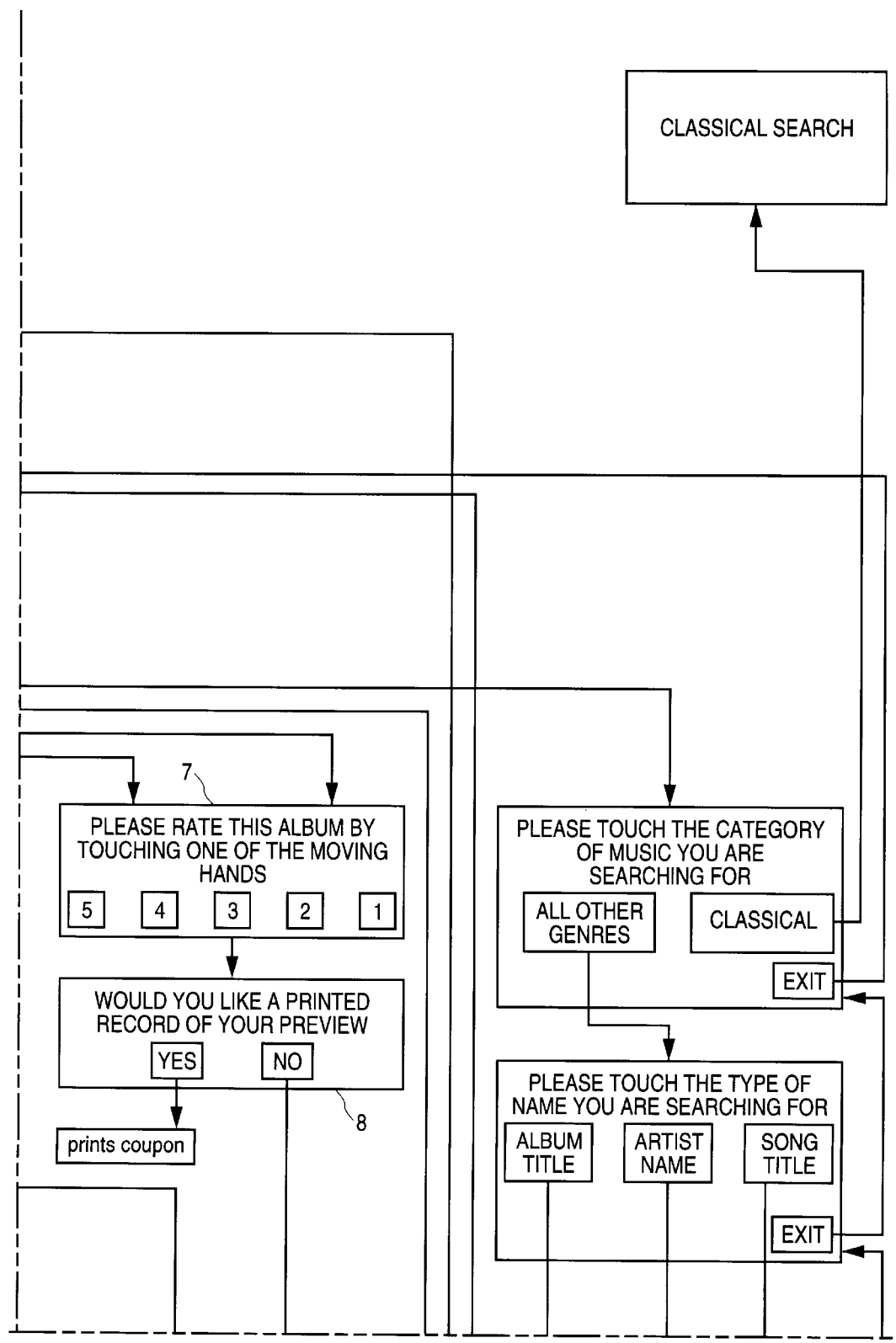
Figure 5E:
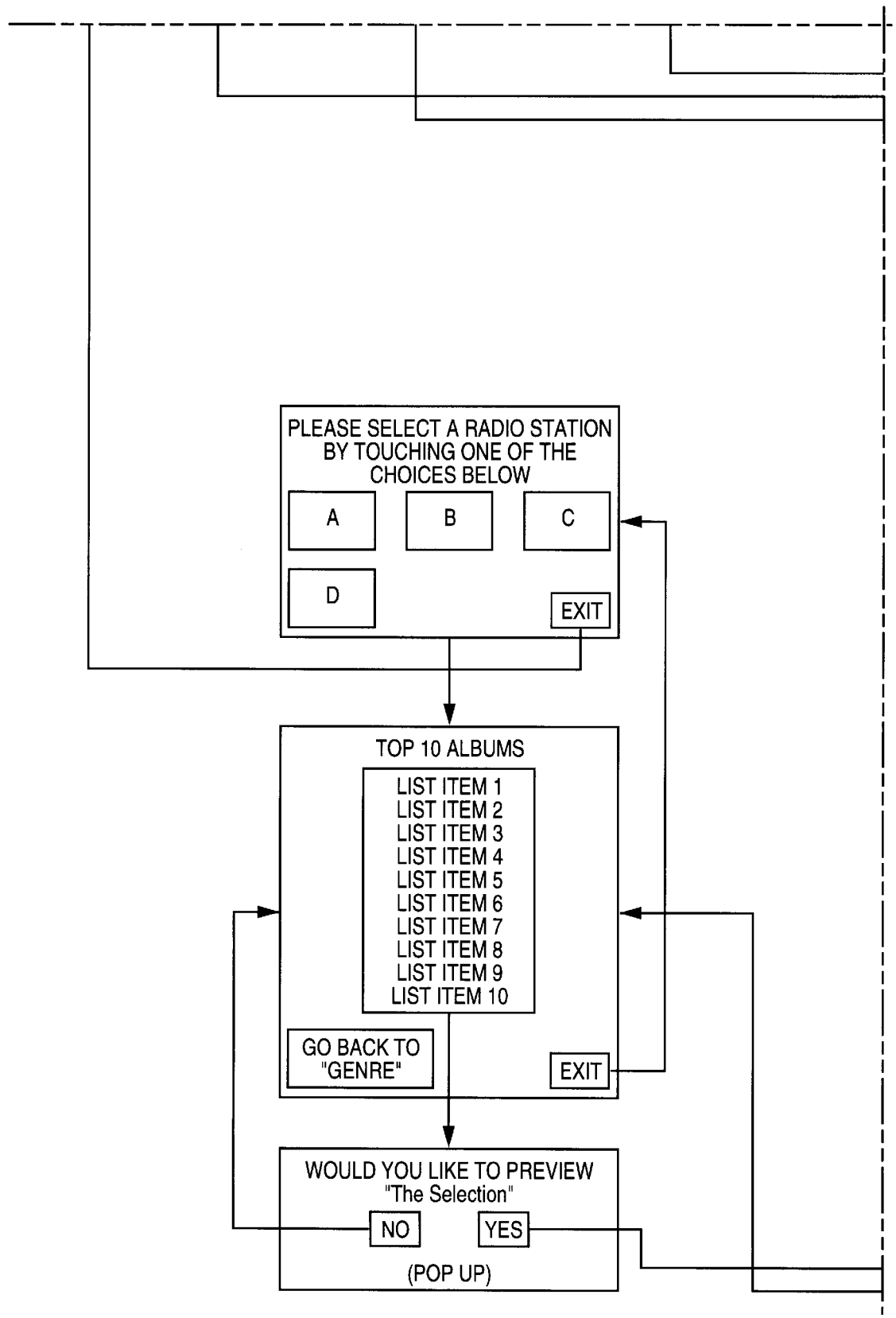
Figure 5F:
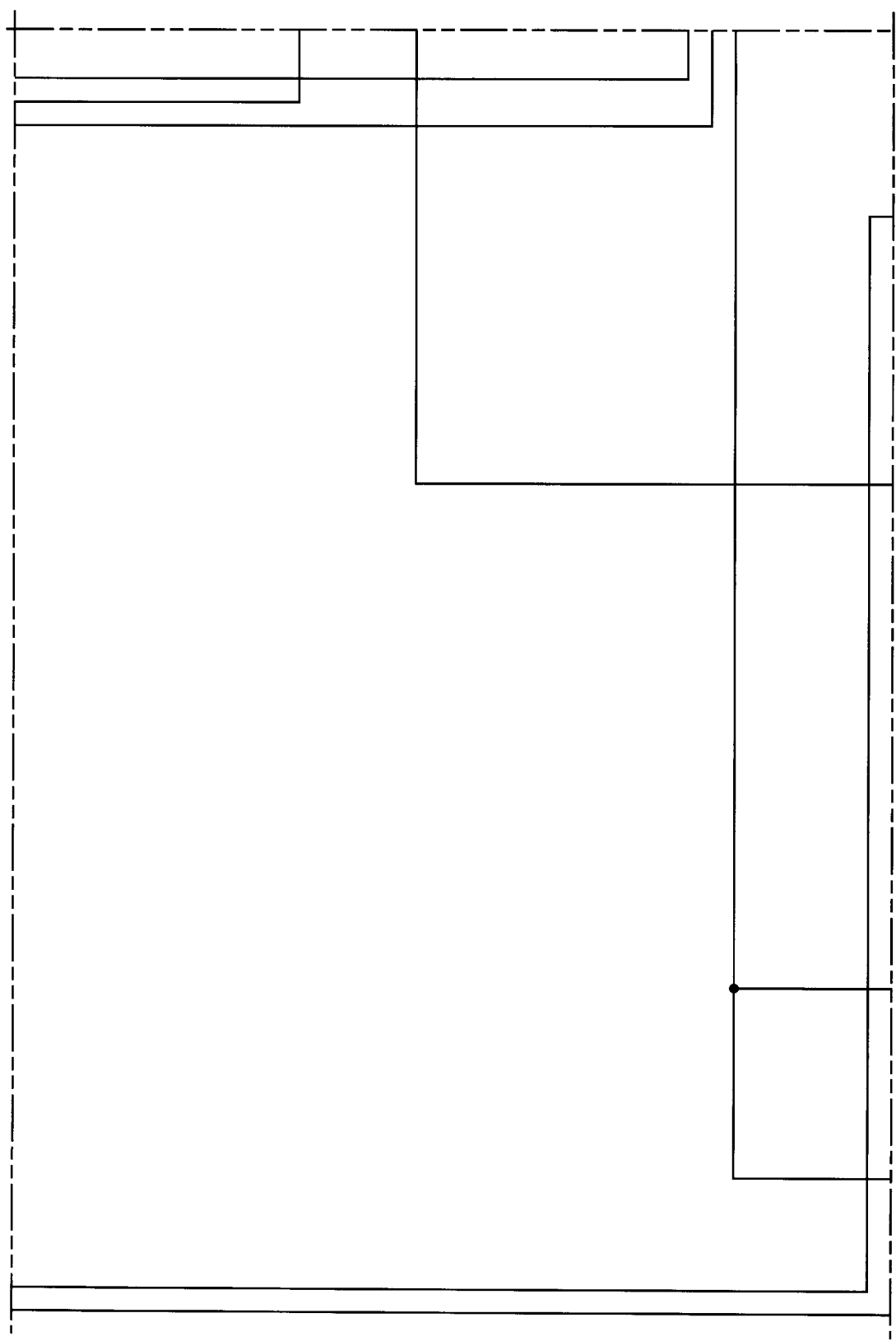
Figure 5G:
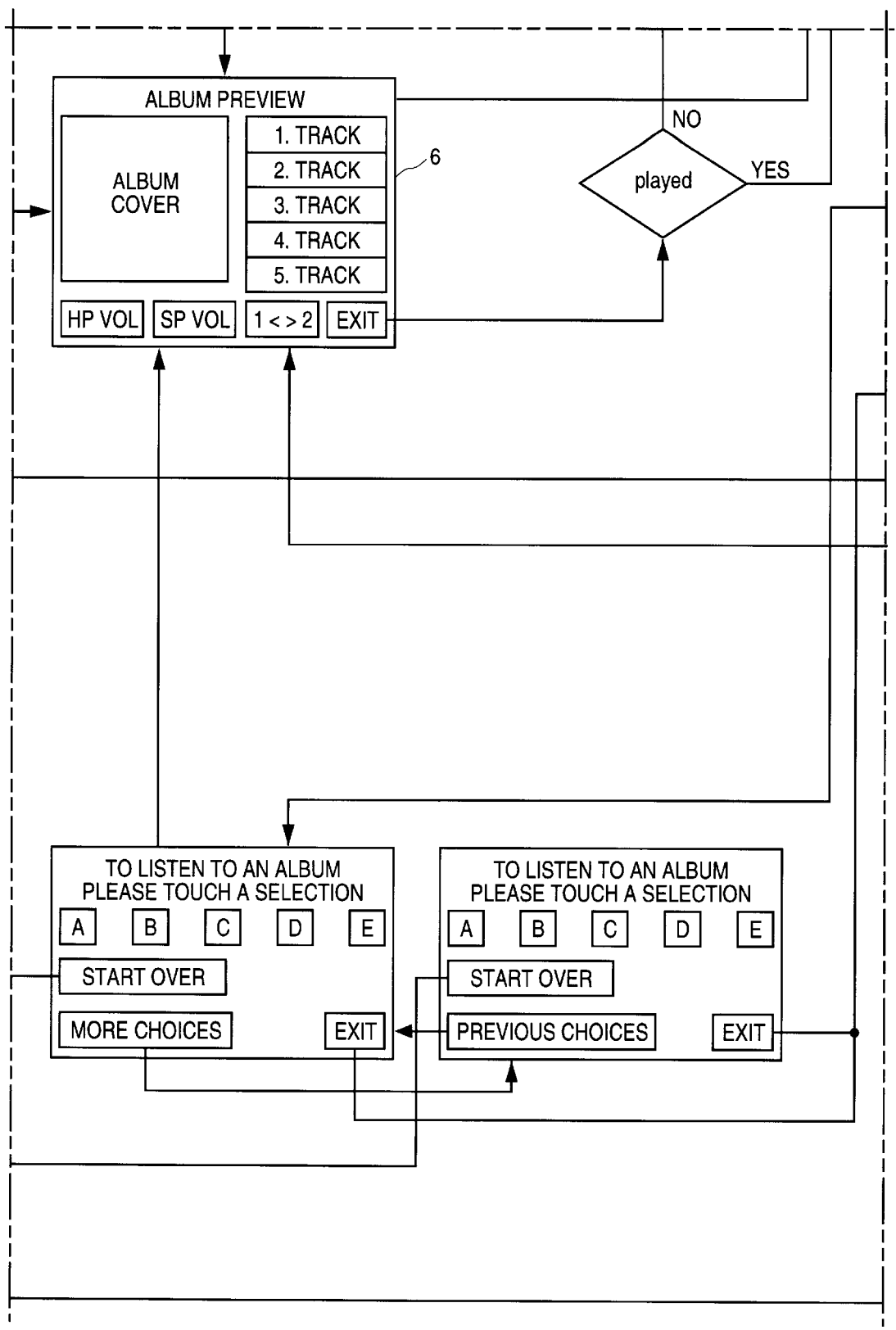
Figure 5H:
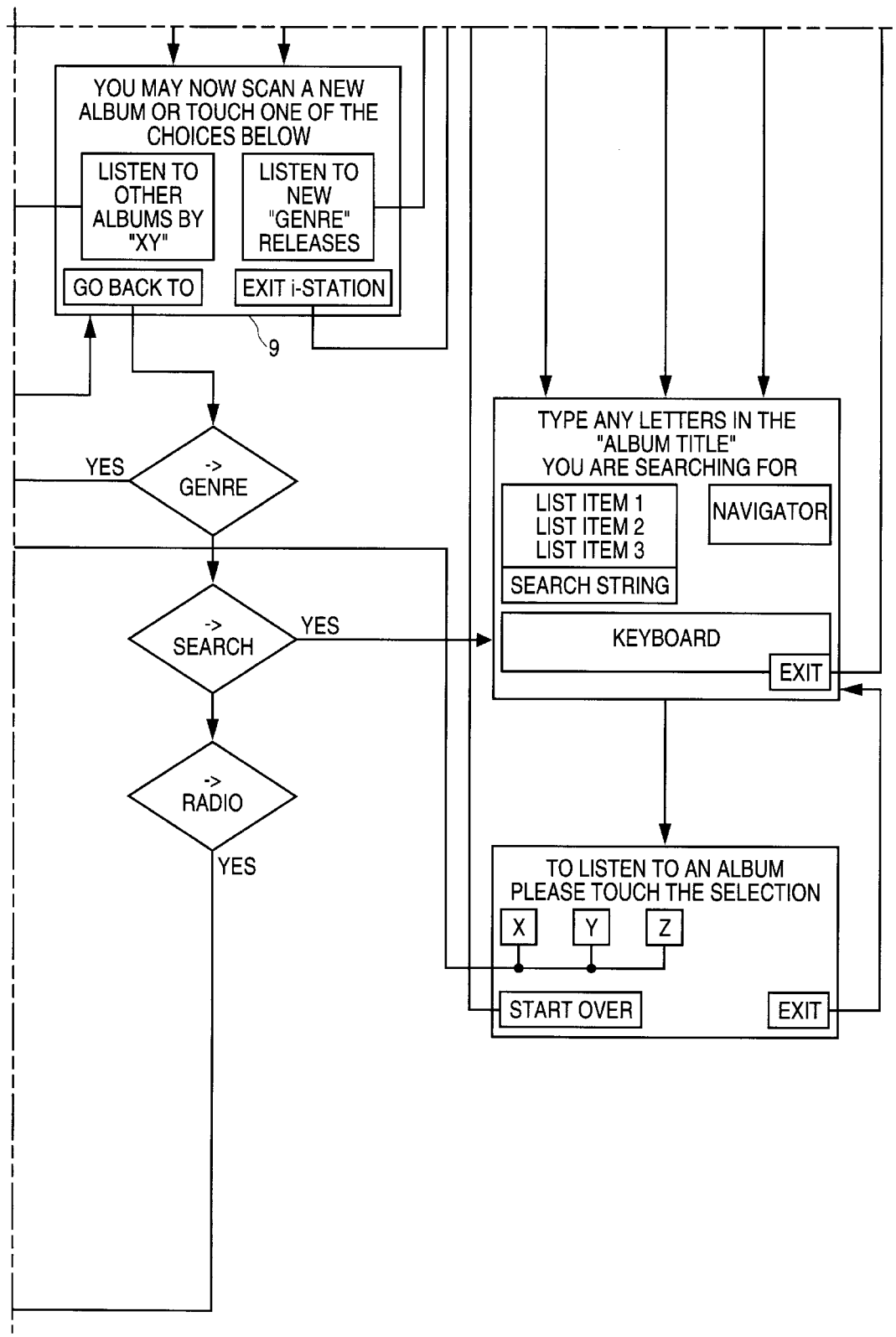

FIGS. 3 and 4 show various software configured touchscreen display interfaces. Because the touchscreen display is matrix generated by software configuration, it is flexible and dynamic. The touchscreen display can be programmed to accommodate multiple applications running under one environment on one system as demonstrated in FIGS. 3 and 4. The software configuration provides for modifications with additional features added over time by software upgrades.

FIG. 5 is a flow diagram of the possible paths accessible by a user of the original kiosk invention. The different blocks are rough illustrations of the different screens viewed by users and the arrows illustrate the possible paths the users can follow through the original kiosk system. In order to better explain the flow diagram, an example path will be discussed.

A user starts at the idle screen 1 where she can touch the "start" section to begin. From there, the user is shown screen 2 where she is asked to select a category to search (i.e. new releases or radio station hits). If she selects "new releases" she is asked to scan her I-Station card subscriber card. This identifies her to the system. From there, she is shown screen 4 which illustrates the different music genres which can be searched (i.e. pop/dance or heavy metal). If a particular genre is selected, the user is shown screen 5 which illustrates the CD covers of the new releases in the chosen genre. After selecting a particular CD, the user is shown screen 6 which illustrates the CD cover and the tracks that can be previewed. After previewing a music sample, the user is shown screen 7 which requests a rating for that track. The user is then asked if she wants a printed record of her preview at screen 8. Screen 9 then asks the user if she wants to preview another selection. If not, the user is shown screen 11 which thanks the user for her use. The system then returns to the idle screen 1.

Figure 6A:
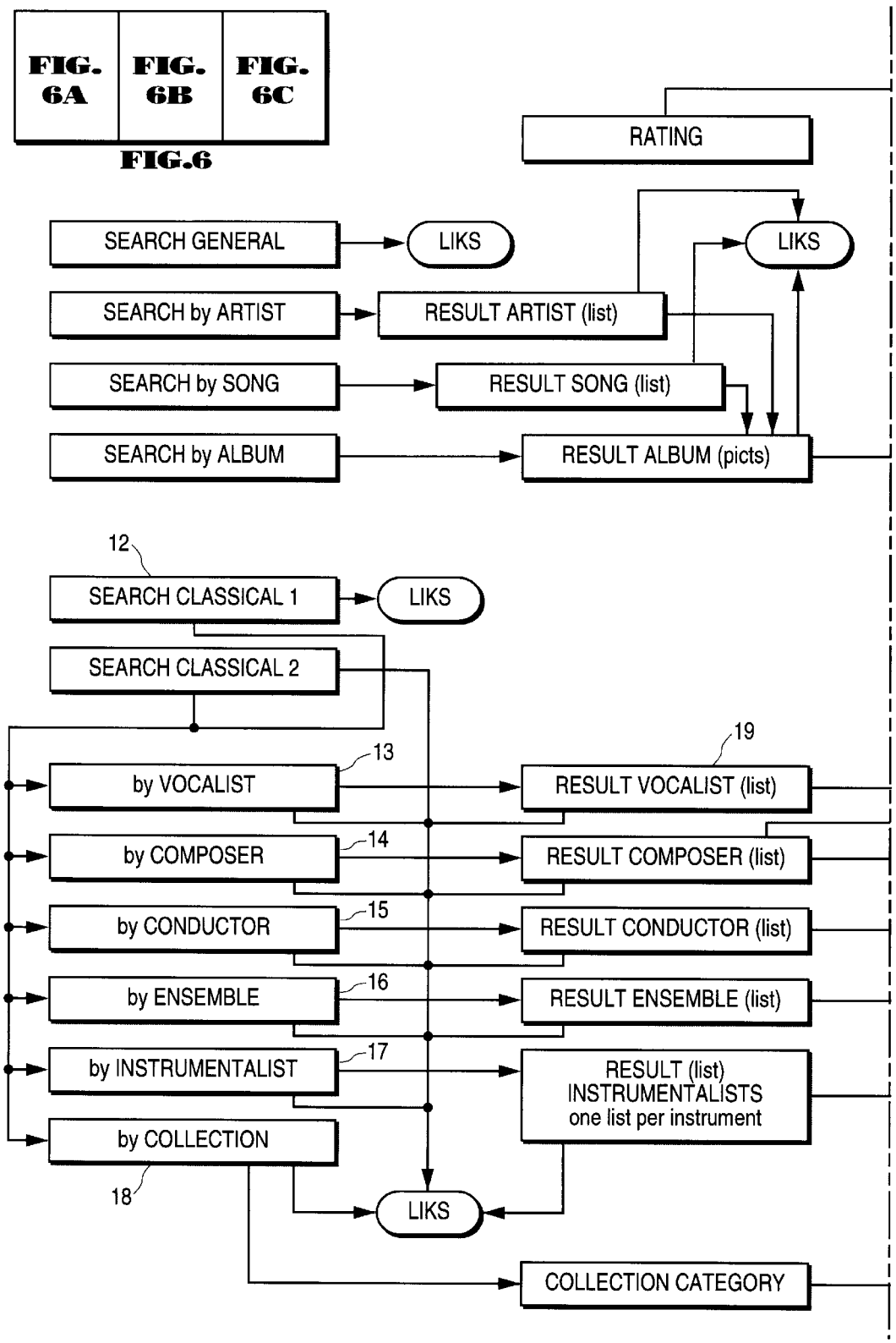
FIG. 6 is a flow diagram of the search engines used with the original kiosk invention, the kiosk-based network embodiment, and the network embodiment independent from a kiosk.
Figure 6B:
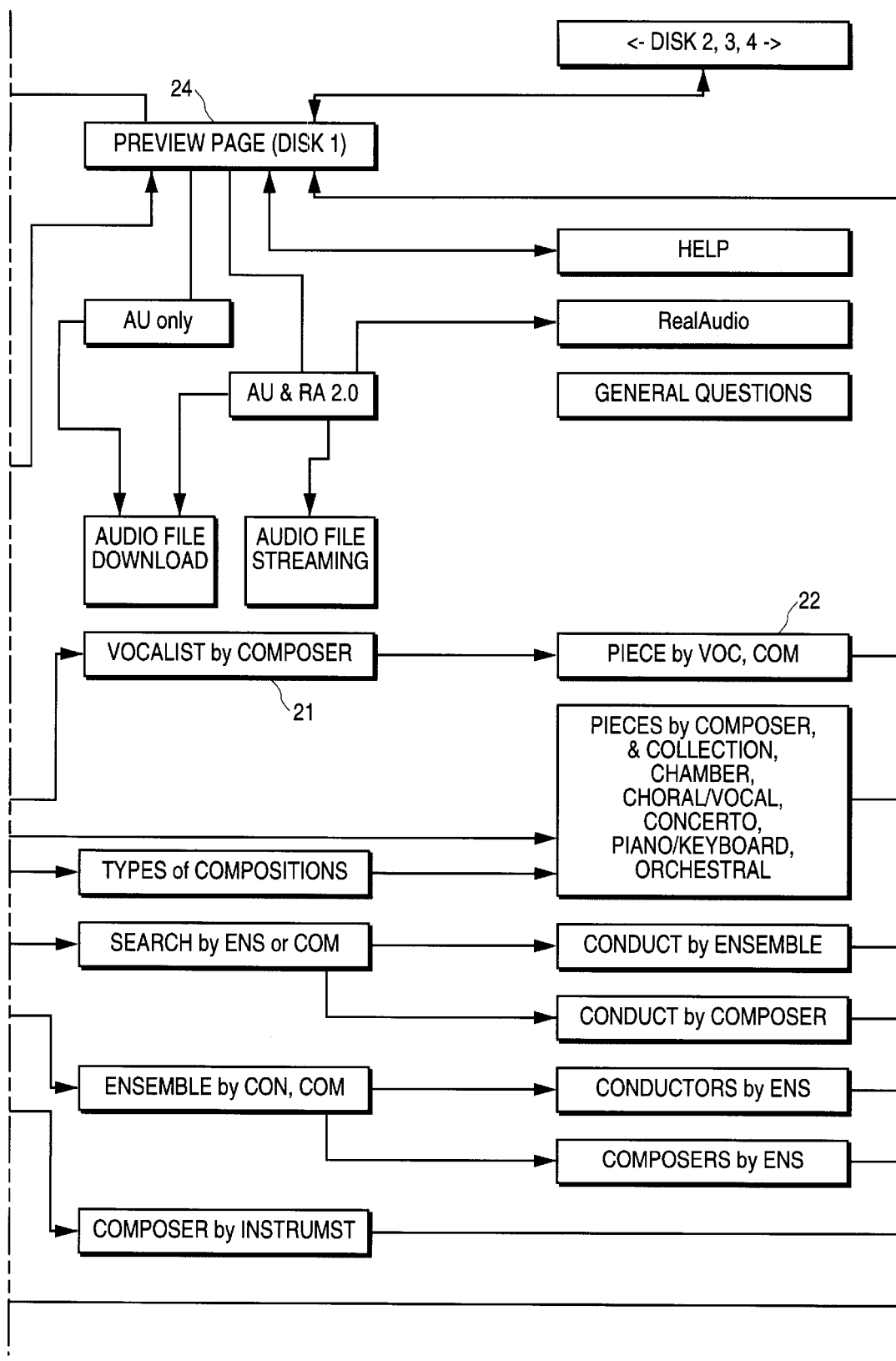
Figure 6C:
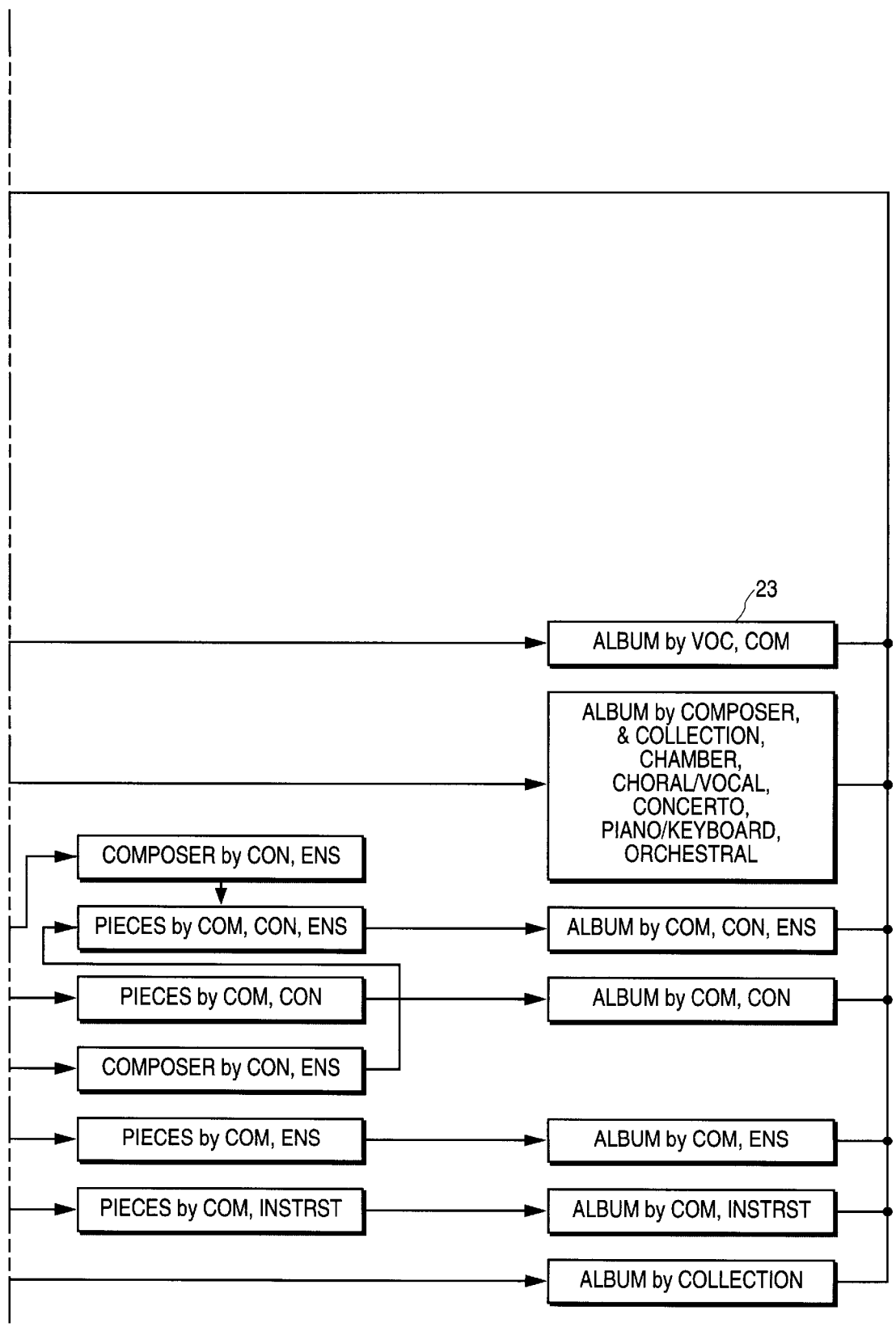

FIG. 6 illustrates an overview of the different search engines used with the original kiosk invention, the kiosk-based network embodiment (described below), and the network embodiment independent from a kiosk (described below). As with the previous figure, an example path will be described which will provide an understanding of the program's logical flow. This example discusses the search engines involved in a classical music search.

Starting at block 12, a user determines the initial search parameters (i.e. vocalist, composer, conductor). Depending on which parameter is chosen, the appropriate search engine is selected 13–18. Assuming the vocalist parameter 13 is selected, the vocalist list is provided to the user at block 19. The vocalist-by-composer search engine is then selected at block 21. The particular piece by the selected vocalist and composer is then selected at block 22. The particular album is then produced at block 23. Finally, the preview page is provided at block 24 where the user can preview the selected album.

A Preferred Networked Embodiment for Incorporation with the Kiosk-Based System

While it can be appreciated that the in-store kiosk described above provides for a large selection of musical choices and a convenient access point for consumers, improvements can be made to increase the efficiency and capacity of the system. This embodiment provides for such improvements.

The kiosk-based network embodiment of the present invention utilizes many of the basic kiosk features as discussed above with the use of a telecommunications link to establish a point-of-preview on-line web site.

In the kiosk-based embodiment of the present invention, mass data storage capability is found at a central location, the web site, rather than at the kiosk itself. Furthermore, the operating environment is controlled via software resident on the web site instead of within memory at each individual kiosk. Instead of incorporating the memory and central processing of the system within each kiosk, this embodiment of the present invention provides for each kiosk to merely serve as an access terminal to the web site. The web site server therefore provides for a centralized location for storing the operating system software as well as data storage for the pre-selected portions of music products, associated artwork and text. As is conventional for this type of architecture, the web site server is able to service a plurality of kiosks across the country or across the world. Furthermore, by providing for a centralized storage and software point, updating the product data and software becomes a more efficient and cost effective process because the data and/or software need only be updated at the web site server instead of at each kiosk.

Figure 7:
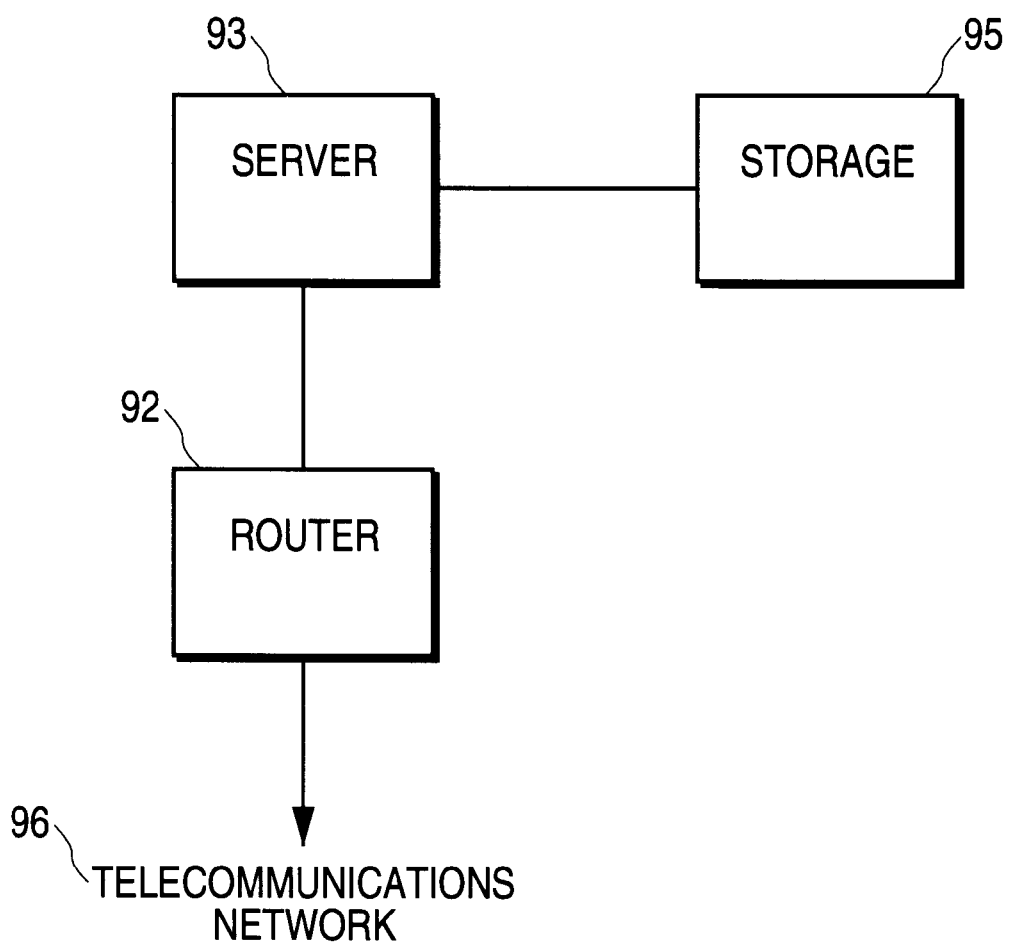
FIG. 7 is a block diagram of the hardware requirements for the network web site.
Figure 8B:
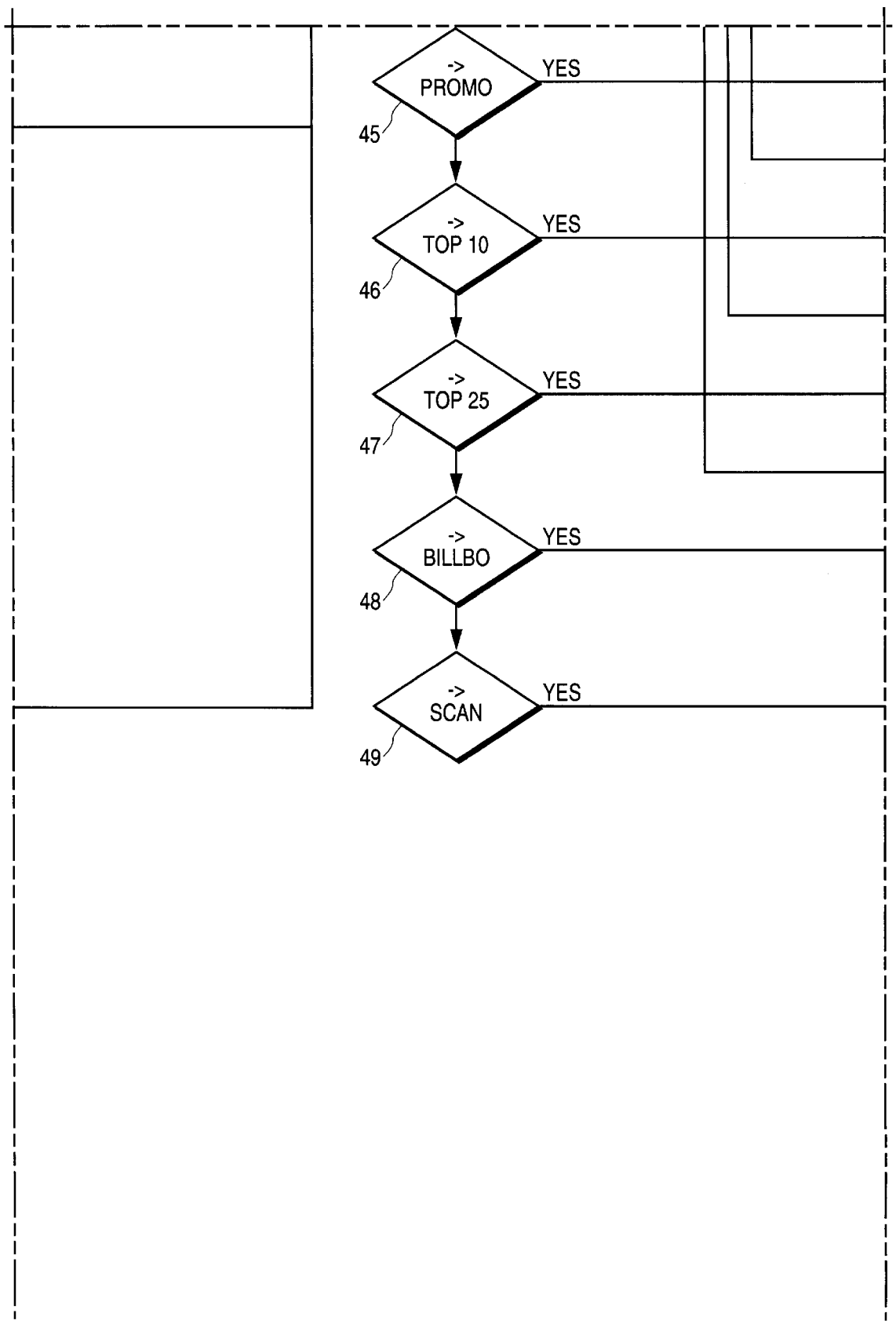
FIG. 8 is a flow diagram of the possible paths accessible by a user of the kiosk-based network embodiment.
Figure 8C:
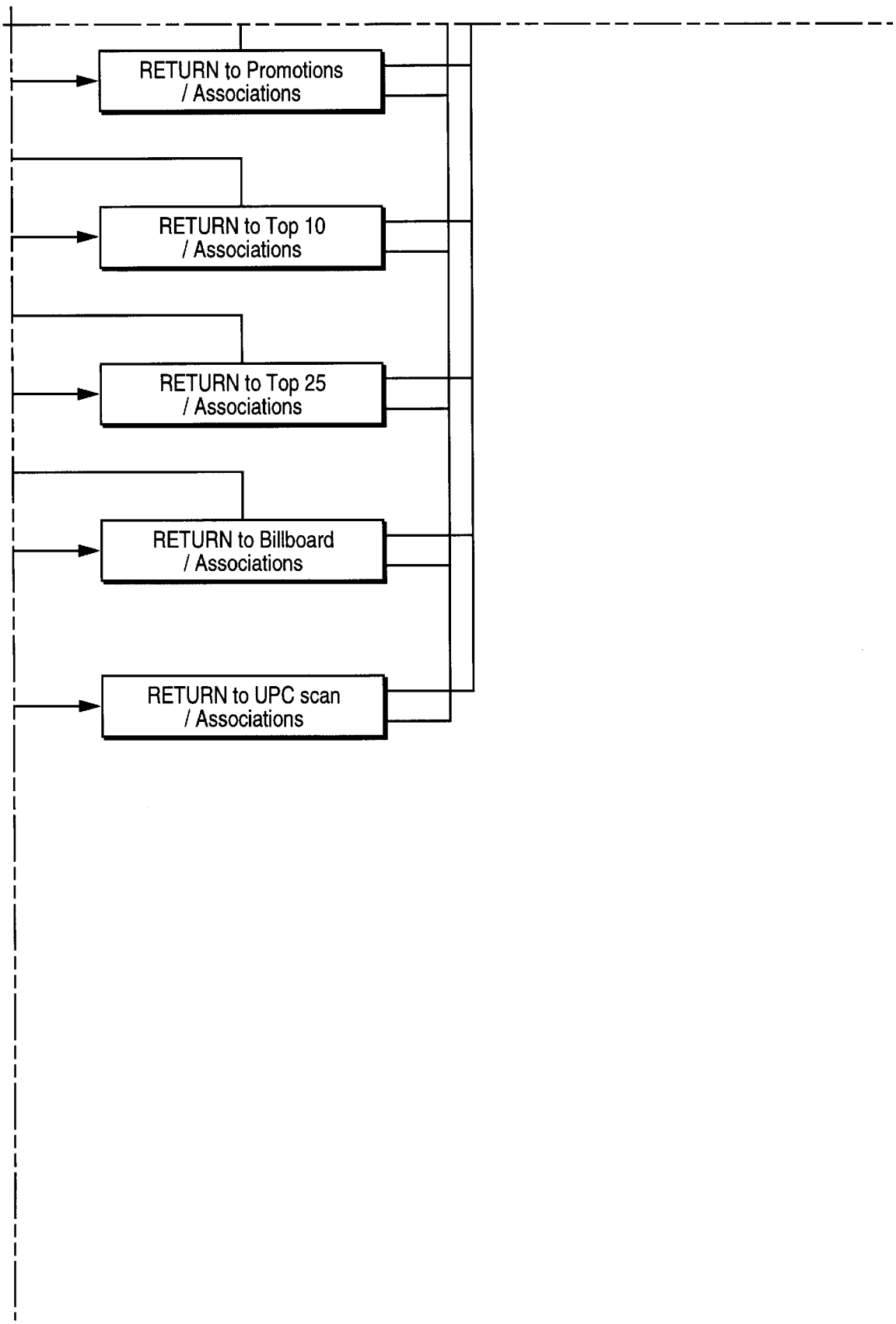
Figure 8D:
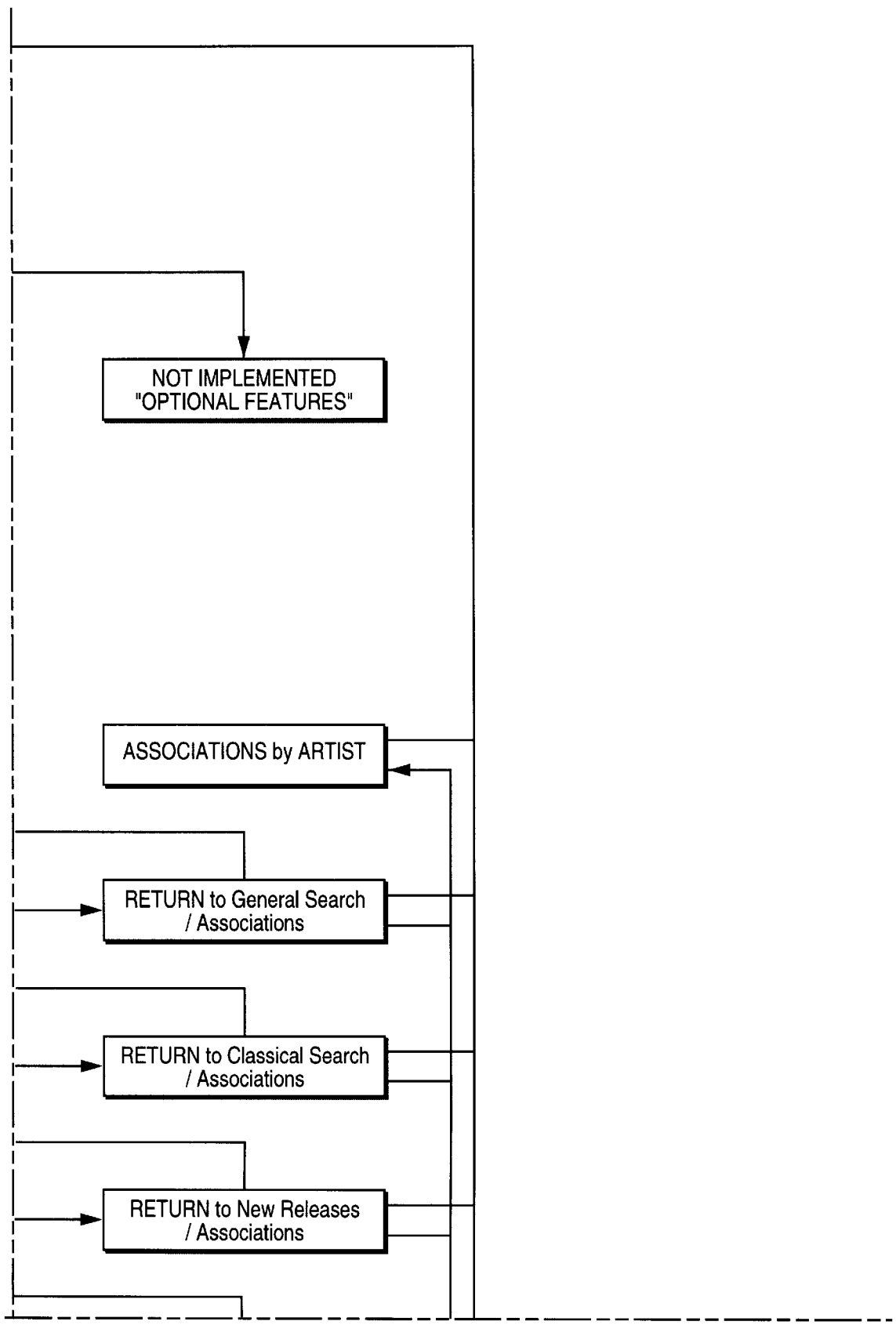
Figure 8E:
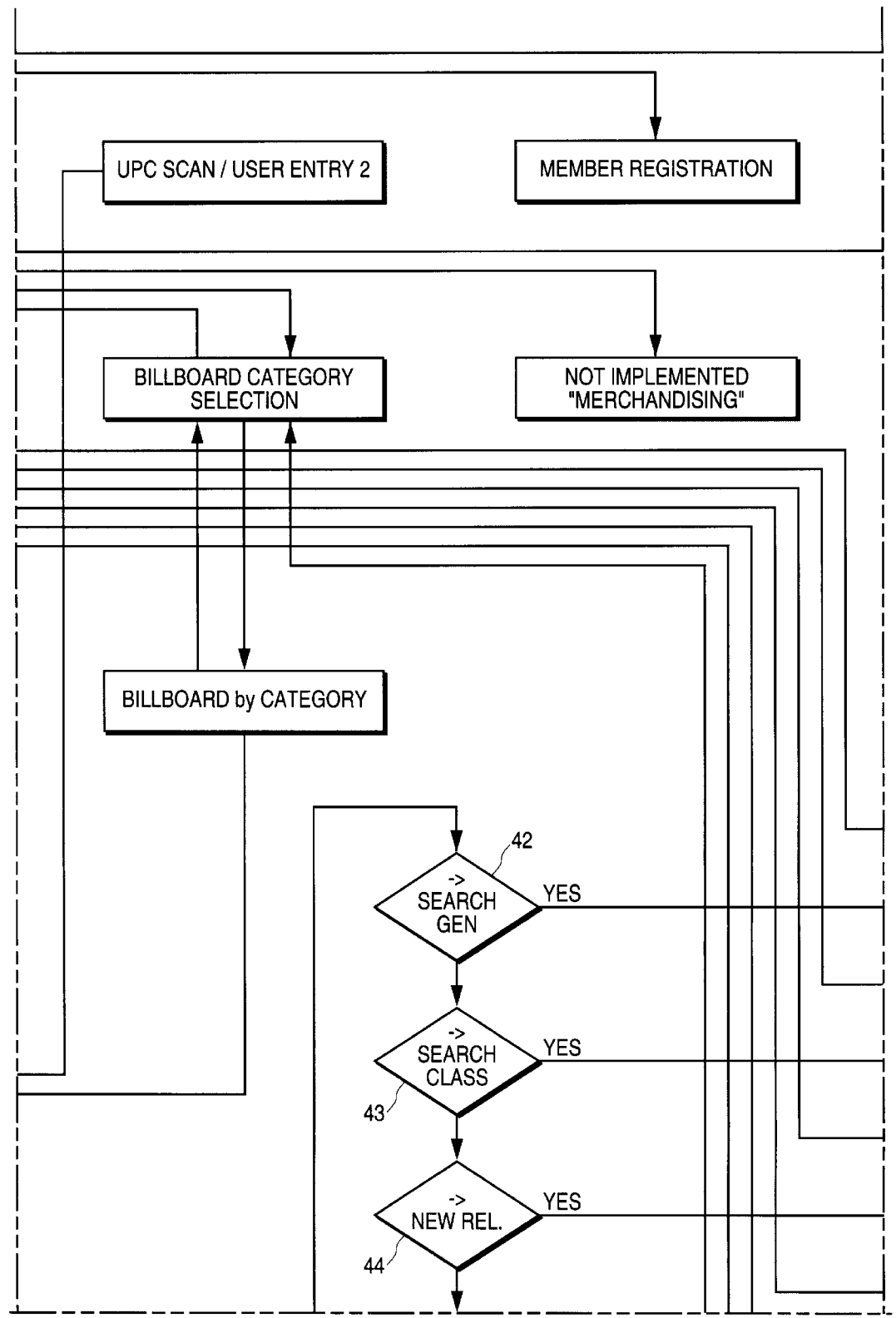
Figure 8F:
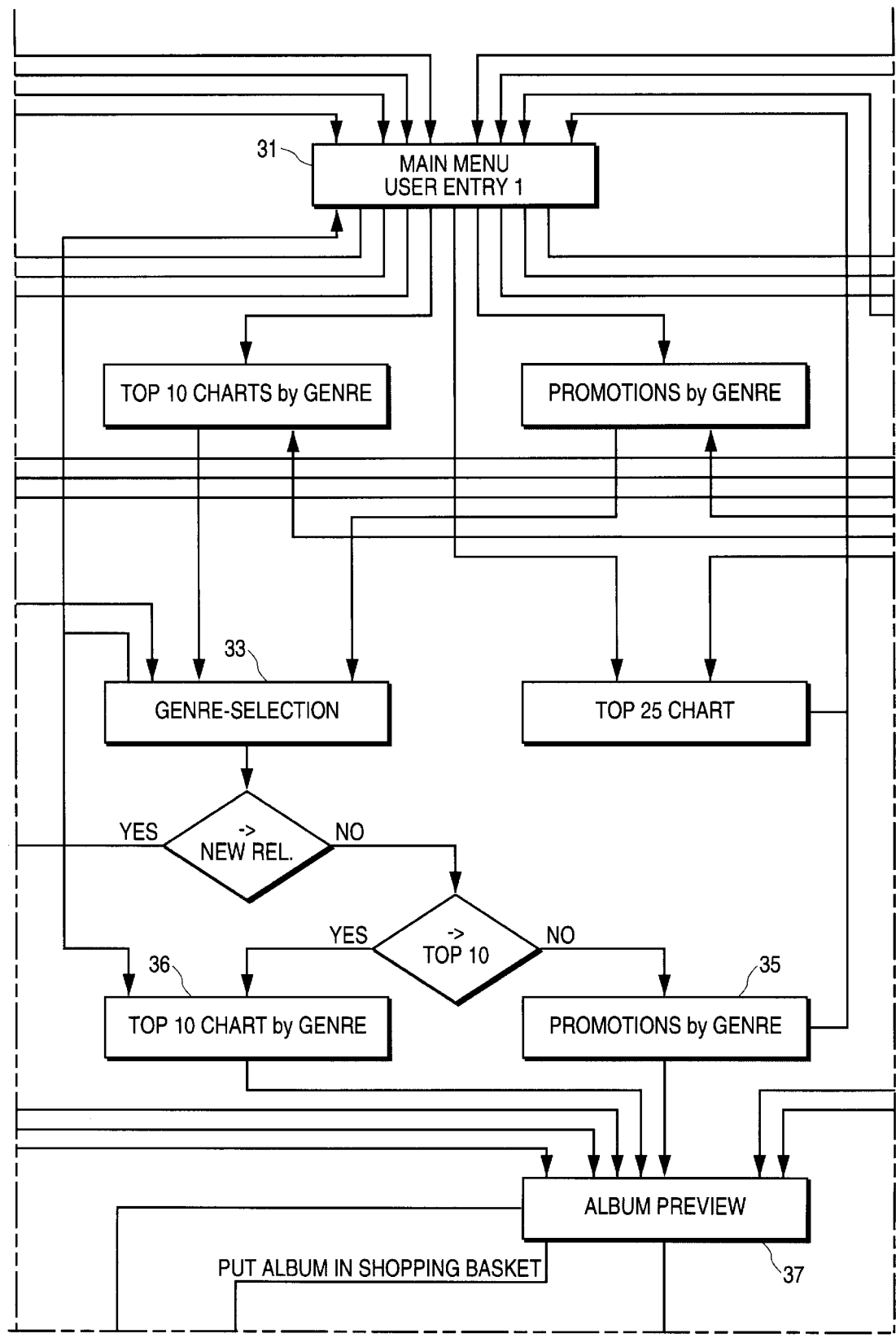
Figure 8G:
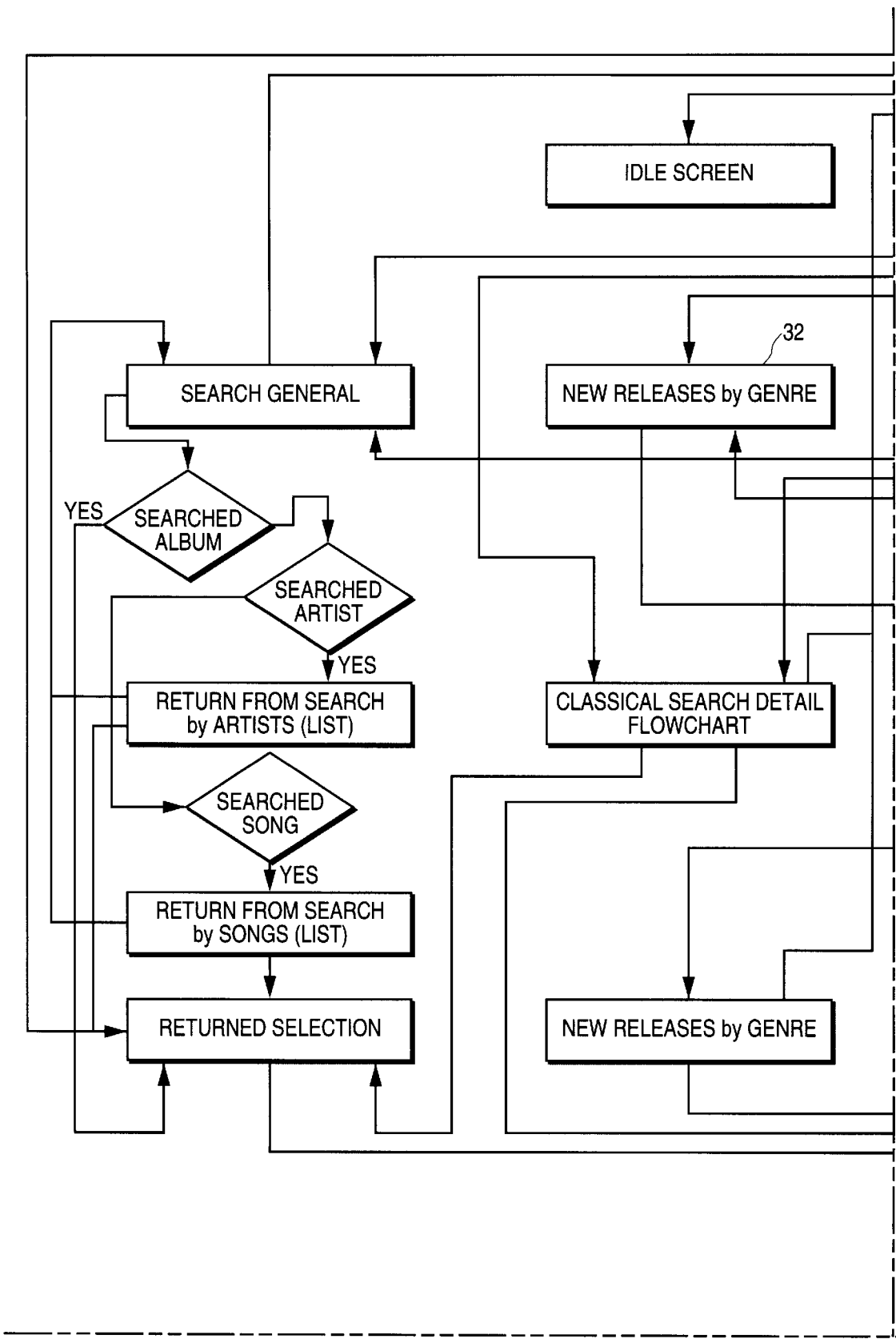

FIG. 7 illustrates a block diagram of the hardware requirements for the preferred kiosk-based network (i.e. internet) embodiment of the present invention. While described here using particular hardware elements, those skilled in the art will recognize that modifications can be made without departing from the scope and spirit of the present invention.

The preferred embodiment of the present invention incorporates an STI Silicon Graphics Unix Server (Model Name: "Challenge L") 93 which controls the basic operations of the web site. Stored within the server is the Silicon Graphics operating system and an Oracle database which has been created to contain all of the data for presentation the users, including but not limited to, the number of tracks within each music CD, the names of the tracks, etc. Additionally, the server 93 runs the Netscape Commerce Server which provides the http protocol for generating a web page. Additionally, the server 93 utilizes a RealAudio server (Progressive Networks, Seattle, Wash.) which streams the RealAudio data to the web site users through the network. This server 93 allows the user to play the audio selections directly from the web site on the kiosk. Additionally, the server 93 contains static HTML script files which are executed to provide users with the different web pages. In other words, the web pages are not stored and then merely displayed. Instead, the pages are dynamically generated whenever the web site user selects a page for viewing. In essence, these scripts tie the databases and their content together.

A 60 gigabyte RAID array drive 95 provides storage of data for generating the CD artwork and the pre-selected and pre-recorded portions of the music products (i.e., available audio samples) in two different formats, the "au" format and the "RealAudio" format. The "au" format requires that the user download the data to her location where she can play the audio sample. Web site user control of the audio sample playback (i.e. stop, play, seek, fast forward, rewind, etc.) depends on the specific software the user uses to playback the audio sample once the sample is downloaded to the web site user's computer. The "RealAudio" data format allows the user to playback the audio sample directly from the web site without having to download the audio sample. The RealAudio server provides the web site user with control over playback of the audio sample.

Within the web site server 93 is a network interface card (i.e. an ethernet card) (not shown) which allows connectivity to outside users. This network interface card is provided with the STI Silicon Graphics Unix Server. The network card 94 is connected to a router 92 (SISCO, Model 2500, Redwood City, Calif.) which connects the server 93 to an internet provider.

In order for a web site user to use the kiosk-based network web site embodiment to preview music products, she must first identify herself to the network web site server. This identification allows the web site server to uniquely associate events during web site usage, such as, for example, the user's searches, ratings and purchase requests, with a particular user. This information is very important for insuring that the correct purchase order is delivered to the right user. In addition, the user identification can also be used to gather accurate demographic information which can be correlated with events during web site usage, such as, for example, the user's ratings.

The step of web site user identification to the web site server can be accomplished using a number of different known methods. It is not particularly critical which method is used. For example, the web site user can enter an identification (ID) name or number which is assigned by the web site server (or chosen by the user) upon completion of a membership application. Alternatively, a credit card number, phone number or address can be used to uniquely identify the web site user. These web site user IDs can be entered using a number of different methods. For example, using a keyboard or touchscreen display keyboard simulation to type in the web site user's name or number. A bar code reader can also be used to scan ID number from an ID card. Alternatively, the user identification can be automatically provided upon access (i.e. sign-on or log-on) to the web site server either by the internet service provider directly or by the local terminal. Each and every one of these different techniques of establishing a user ID with the web site server is considered to be within the scope of the present invention.

In the preferred kiosk-based network embodiment of the present invention, the user enters her unique identification in the form of the user's name and password in order to access the web site server. The first time a user gains access to the web site server, the user completes a membership application which requests specific demographic information about the user (e.g. age, sex, etc.). The user is then able to select a password which will correspond with her name. The user's name is then assigned an 11 digit ID. Upon all subsequent accesses to the web site, the user's events will be linked with the information provided in the membership application. The web site server maintains a database of which pages are accessed by the user, which pre-selected portions of music products are downloaded, and what ratings the users give to particular samples.

Once the user has identified herself and gained access to the web site server, she can then preview pre-selected portions of music products and enter purchase requests. FIGS. 9–33 illustrate a sequence of screen displays from a preferred embodiment, the web site for incorporation with an in-store kiosk (the "HI Station"). This example is provided for illustrative purposes and is not intended to limit the present invention to these particular screen display layouts or the corresponding functions. It should be apparent to one skilled in the art that numerous layout designs and corresponding functions can be employed without departing from the scope and spirit of the present invention.

In order to provide for a more user friendly environment at the in-store kiosk, a touch screen format is employed wherein different "hot zones" are established on the screen. Thus, by touching one of these hot zones, a user is able to execute particular functions (i.e. go to the next screen, select an album for preview, etc.) without the need for operation of a separate hardware peripheral device such as a mouse or trackball. However, other well known means for allowing a user to enter commands can also be incorporated (i.e. a keyboard, a scanner, a mouse, etc.).

FIG. 8 illustrates a flow diagram of the possible paths accessible by a user of the kiosk-based network embodiment. This diagram is similar to FIG. 5 for the original kiosk invention.

Figure 10:
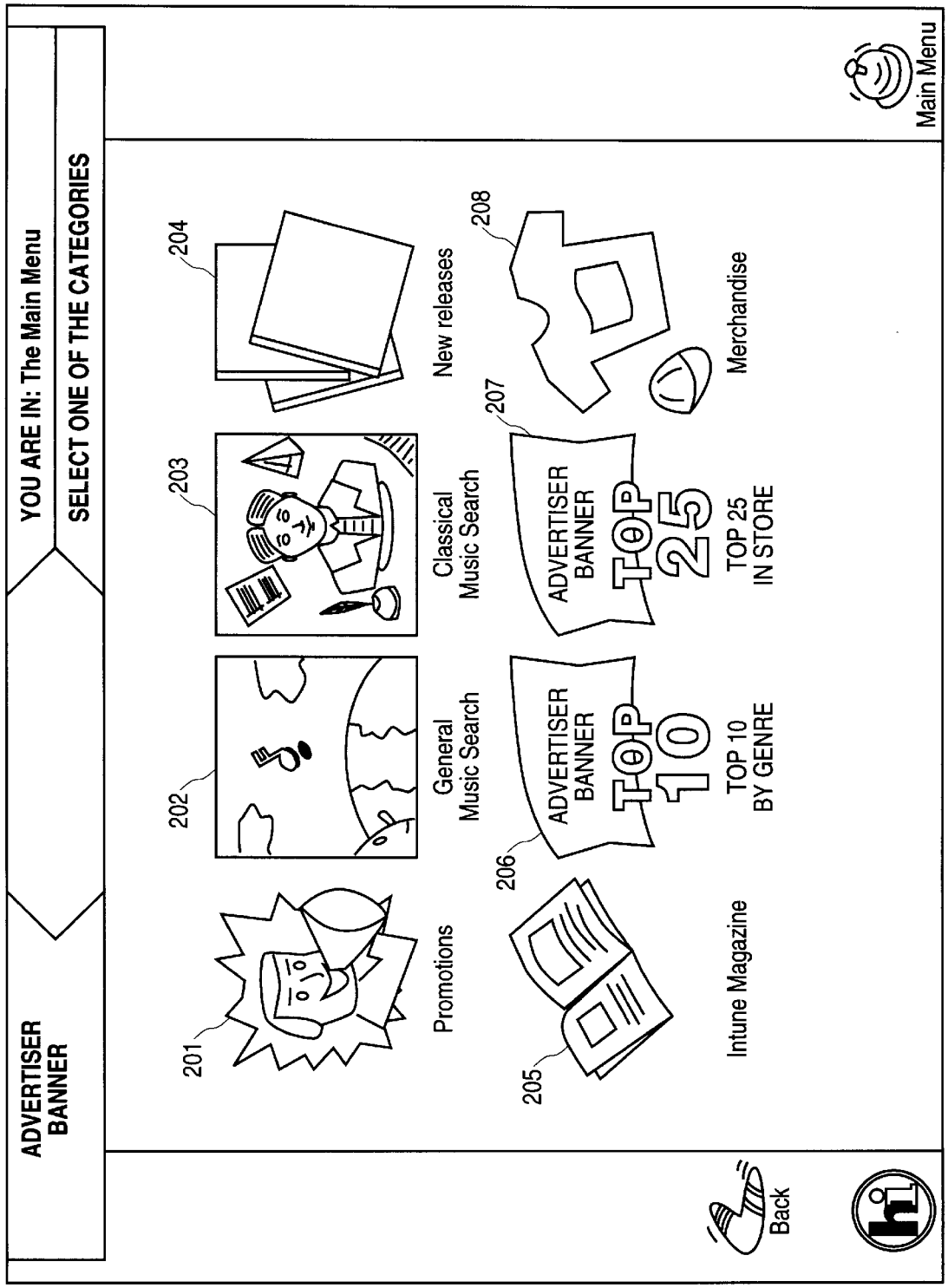

Starting at screen 31, a user is shown the main menu (see FIG. 10). From here, she can select any of the different choices (i.e. general search, new releases by genre, Top 10 chart, etc.). If she chooses the new releases by genre, she is taken to screen 33 which illustrates the genre selections available. Depending on the user's selection from this screen 33, she can choose the Top 10 chart by genre screen 36 or the Promotions by genre screen 35. Once she chooses a CD from either of these screens, she is taken to the Album Preview screen 37. From this screen 37 she can preview any of the pre-selected and pre-recorded music products. If she previews one of the music products, she is asked at screen 39 to rate the previewed music product. Then depending on the availability of the selection, a printed record or order slip of the selection is provided. From there, the user can proceed through the web site again. This is accomplished by selecting one of the different paths 42–49 which returns the user to the corresponding branches from the original main menu screen 31.

It should be noted from this flow chart that regardless of which searching tool is used (i.e. General Search, New Releases By Genre, Top 10 Charts By Genre), the user always ends up at the Album Preview screen 37. The different searching tools merely vary the manner in which the user gets to the Album Preview screen 37.

Figure 9:
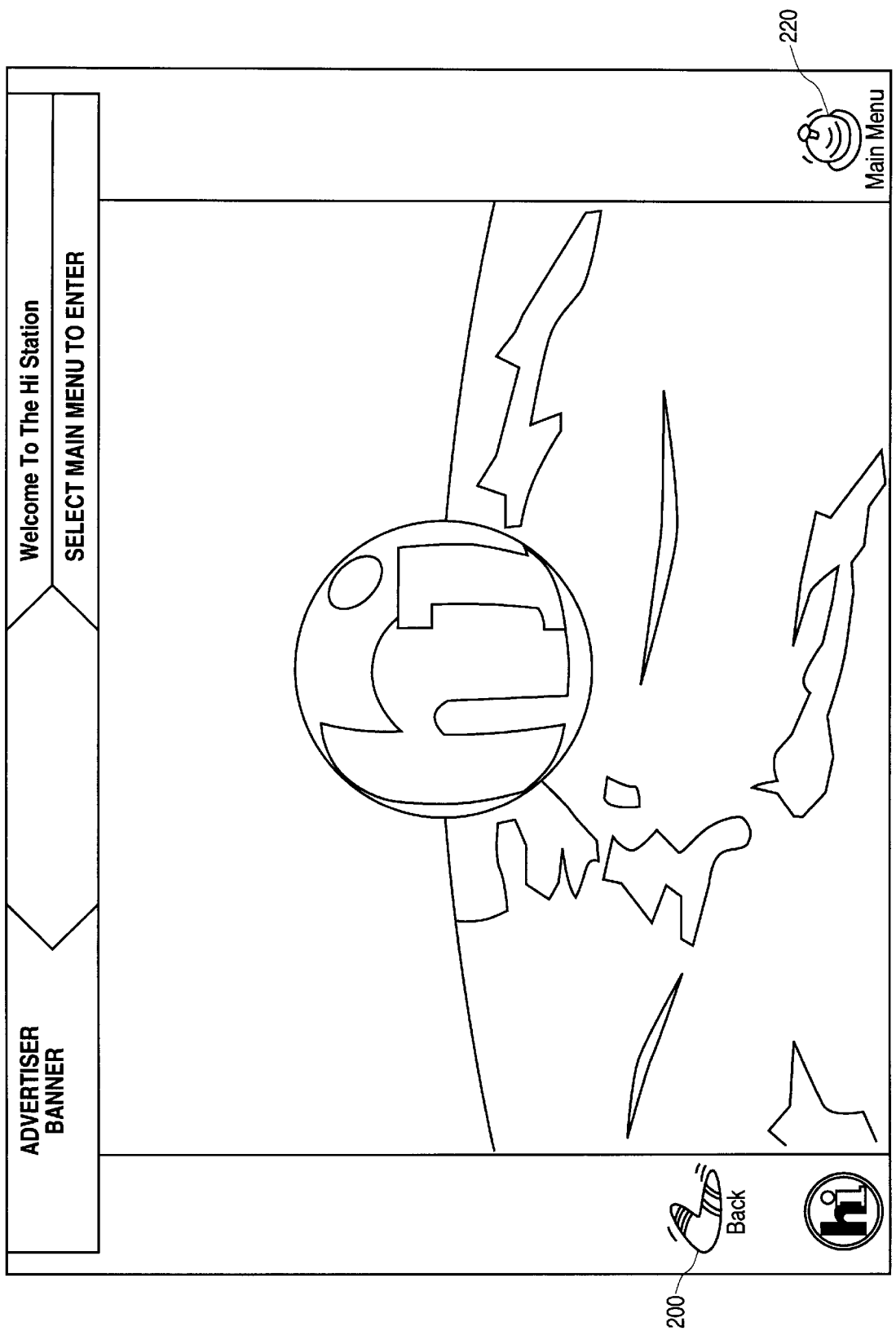
FIGS. 9–33 are screen shots of display screens that are accessible by a user in the kiosk-based network embodiment of the present invention.

Example screens of the kiosk-based network embodiment are now discussed in more detail. The start screen is illustrated in FIG. 9. This screen has two hot zones 200, and 220 which provide the user with control over her direction of travel through the web site. Hot zone 200 allows the user to travel back to the preceding screen and hot zone 220 allows a user to access the main menu. These hot zones are provided on each screen as the user travels through the web site.

FIG. 10 illustrates the main menu screen which allows the user to access particular paths by selecting (i.e. touching) specific hot zones 201–208. Although a number of different paths can be incorporated, the preferred embodiment described here includes a "Promotions" path (hot zone 201), a "General Music Search" path (hot zone 202), a "Classical Music Search" path (hot zone 203), a "New Releases" path (hot zone 204), an "Intune magazine" path (hot zone 205), a Top 10 By Genre" path (hot zone 206), a "Top 25 In Store" path (hot zone 207) and a "Merchandise" (hot zone 208) path. These path names are self-explanatory.

Figure 11:
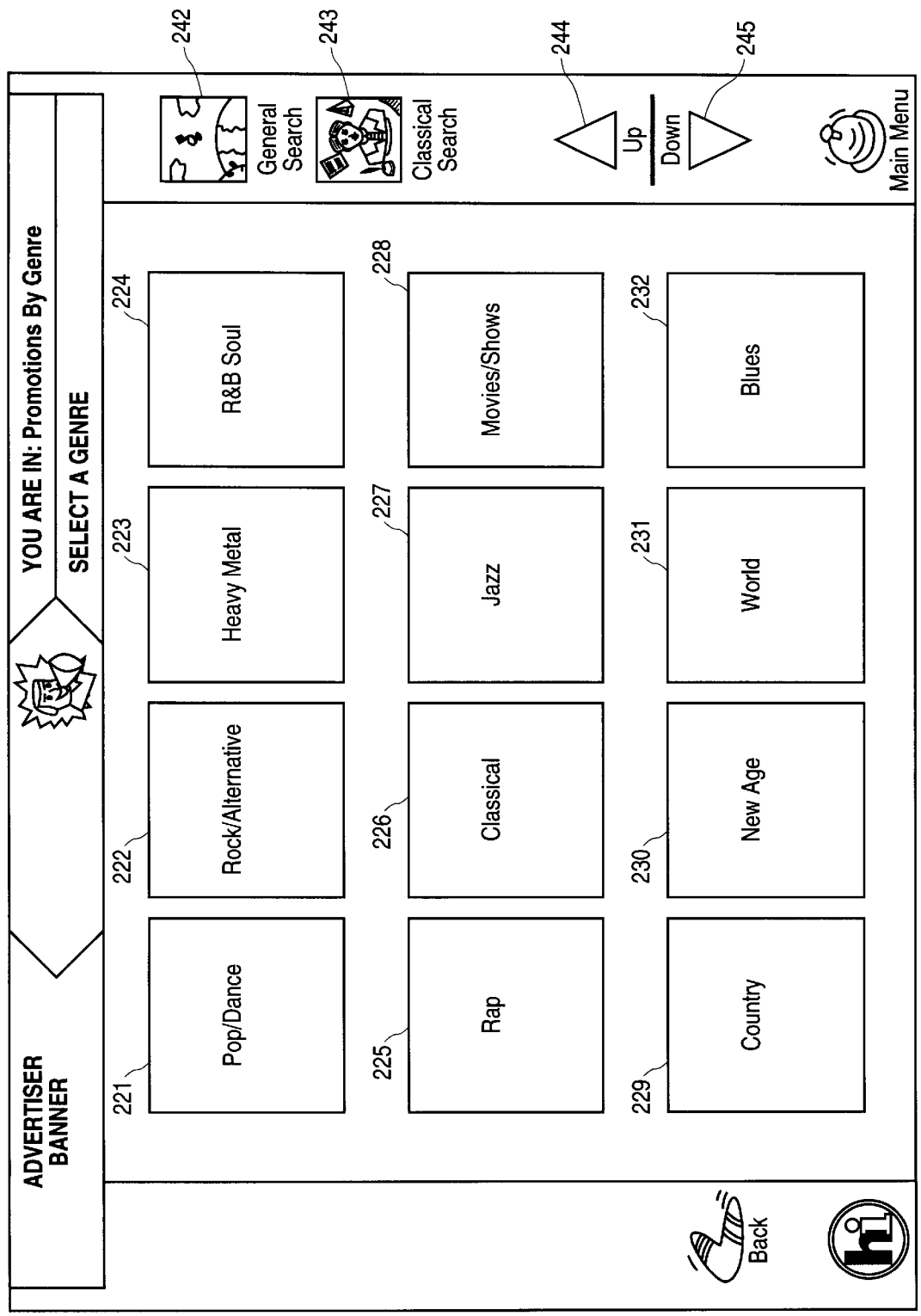
Figure 12:
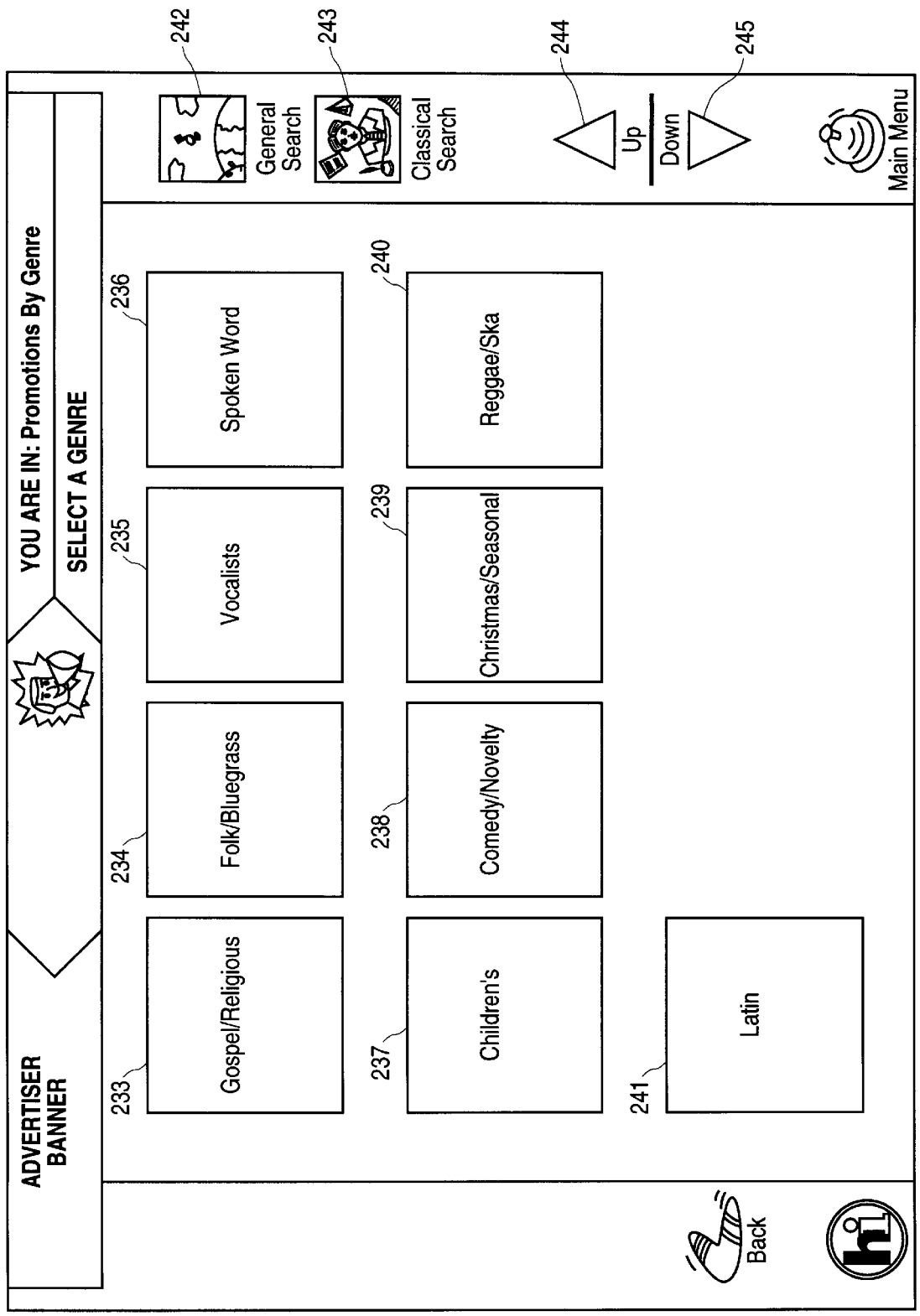

By choosing the "Promotions" path (hot zone 201), a user to taken to the "Promotions By Genre" screens shown in FIGS. 11 and 12 which allow the user to select particular musical genres (see hot zones 221–241) in which their target musical interests fall. Although not limited to any particular number or types of genres, the preferred embodiment of the present invention includes a "Pop/Dance" genre (hot zone 221), a "Rock/Alternative" genre (hot zone 222), a "Heavy Metal" genre (hot zone 223), a "R&B Soul" genre (hot zone 224), a "Rap" genre (hot zone 225), a "Classical" genre (hot zone 226), a "Jazz" genre (hot zone 227), a "Movies/Shows" genre (hot zone 228), a "Country" genre (hot zone 229), a "New Age" genre (hot zone 230), a "World" genre (hot zone 231), a "Blues" genre (hot zone 232), a" Gospel/Religious" genre (hot zone 234), a "Vocalist" genre (hot zone 235), a "Spoken Word" genre (hot zone 236), a "Children's" genre (hot zone 237), a "Comedy/Novelty" genre (hot zone 238), a "Christmas/Seasonal" genre (hot zone 239), a "Reggae/Ska" genre (hot zone 240), and a "Latin" genre (hot zone 241)

By selecting a particular genre, the user is able to access promotional albums or singles which fall within that genre. The hot zones 242 and 243 allow the user to quickly access the General Search and Classical Search paths without having to backtrack to the Main Menu screen shown in FIG. 10. It should be noted that these hot zones or similar hot zones may be located in the right margin of the screens which allow the user to quickly access specific paths without having to backtrack to preceding screens. The Up and Down arrows 244 and 245 on the right of the screen allow the user to scroll through the different genre selections. It should again be noted that identical Up and Down arrows are located on many if not all of the screens utilized in the preferred embodiment of the present invention. They perform the same operations on the different screens.

Figure 13:
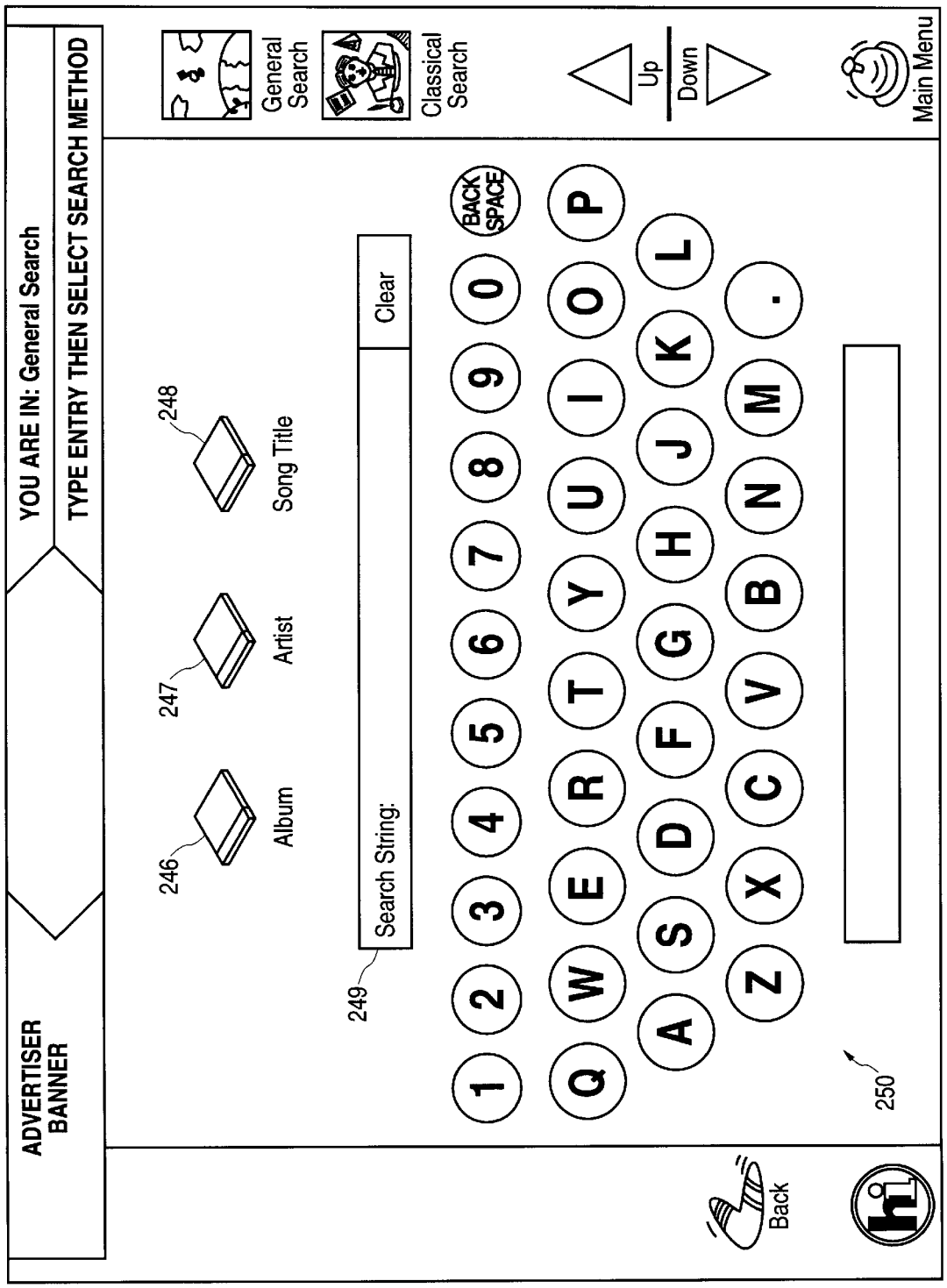

By choosing the "General Search" path (i.e. hot zone 202 from FIG. 10 or hot zone 242 from FIGS. 11 & 12), a user is taken to the "General Search" screen shown in FIG. 13. This screen allows users to perform key word searches in different categories such of album genre (hot zone 246), artist genre (hot zone 247) and song title genre (hot zone 248). Because a touch screen is incorporated into this example embodiment, the user need only touch the appropriate letters on the keyboard 250 illustrated on the computer screen to enter her search terms.

It should be noted that once a particular musical piece (i.e. song or album) is selected, the proper data corresponding to that selection must be called from memory including the appropriate CD wherein the musical samples are stored. Although these musical pieces can be identified by any identification scheme, the preferred embodiment incorporates the product code established by the manufacturer or distributor. This allows for convenient and efficient ordering of the musical pieces once a purchase order is submitted. Therefore, ever though a user may input an album or song title, the web site will translate that request into the corresponding product code in order to call the appropriate data. In the preferred embodiment, the audio samples are identified by the following designation: UPC_number.disk_ number.track_number.format(au or RealAudio).

Figure 14:
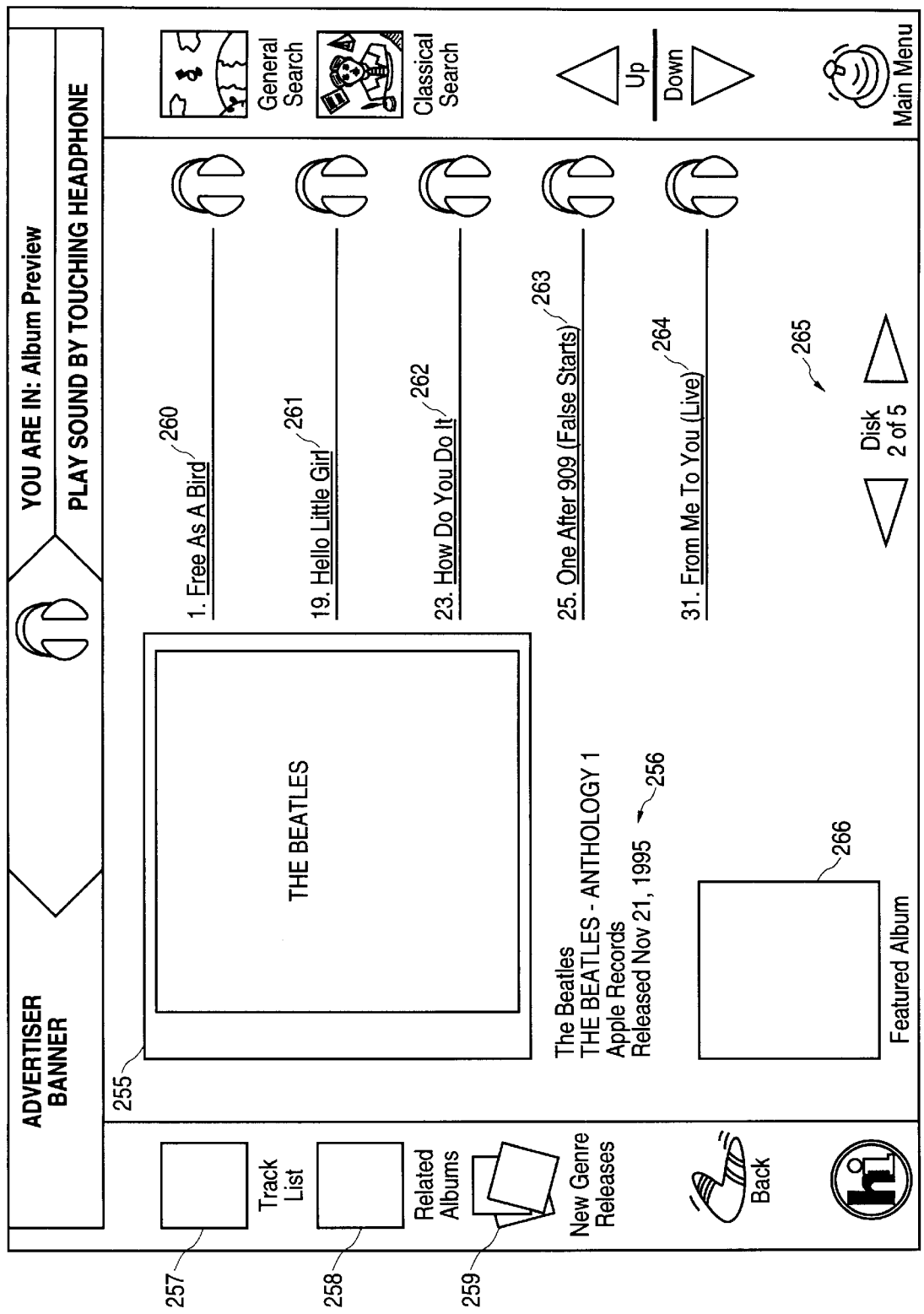

FIG. 14 illustrates an "Album Preview" screen which can be accessed by different preceding screens (i.e. from the search screens, the promotions screens, etc.). The Album Preview screen allows the user to view the album cover 255, information about the album 256 and a list of the song tracks that have been sampled 260–264. Portions of the sampled tracks 260–264 can be selected for playback by the user. As an optional feature, the system can be programmed to provide interactive control of the song playback wherein the user can control the speed of the playback, pause the playback, repeat a specific portion, skip to the next portion, etc. Also illustrated are back and forth arrows 265 which allow the user to select between any of the five disks included in the selection (i.e. Beatles Anthology).

Also illustrated in the left margin of FIG. 14 are hot zones for a "Track List" 257 which allows the user to view a complete list of the tracks on the illustrated album 255, a hot zone for "Related Albums" 258 which allows the user to sample albums related to the currently selected album, and a hot zone for "New Genre Releases" 259. In the lower left corner of the screen is a "Featured Album" hot zone 266 which allows the user to quickly access a "Featured Album" which may be pre-selected or randomly chosen by the system.

Figure 15:
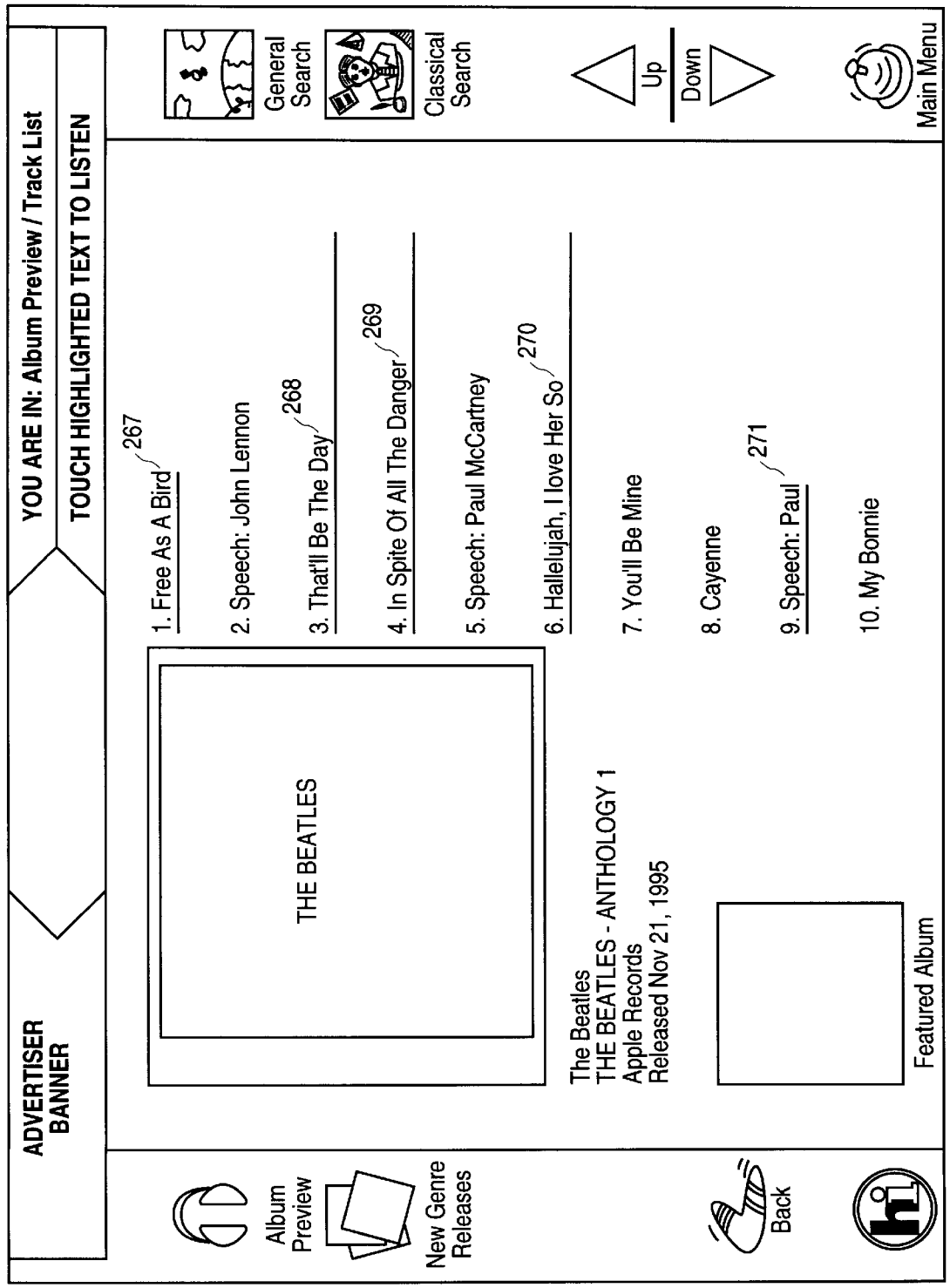

FIG. 15 provides a list of the album tracks which can be accessed by selecting the hot zone "Track List" hot zone 257 illustrated in the preceding screen. Those tracks that have been sampled 267–271 are underlined. By selecting any of these highlighted tracks, a user is able to listen to that sample.

Figure 16:
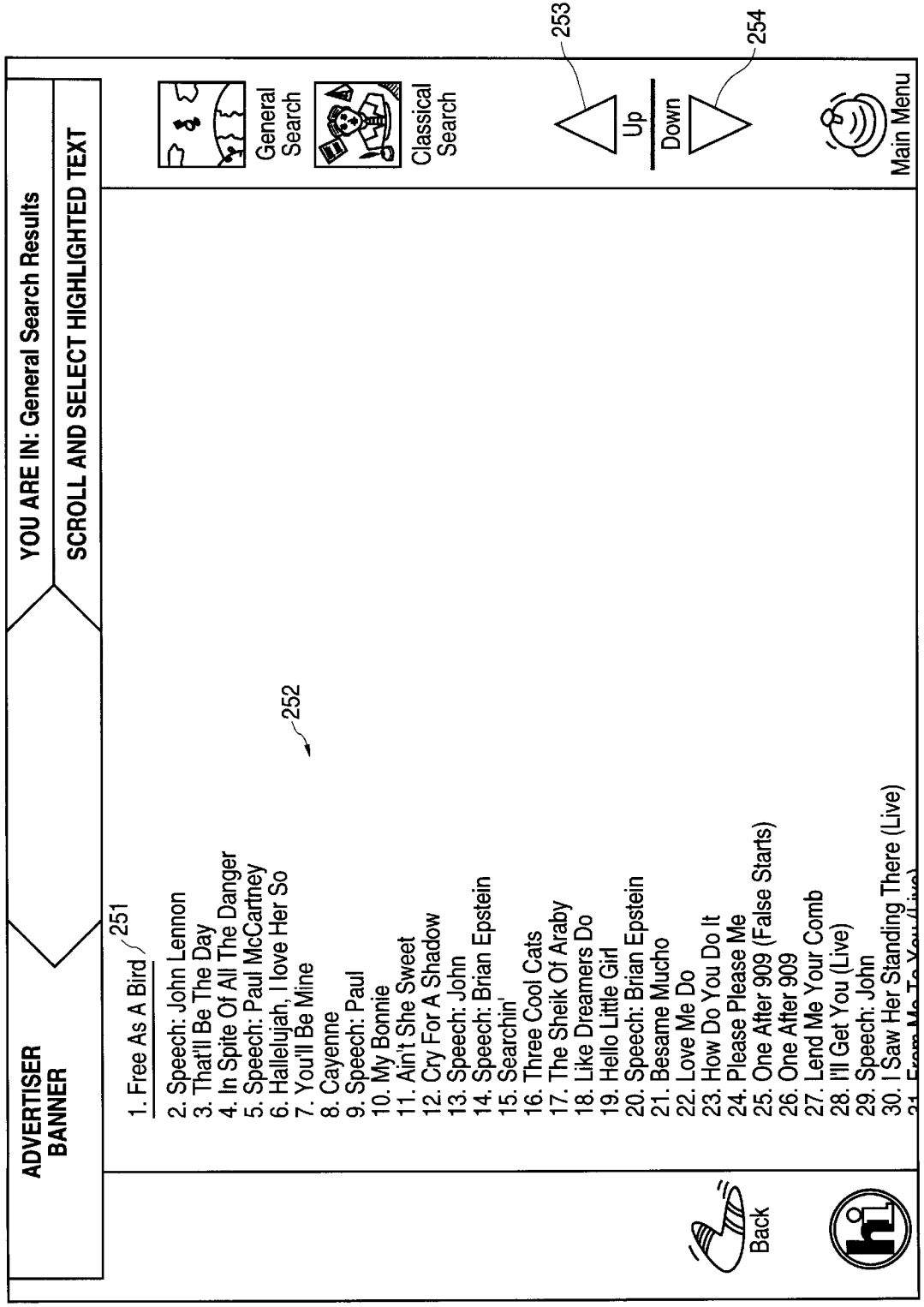

FIG. 16 illustrates the complete track list from the album illustrated in FIG. 14. By scrolling with the Up and Down buttons 253 and 254 until the desired work is highlighted, the user can access the work and related information (i.e. information on which album the song is located). If the first element "Free As A Bird" 251 is selected, that selection is provided.

Figure 17:
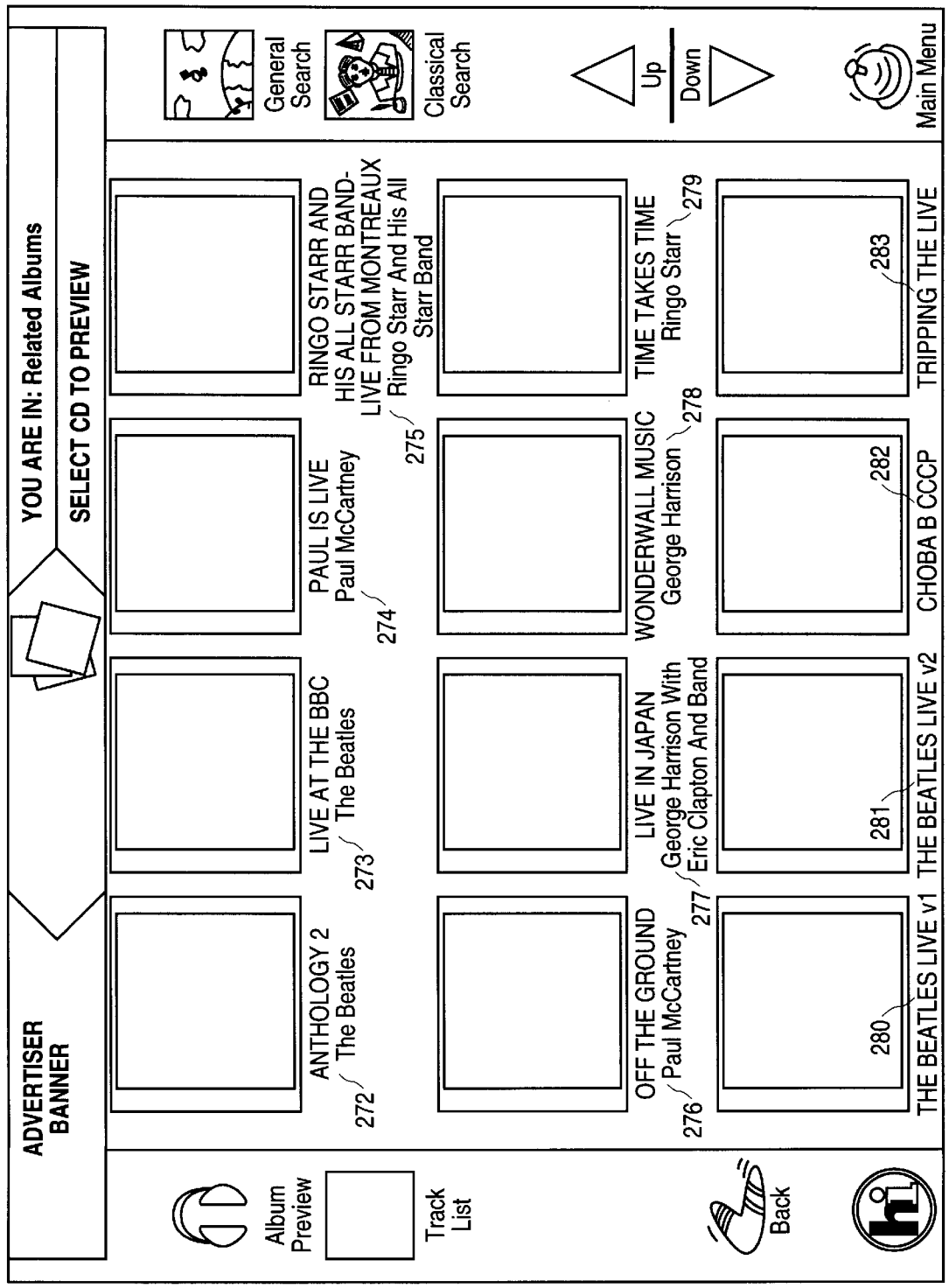

FIG. 17 provides cover illustrations of related albums 272–283 that can be accessed by selecting the "Related Albums" hot zone 258 shown in FIG. 14. The albums identified by the web site as related albums are determined by administrators of the web site server. When a new song or album is stored in the system storage, the administrator determines which albums will be accessed when the related albums function is accessed. The parameters used in determining which albums will be designated as a "related album" include, for example, other albums with the same artist. Once a related album list is generated, that list is linked with the new song or album. When a web site user selects the related albums feature, a script is executed which locates the appropriate related albums list and provides the web site user with access to the related albums on the list.

Figure 18:
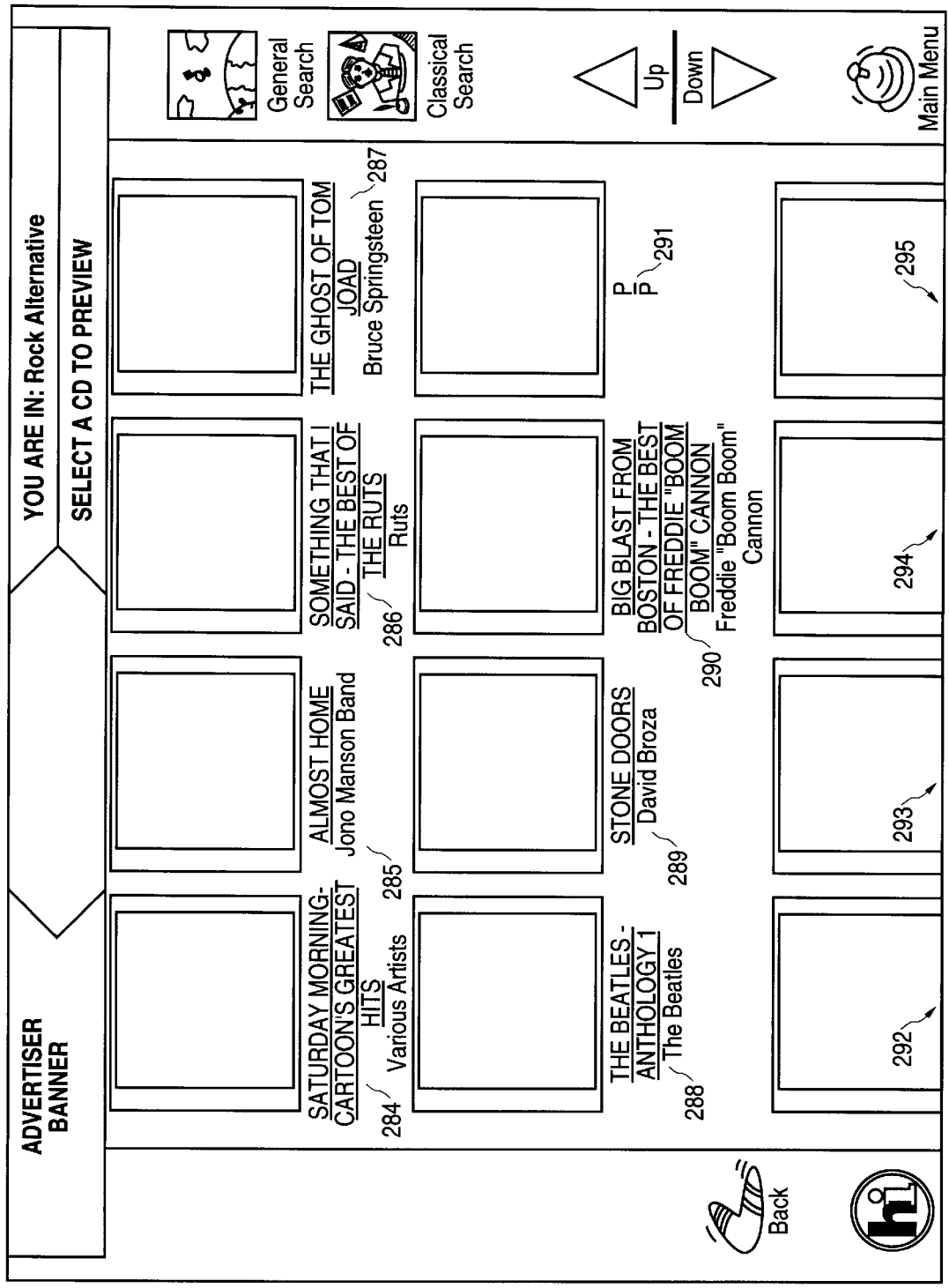

FIG. 18 illustrates the "Rock Alternative" screen which provides album covers 284–295 of alternative rock performers. This screen can be accessed, for example, by selecting the rock alternative hot zone 222 shown in FIG. 11.

Figure 19:
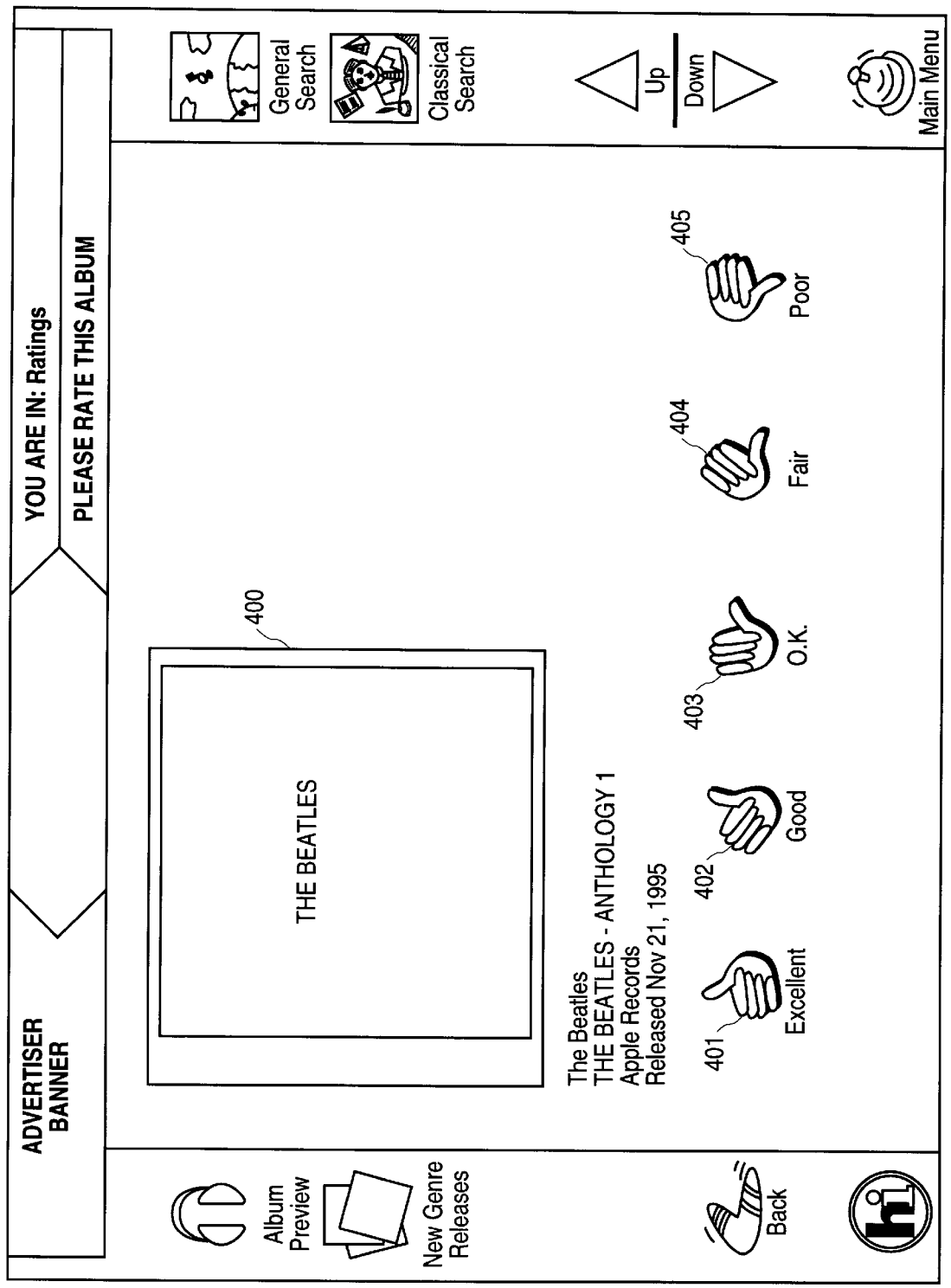

According to the preferred embodiment of the present invention, once a user has previewed an album or a particular track from an album, the network web site prompts her for a rating of the selection. FIG. 19 illustrates a "Sample Ratings" screen wherein the user is provided with an image of the album or track 400 he or she has just previewed, and a five scale rating system 401–405. The system maintains the ratings in a database and correlates the ratings information with the user's ID and demographic information (e.g., age, sex, geographic location, etc.). These ratings and corresponding demographic information can be sold to music companies in the form of reports for market research. The format of the reports can be customized depending on the parameters chosen. It is a simple procedure to gather information from a database using particular parameters.

Figure 20:
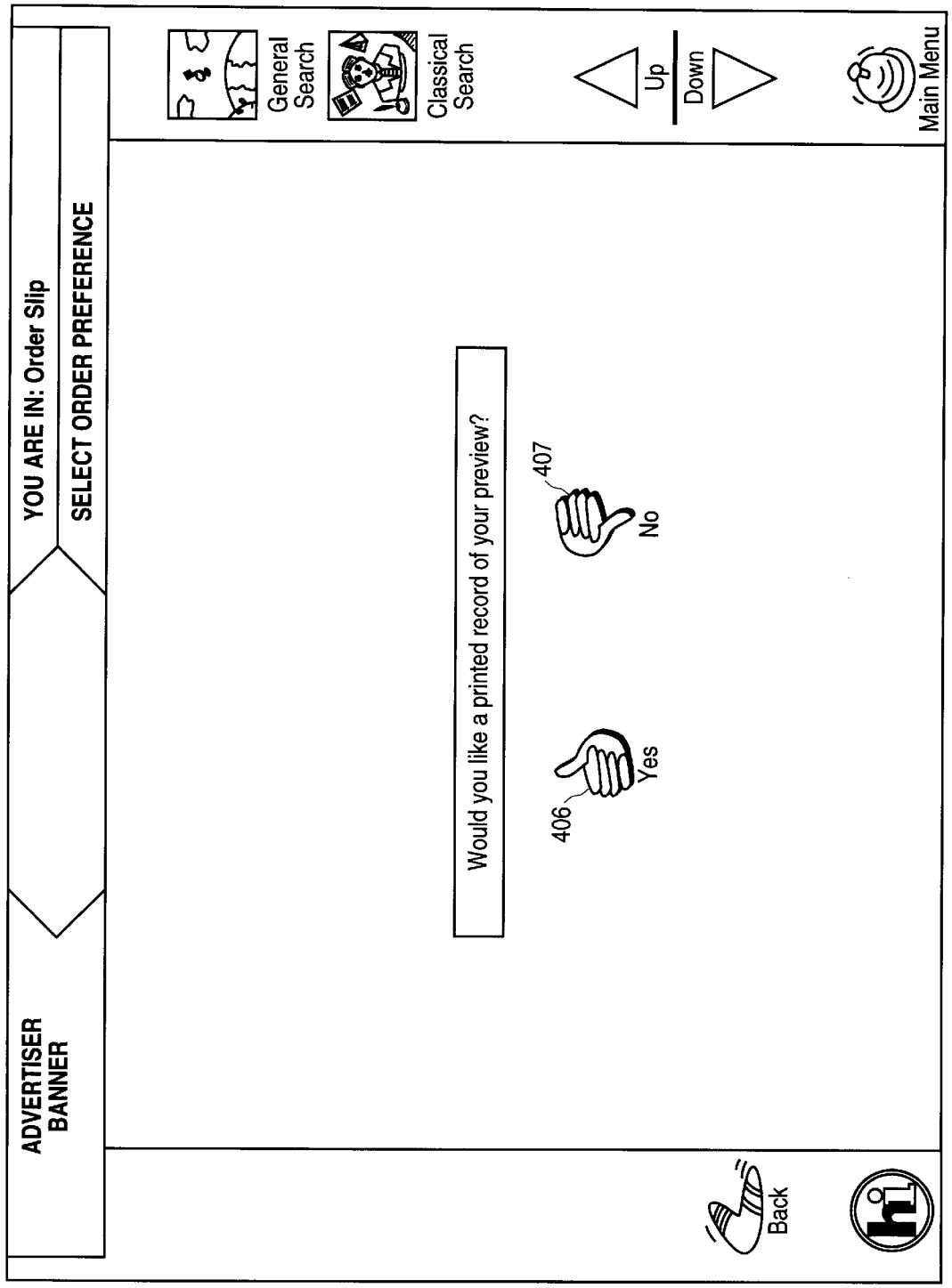

Following a user's preview of a selected album or track, FIG. 20 allows the user to receive a printed record of their preview ("Yes": hot zone 406, "No": hot zone 407). For example, the printed record can include the title of the album, the included tracks and the rating given by the user.

Figure 21:
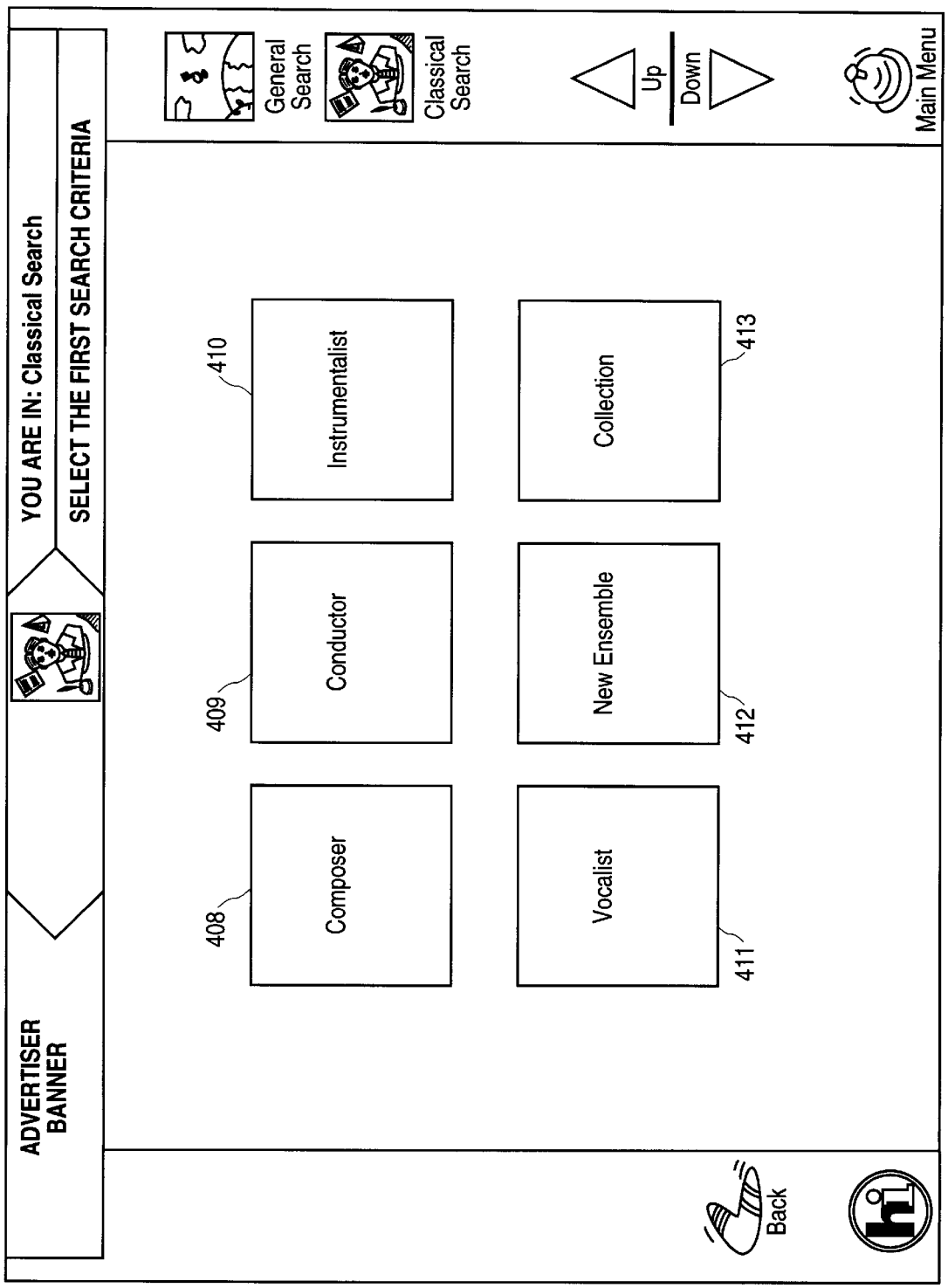

FIG. 21 illustrates the initial screen for conducting a classical music search. The screen illustrates six hot zones 408–413 which allow a user to perform searches in particular classical music categories (i.e. paths). Although not limited to particular types or a particular number of categories, the preferred embodiment of the present invention includes a "Composer" category (hot zone 408), a "Conductor" category (hot zone 409), an "Instrumentalist" category (hot zone 410), a "Vocalist" category (hot zone 411), an "Ensemble" category (hot zone 412) and a "Collection" category (hot zone 413). These path names are self-explanatory.

Figure 22:
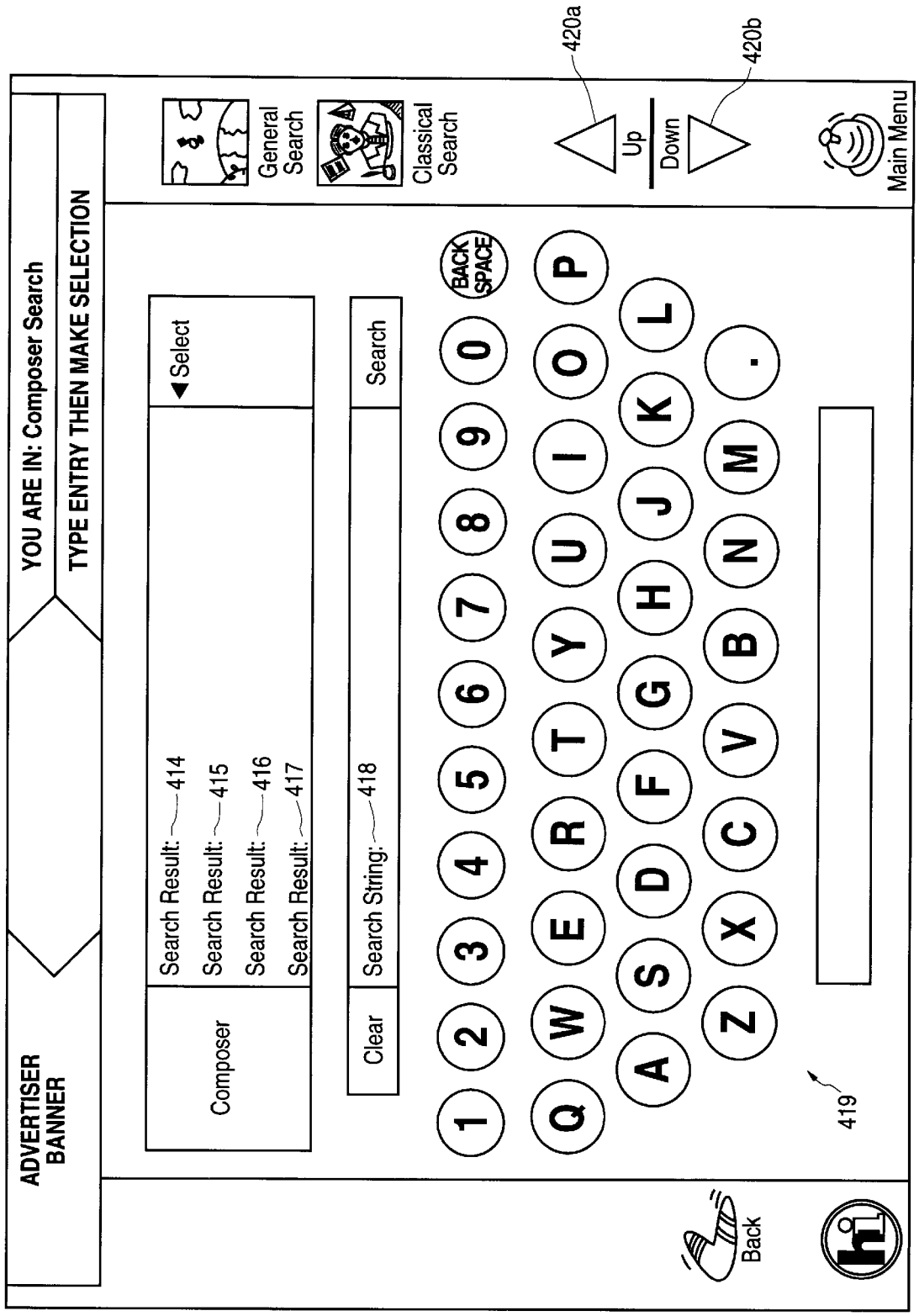
Figure 23:
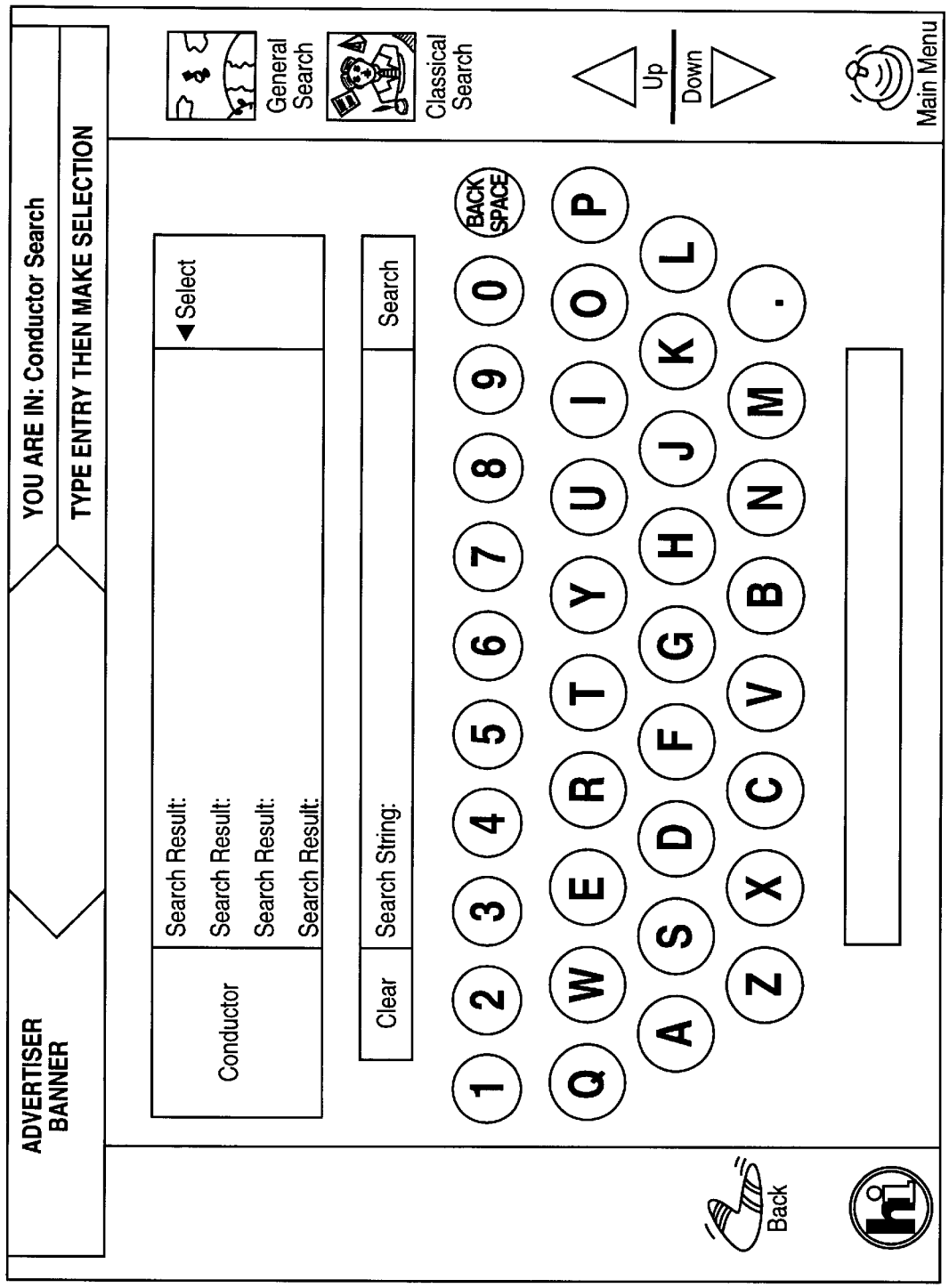
Figure 24:
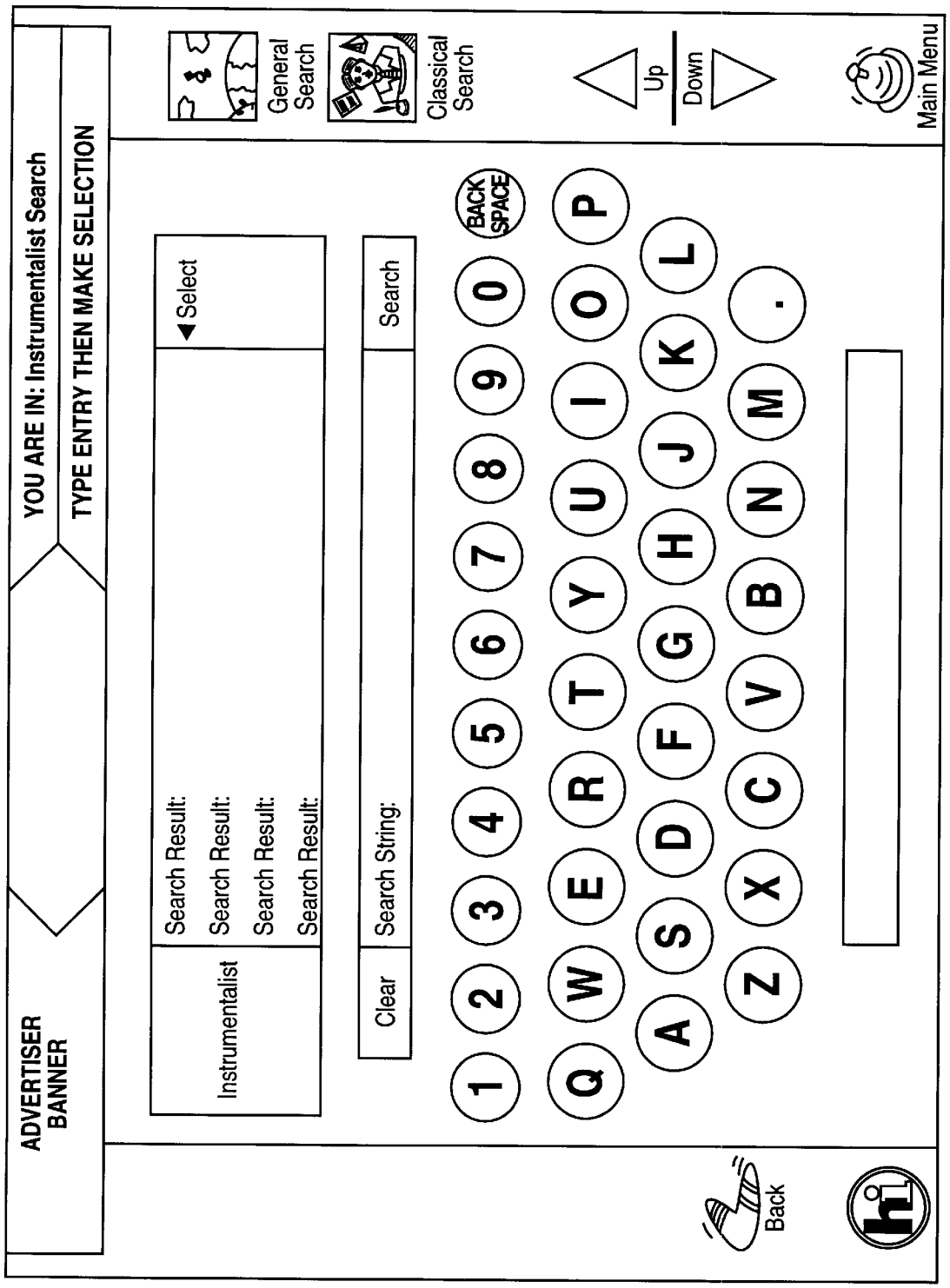
Figure 25:
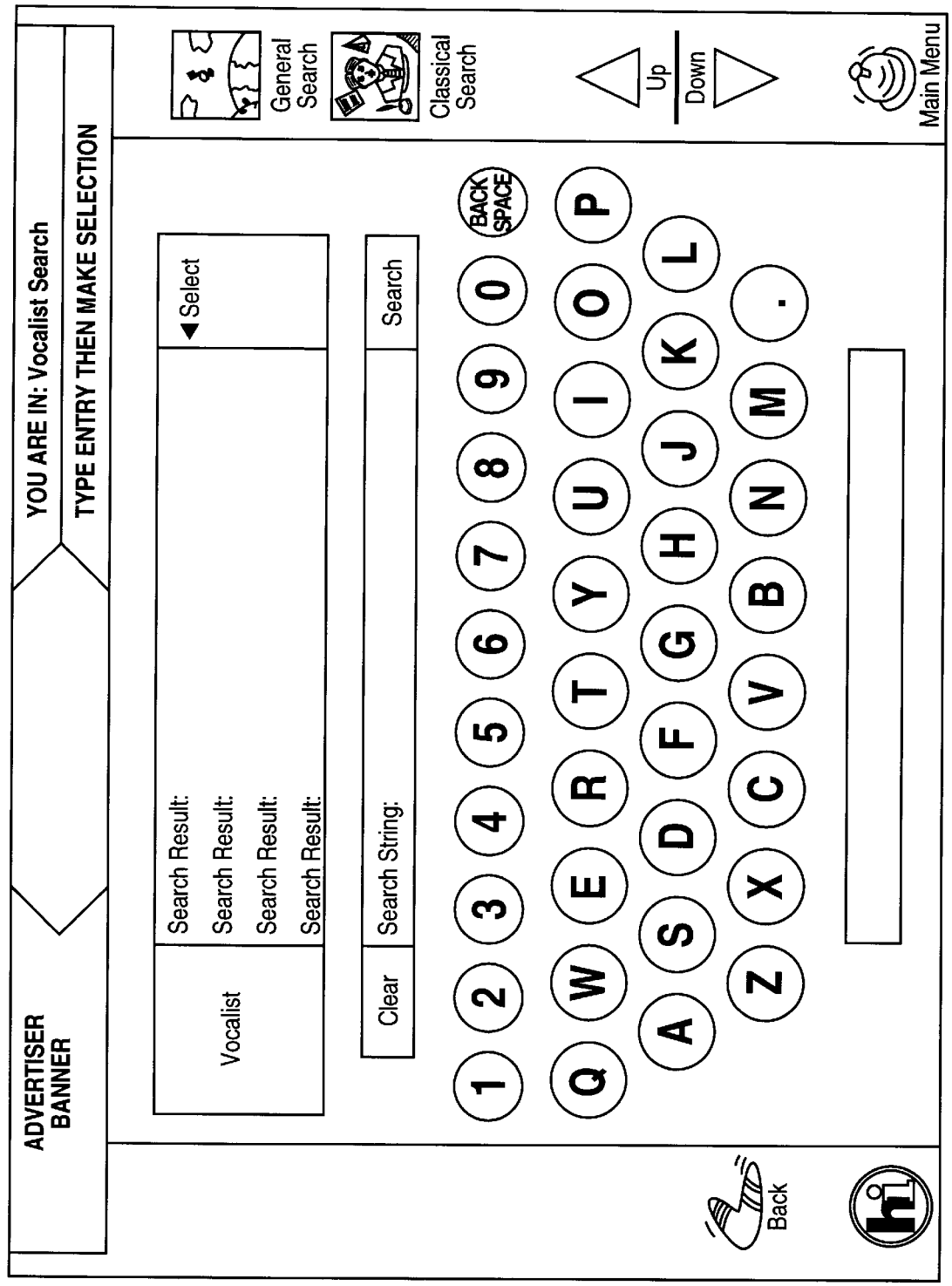
Figure 26:
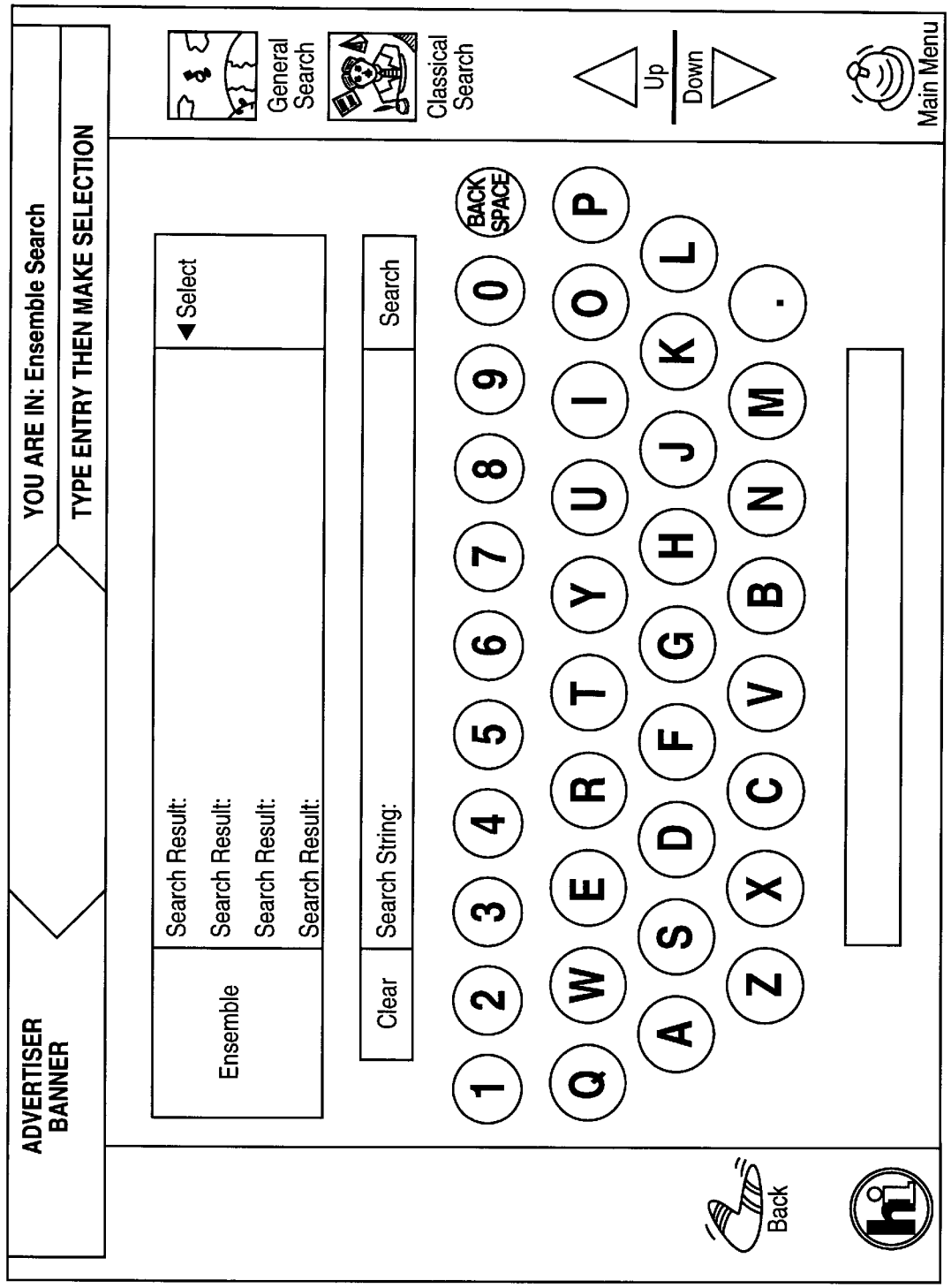
Figure 27:
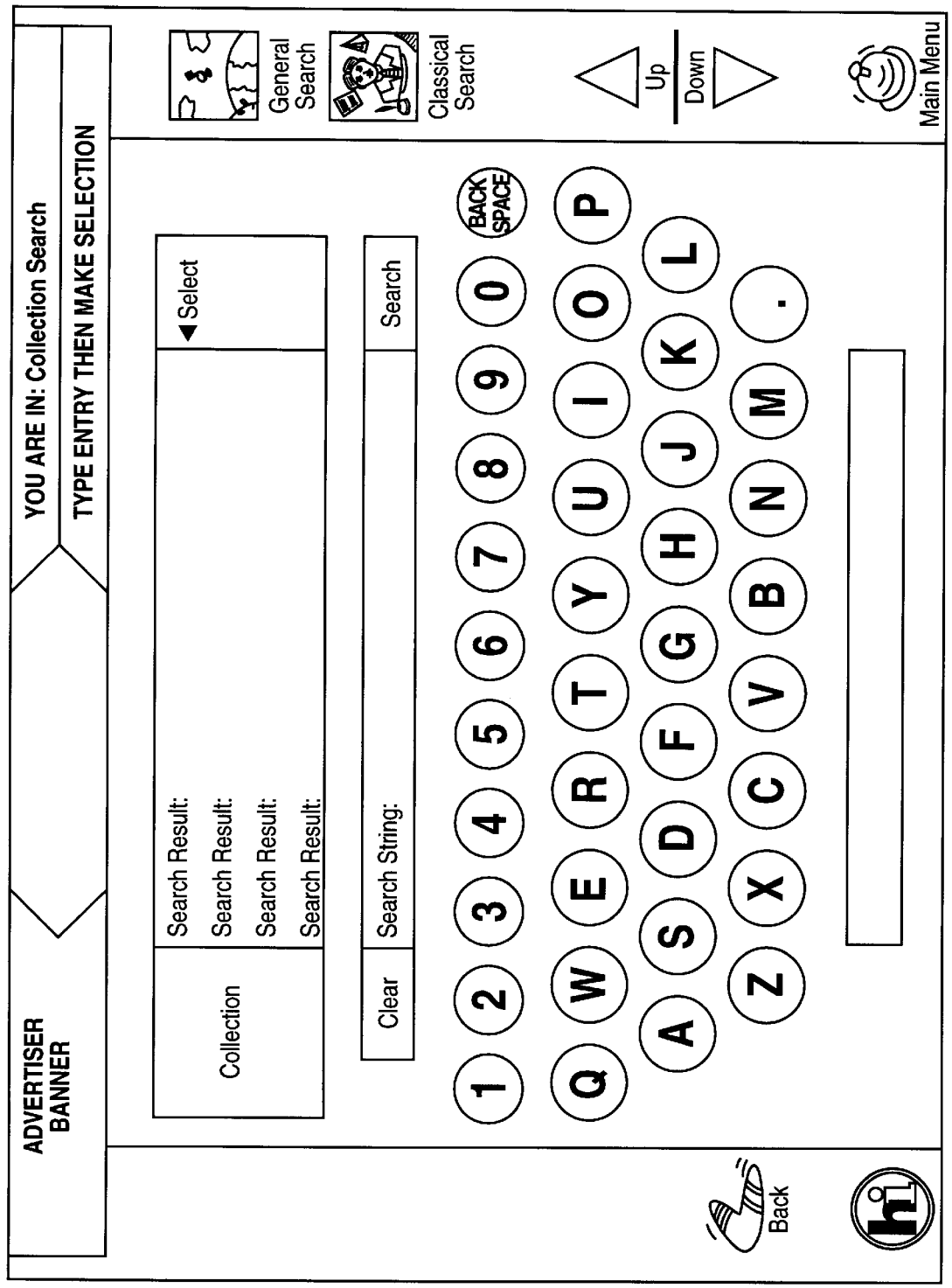

FIGS. 22–27 illustrate search screens for the different classical categories. For Example, FIG. 22 illustrates a search screen for the Composer category (hot zone 408 from FIG. 21). The user uses the simulated key pad 419 to enter the search terms for their composer search which appears in the "Search String Field" 418. The results of the search are listed as "Search Results" 414–417. The user can use the arrows 419 and 420 to scroll through the search results in order to select a particular result for preview. The search screens illustrated in FIGS. 23–27 operate similarly.

Figure 28:
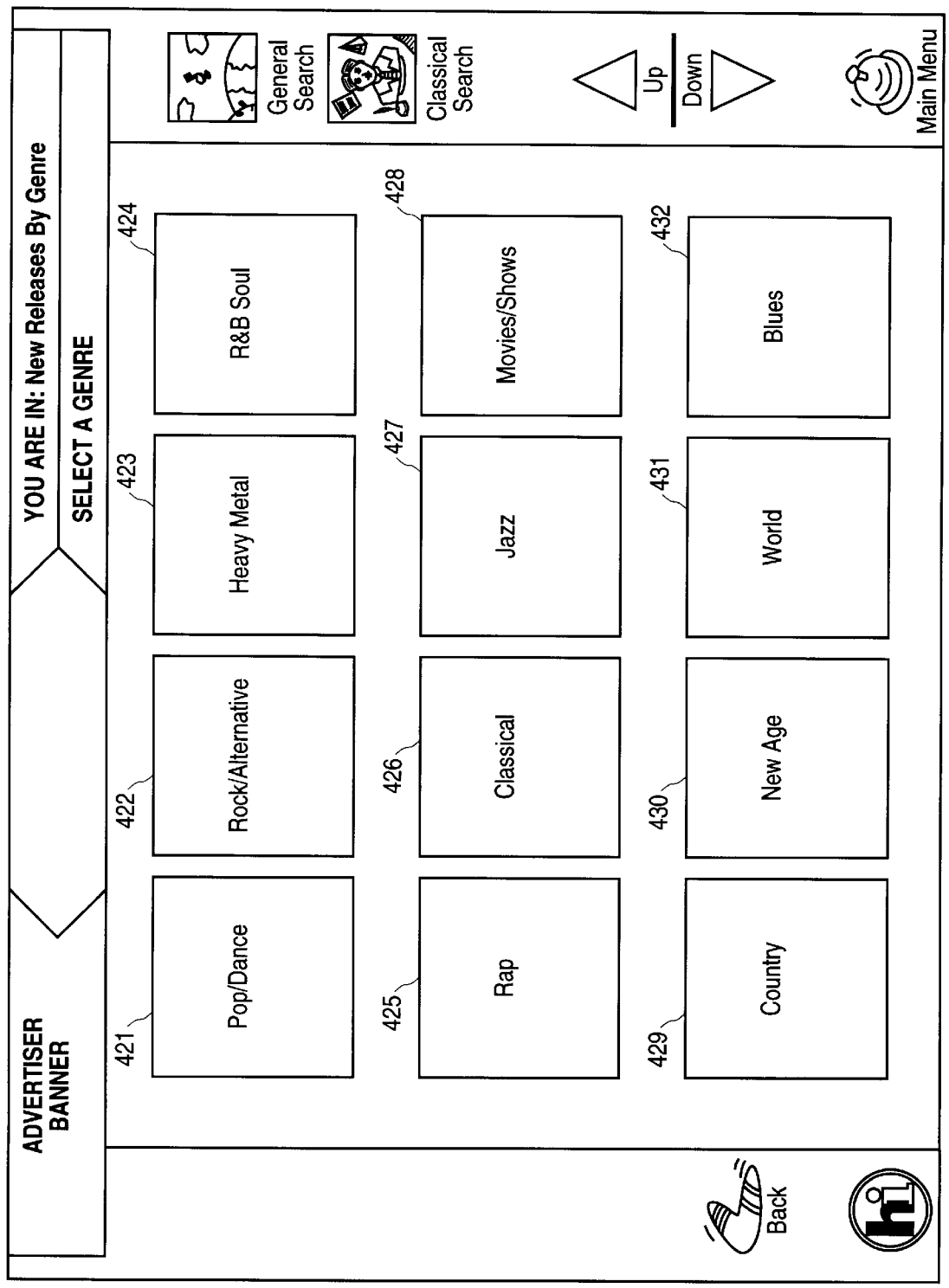
Figure 29:
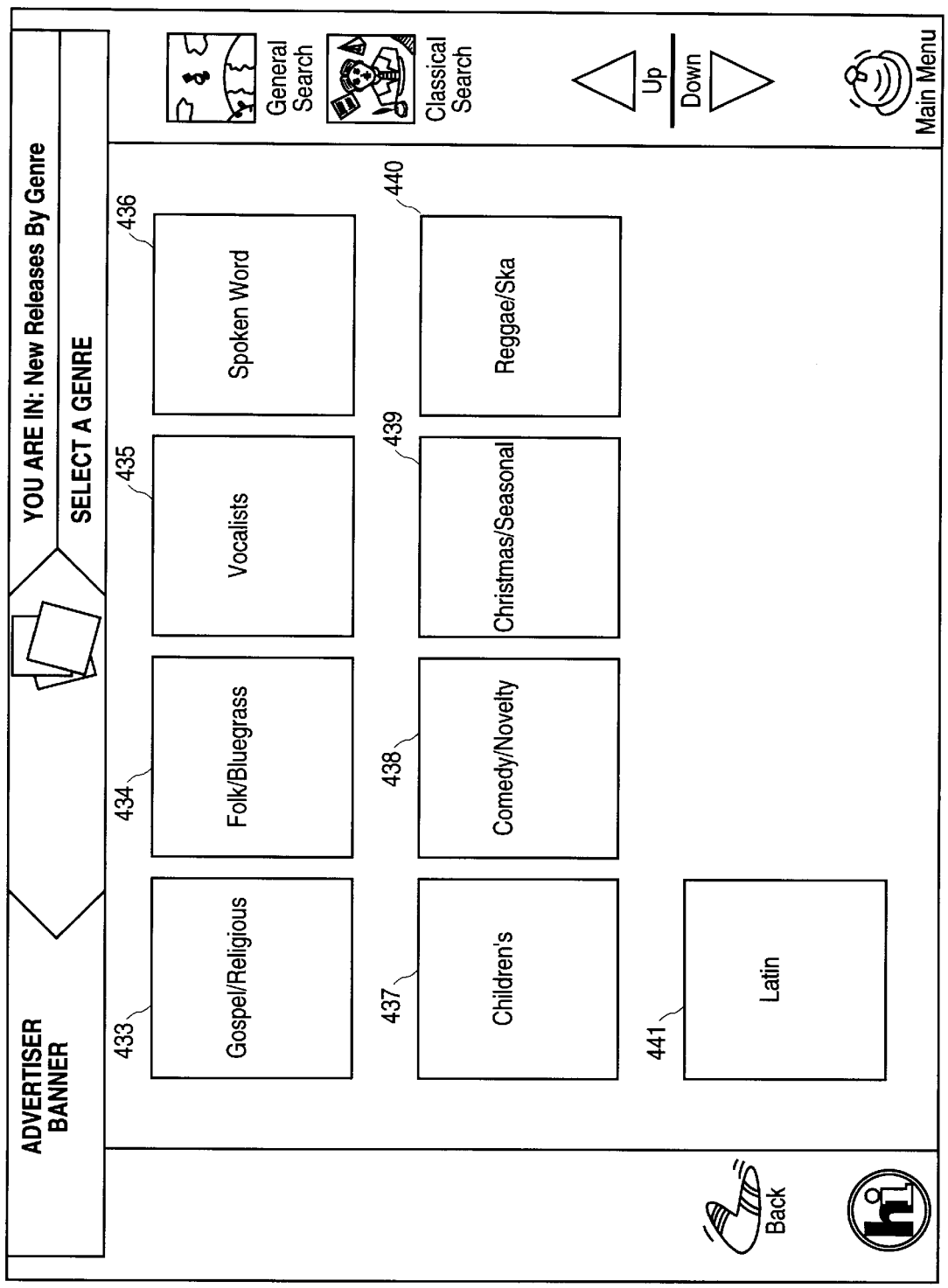
Figure 30:
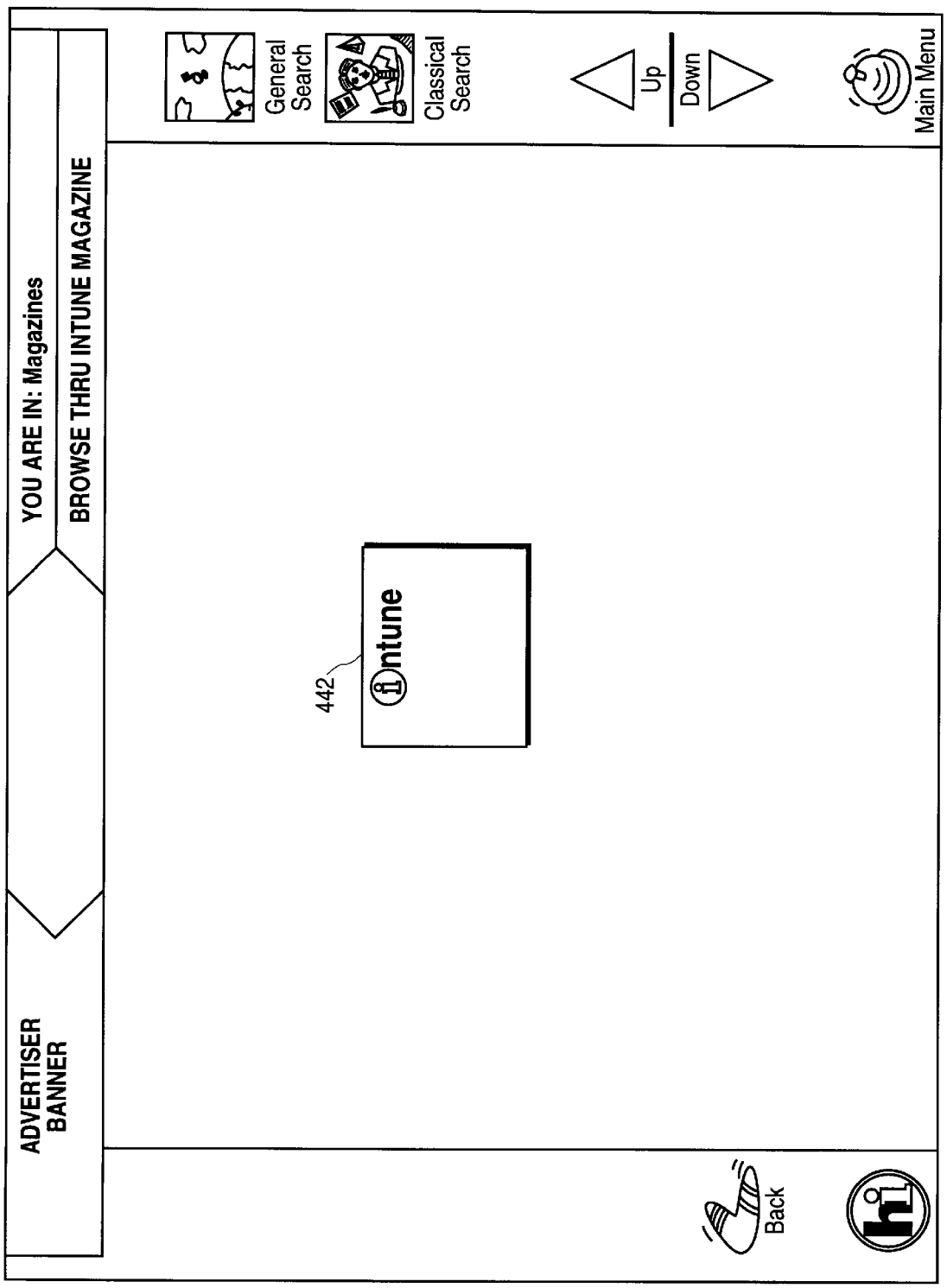

FIGS. 28–29 illustrate the "New Releases By Genre" screen which allows a user to preview selected new releases within a particular genre. Although the particular types or number of genre can vary, the genres included in the preferred embodiment of the present invention 421–441 are the same genres 221–241 included in the "Promotions By Genre" screen illustrated in FIGS. 11–12. FIG. 30 allows a user to browse through different magazines. Here, the Intune magazine 442 is available for viewing.

Figure 31:
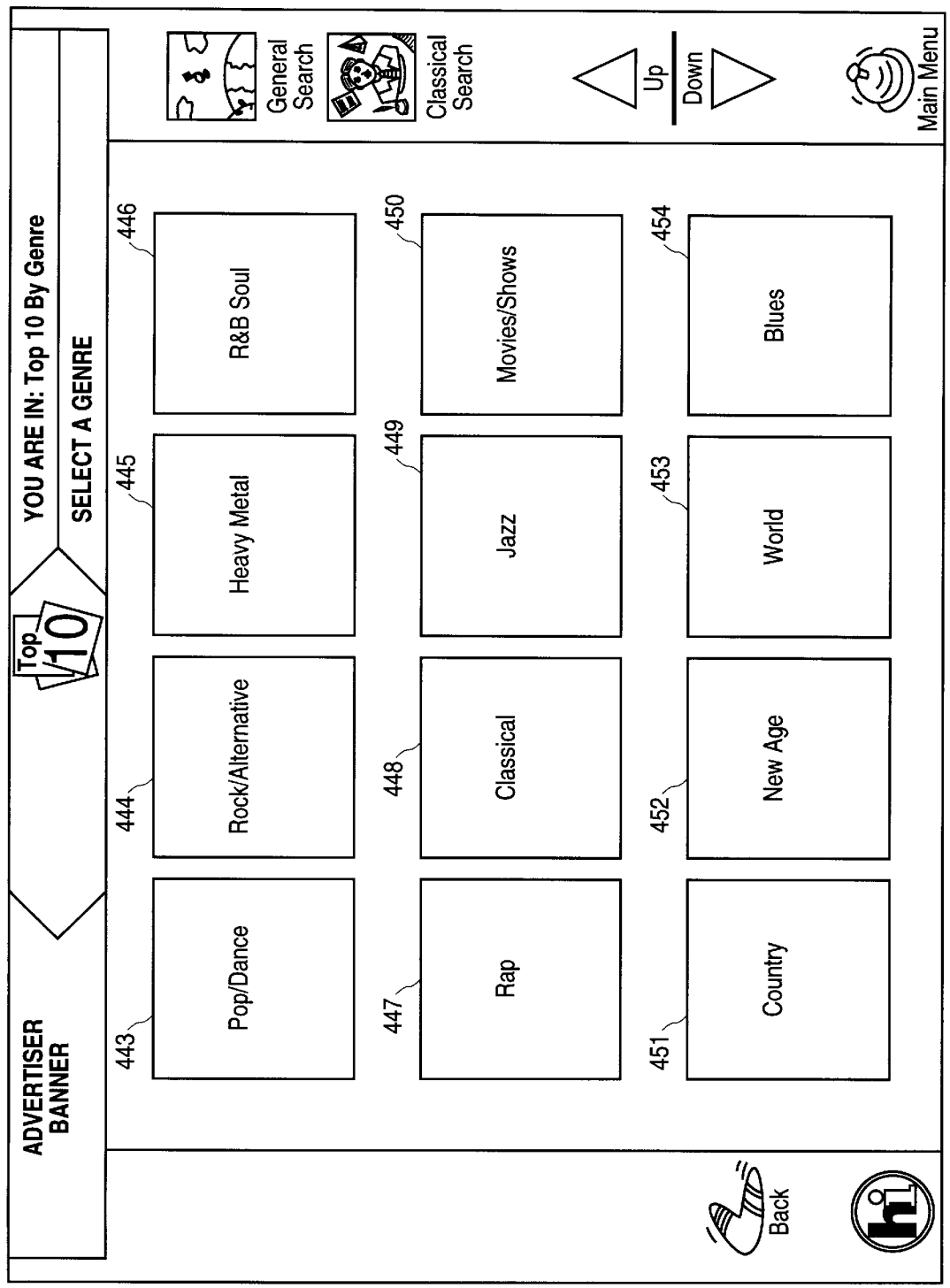
Figure 32:
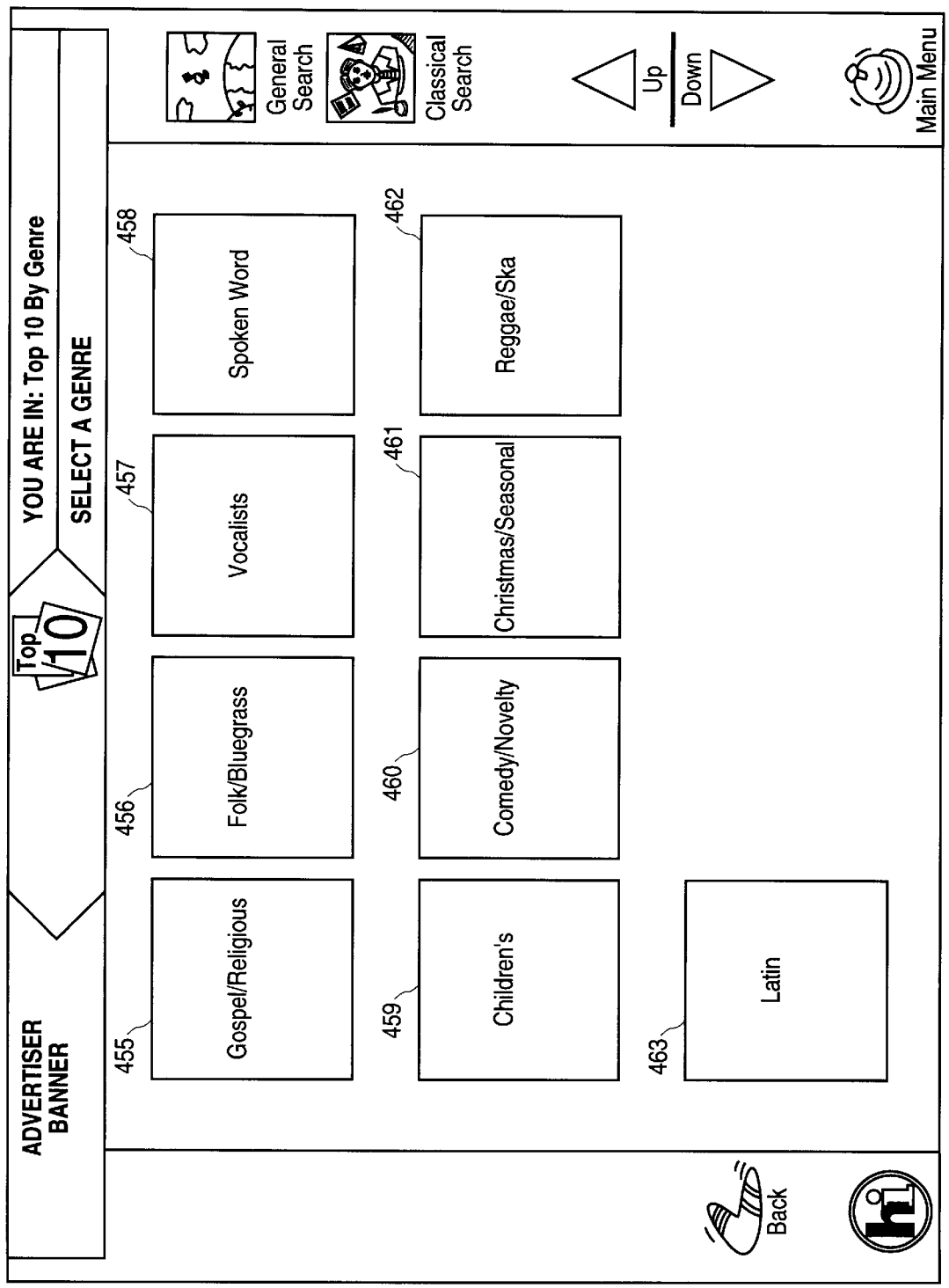

FIGS. 31–32 illustrate the "Top Ten By Genre" screen which allows the user to view the top ten singles or albums within a particular genre. Although the particular types or number of genre can vary, the genres included in the preferred embodiment of the present invention 443–463 are the same genres 421–441 included in the "New Releases By Genre" screen illustrated in FIGS. 28–29.

A unique feature of the present invention is that the creation of the "Top__" lists described above and below, is dynamic. In other words, the web site dynamically determines the "Top 10 or 25" albums or selections (for example) depending on the number of users that access the particular selection. This is as opposed to using a published top 10 or 25 list provided by Billboard Magazine for example. Each time an album or selection is selected by a web site user for preview, a counter for that album or selection is incremented. The counters with the highest counts are then located whenever a web site user selects a "Top__" list for preview. The albums or selections corresponding to those top counters are then provided to the web site user. A more accurate and up-to-date "Top__" list is therefore provided to the web site user.

Figure 33:
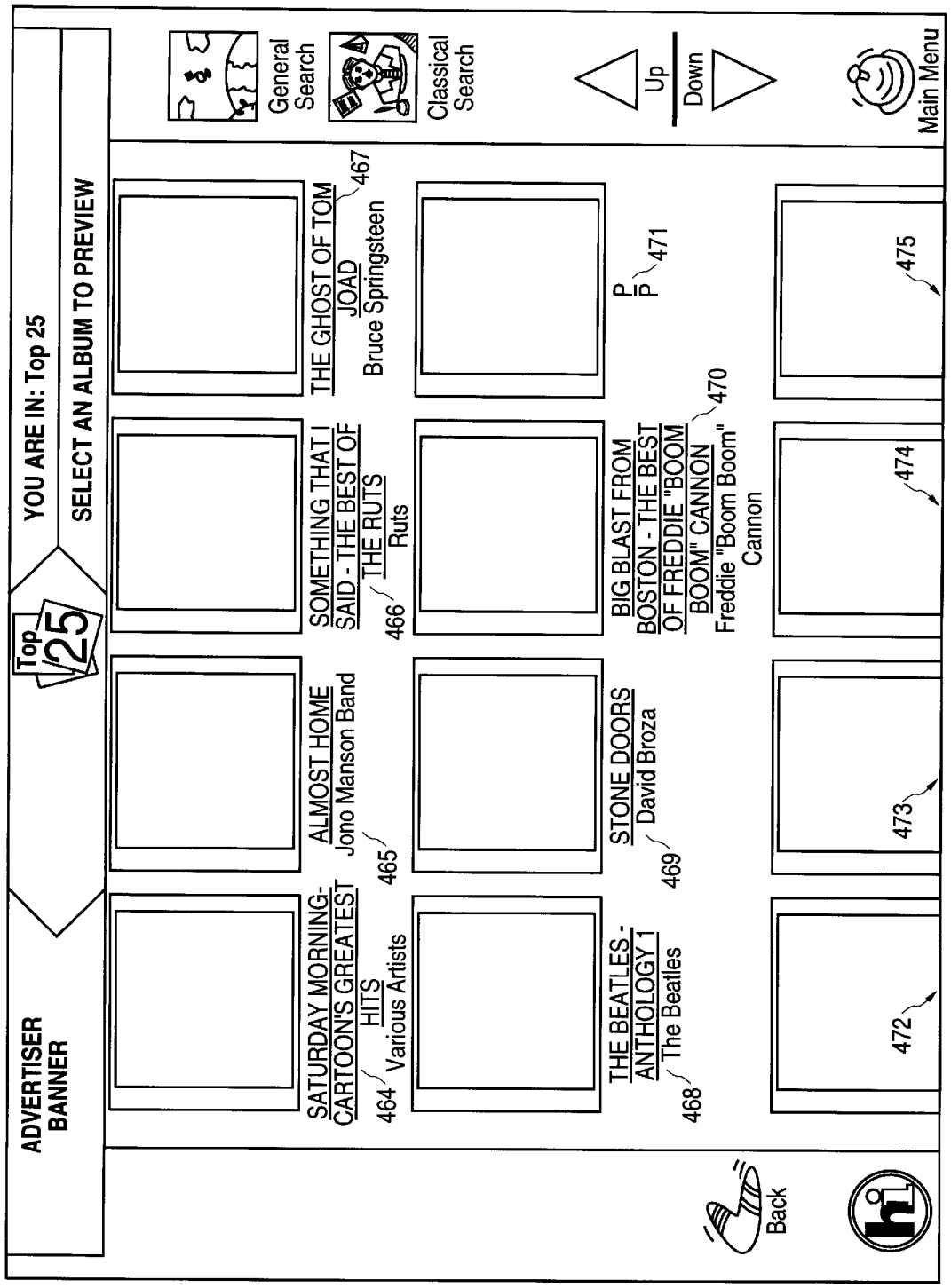
Figure 34D:
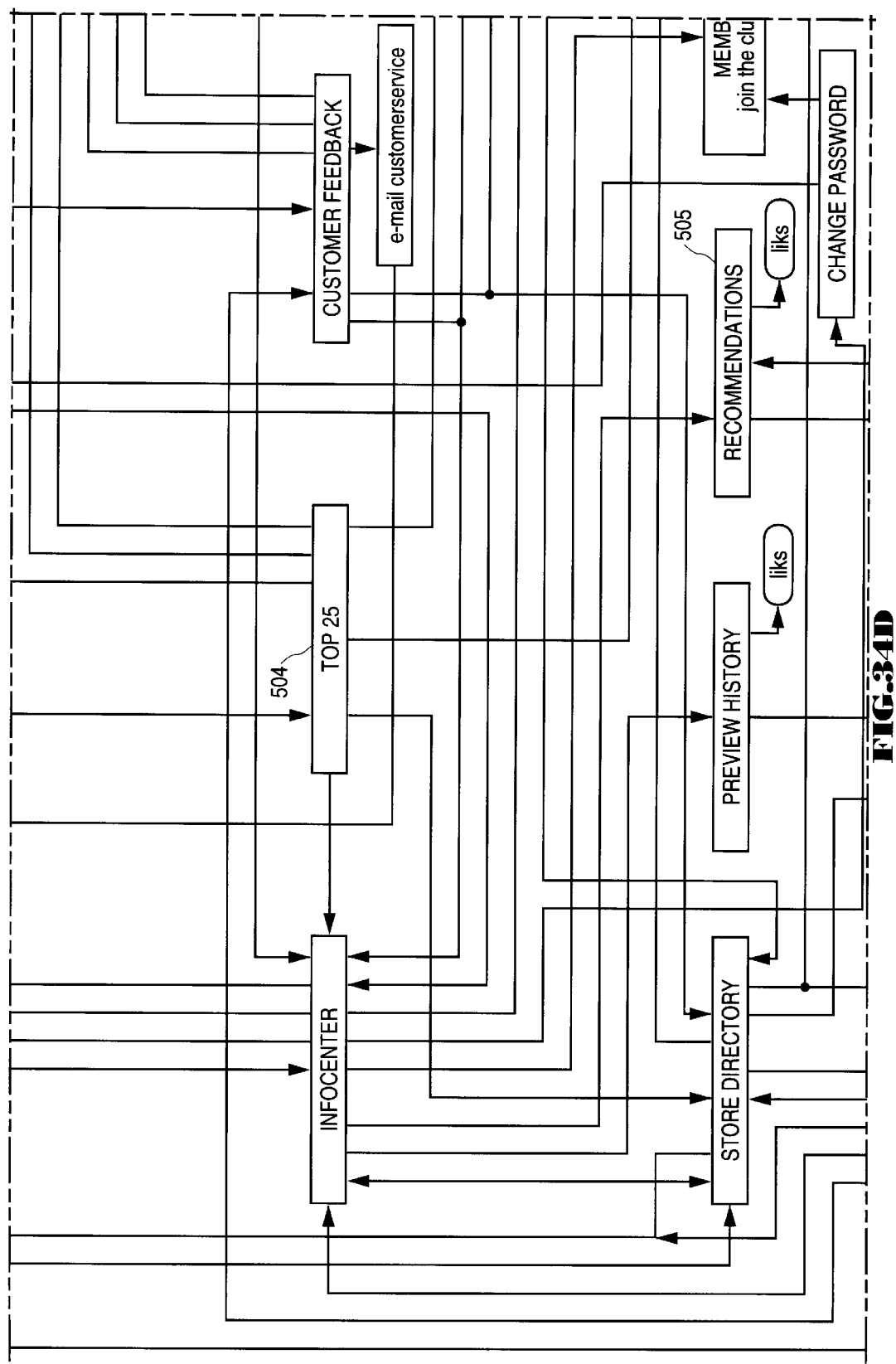
FIG. 34 is a flow diagram of the possible paths accessible by a user in the network embodiment independent from a kiosk.
Figure 34G:
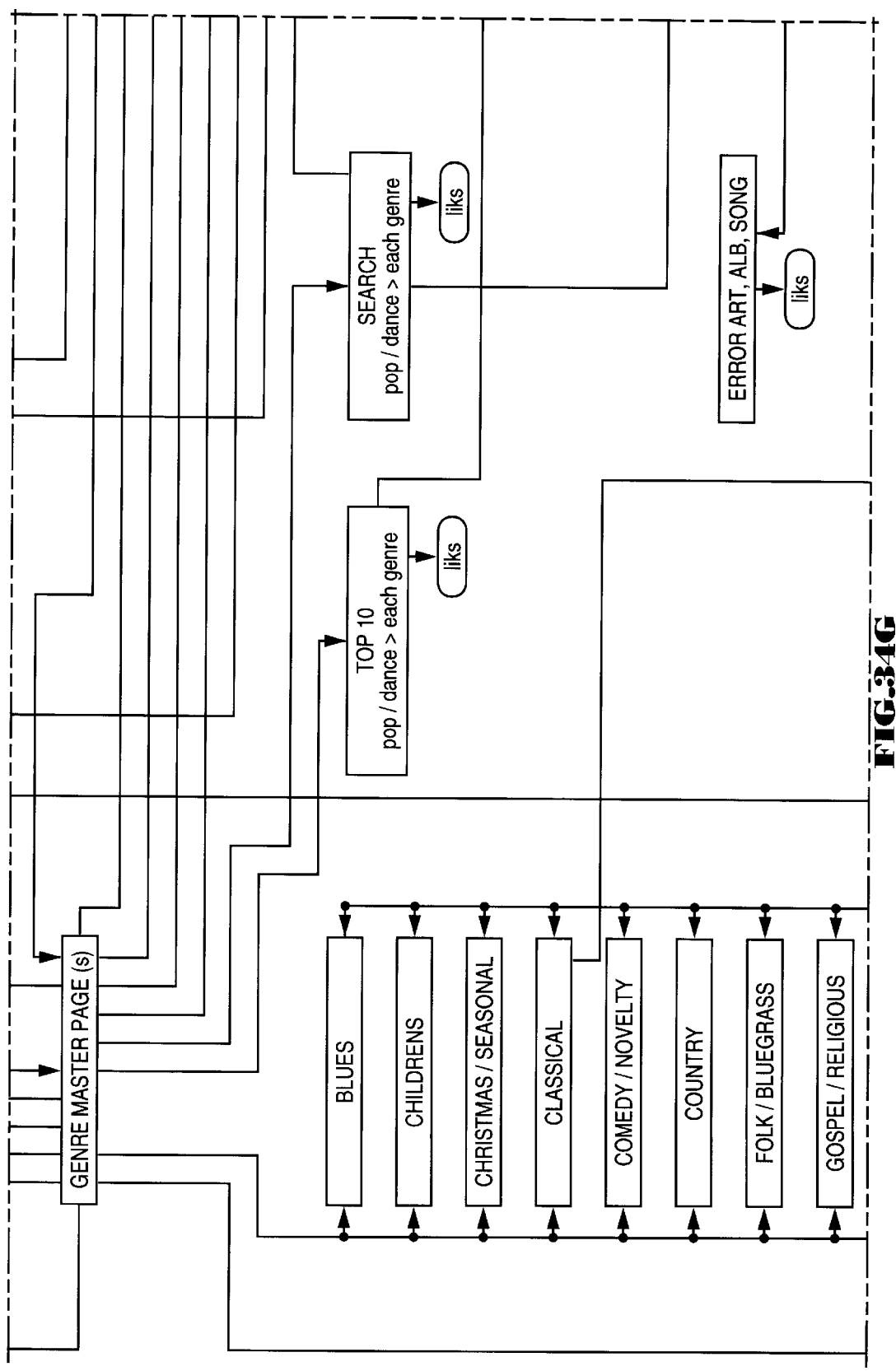
Figure 34J:
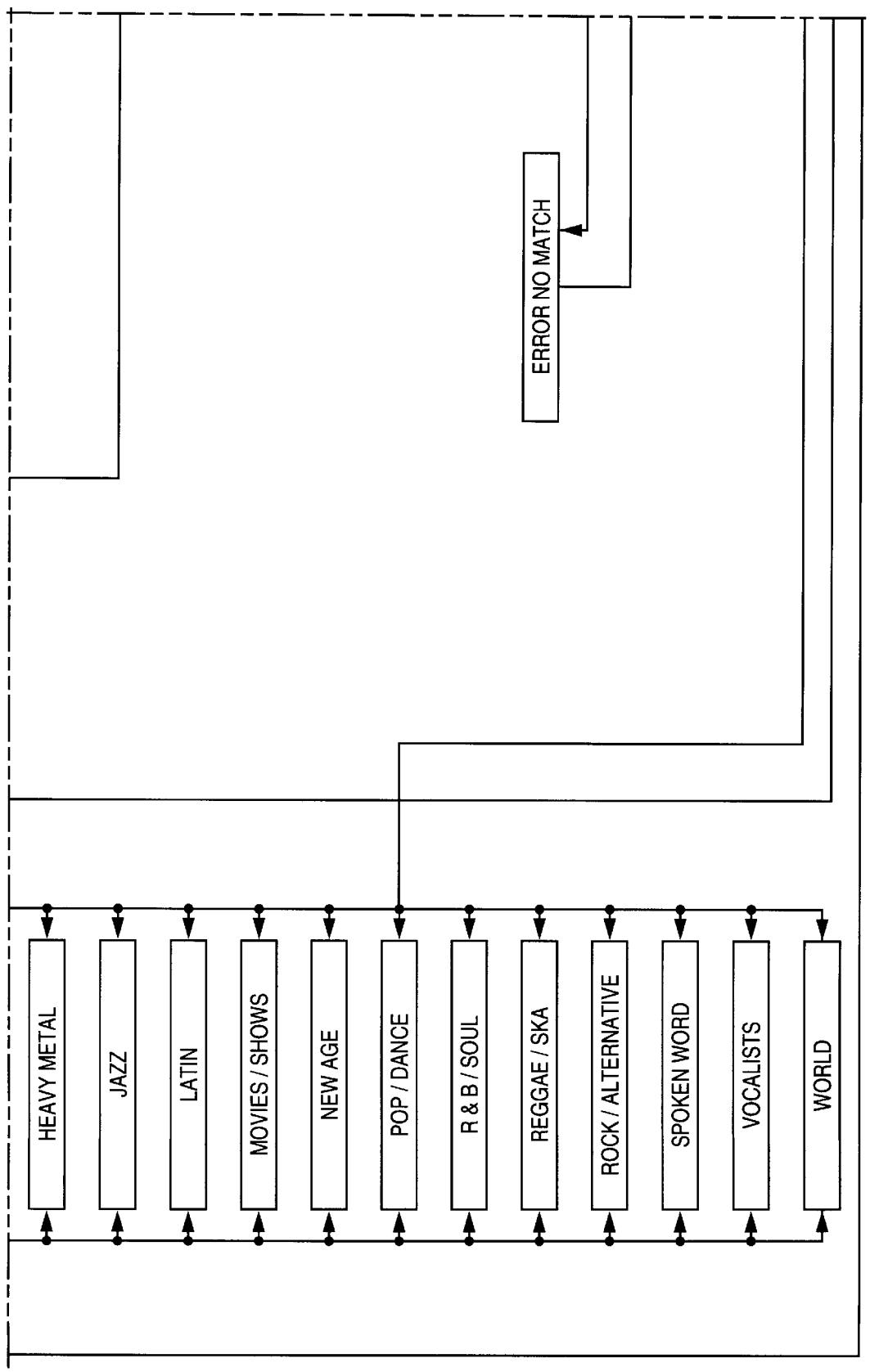
Figure 34K:
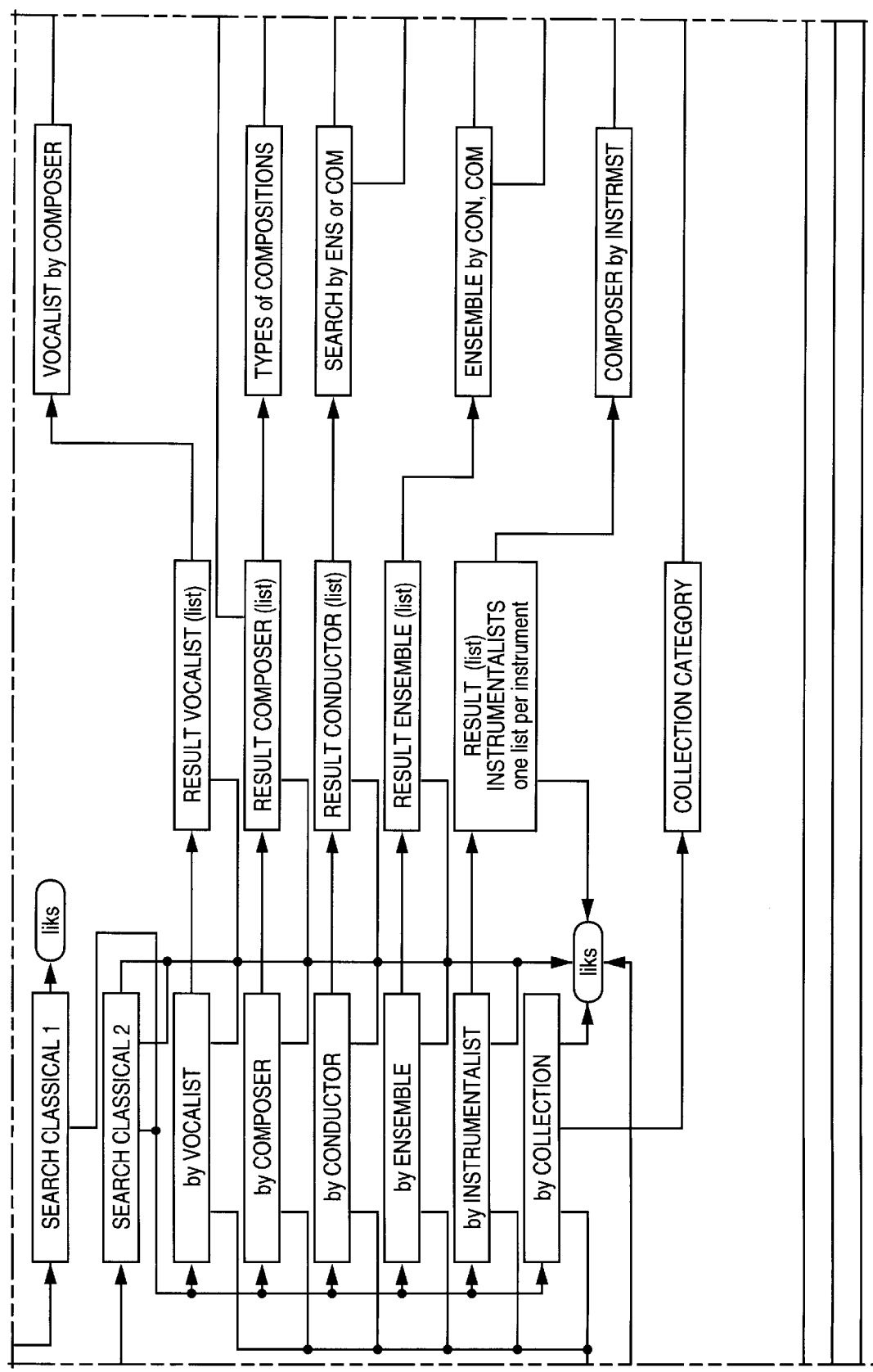
Figure 34L:
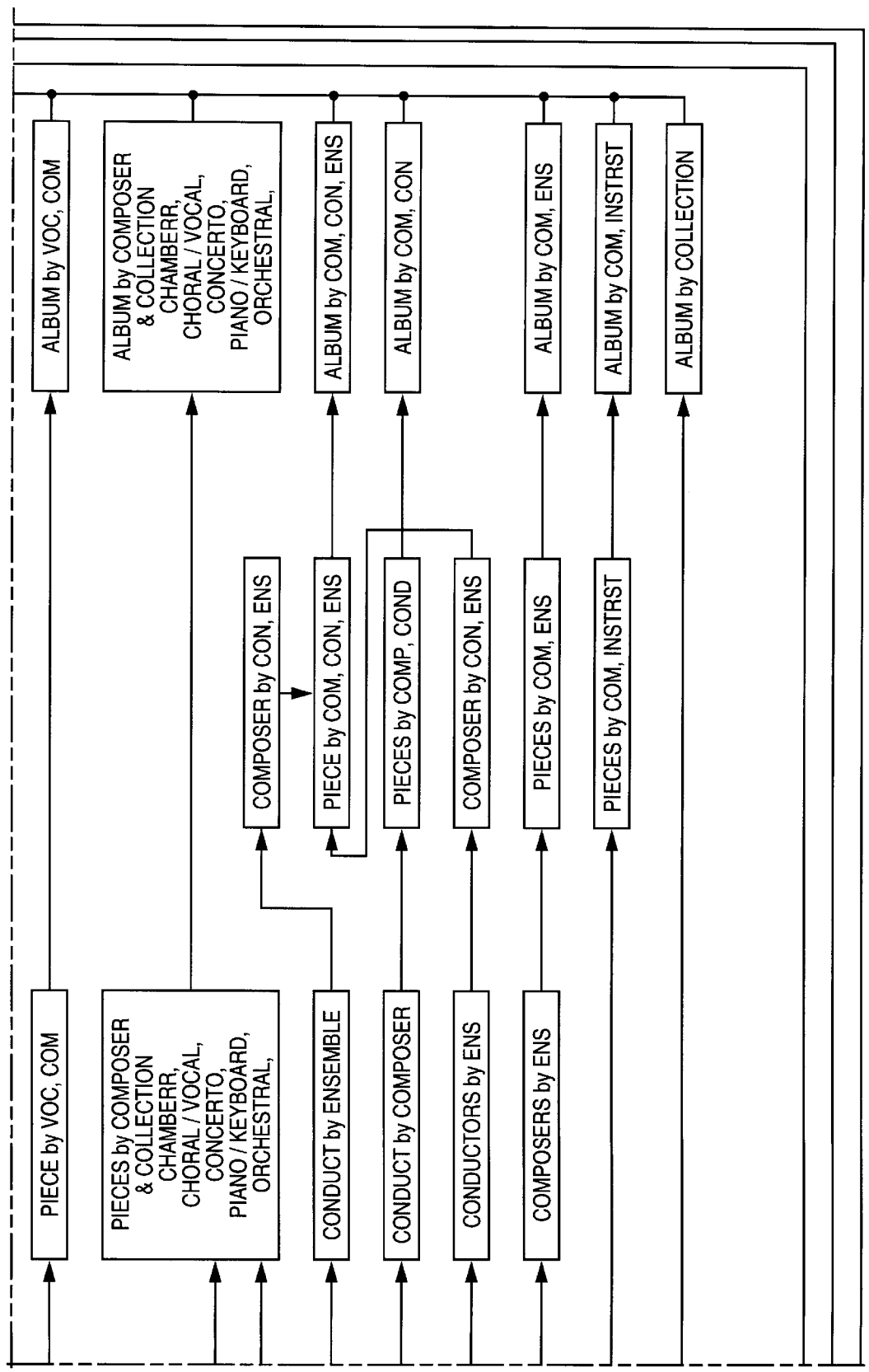

FIG. 33 illustrates the "Top 25" screen which shows the covers of the top twenty-five albums 464–475. Again, as with all of the previous screens, the user is able to select a particular album for preview by merely touching the album cover which is programmed as a hot zone.

An alternate embodiment of the present kiosk-based network invention incorporates the bar code reader feature of the original kiosk invention. This allows the web site user to quickly and conveniently access a particular album or song without having to manually type in the selection's title. The bar code reader reads the UPC code on an album and searches for the stored data which corresponds to that UPC code. That information can include an album cover, track list, and pre-selected and pre-recorded music samples.

Network Embodiment for Use Independent from a Kiosk

An alternate embodiment of the present invention provides for a network embodiment independent from a kiosk. A home-based computer system is therefore capable of providing a web site user with private access to the web site server. It should be noted that the same hardware and much of the operating software described above with regard to the kiosk-based invention are applicable here.

FIG. 34 is a flow diagram of the possible paths accessible by a user in the network embodiment independent from a kiosk. This figure is similar in logic to FIGS. 5 and 8.

Figure 35:
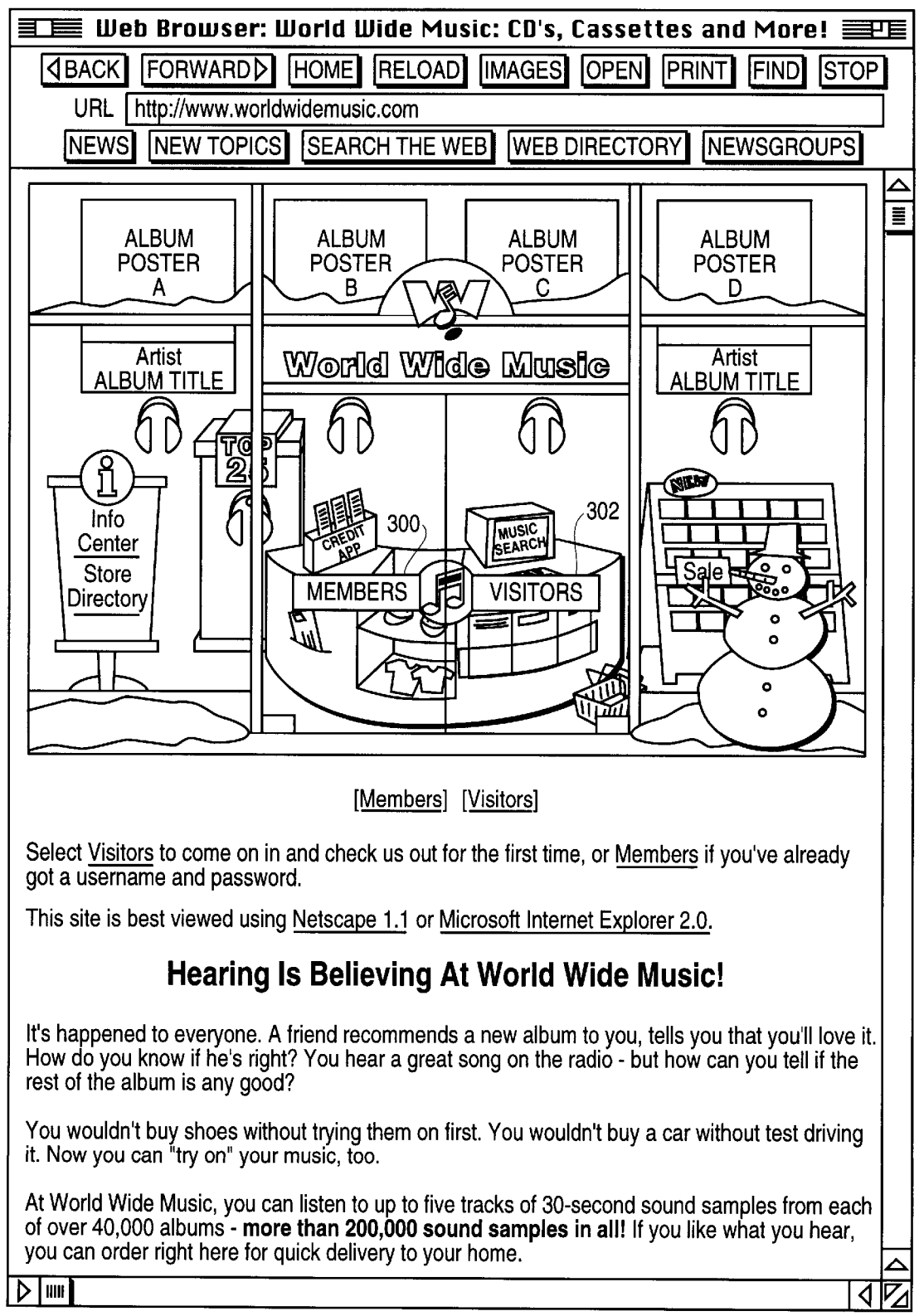

Starting at the outside store front (see FIG. 35), a user is asked to enter as a member or a visitor. If she wants to enter to the web server as a member, she is asked to enter her name and password. at screen 52. This provides her with access to the virtual store lobby (see FIG. 38). From the lobby, the user can view the Top 25 albums screen 504 (see FIGS. 43–45). From there, the user can view a list of recommendations based upon certain albums in the Top 25 list or she can directly preview an album in the top 25 list at the preview page screen 506. From the preview page screen 506 (see, for example, FIG. 53) the user can sample one of the pre-selected pre-recorded tracks from the album at points 507 or 508 in the flow diagram. The details of these particular functions will be described in more detail below.

FIGS. 35–57 illustrate a sequence of screen shots from a preferred embodiment of a network web site ("World Wide Music") for use independent from a kiosk. It should be appreciated that while described here utilizing these screen shots, a wide variety of different screens and operations can be incorporated without departing from the scope of this invention. It should also be appreciated that network web sites and servers and their operation are widely known and understood in the art. Consequently, the following discussion will provide only a brief discussion of the operational mechanics.

FIG. 34 illustrates the initial screen which appears upon access to the web site server. The screen provides an image of a virtual retail music establishment (music store) from the outside as a web site user approaches the establishment. There are two hot zones on the screen 300 and 302, which allow the web site user to access the virtual music store as a "member" or as a "visitor" by simply selecting one of the choices. Both members and visitors have complete access to the web site server. Also, each user must enter a unique ID in order to gain access. The difference is that membership requires that the web site user provide the web site server with demographic information. In exchange for this information, the web site user will be able to take advantage of better prices when purchasing particular albums.

As with the kiosk-based network embodiment, a web site user must identify herself to the web site server. This identification allows the web site server to uniquely associate events during web site usage, such as, for example, the user's searches, ratings and purchase requests, with a particular user. This information is very important for insuring that the correct purchase order is delivered to the right user. In addition, the user identification can also be used gather accurate demographic information which events during web site usage, such as, for example, the user's ratings.

Figure 37:

FIGS. 36–37 illustrate a sample membership application which requests identification information about the user as well as demographic information. Use of this information will be discussed in more detail below.

Figure 38:
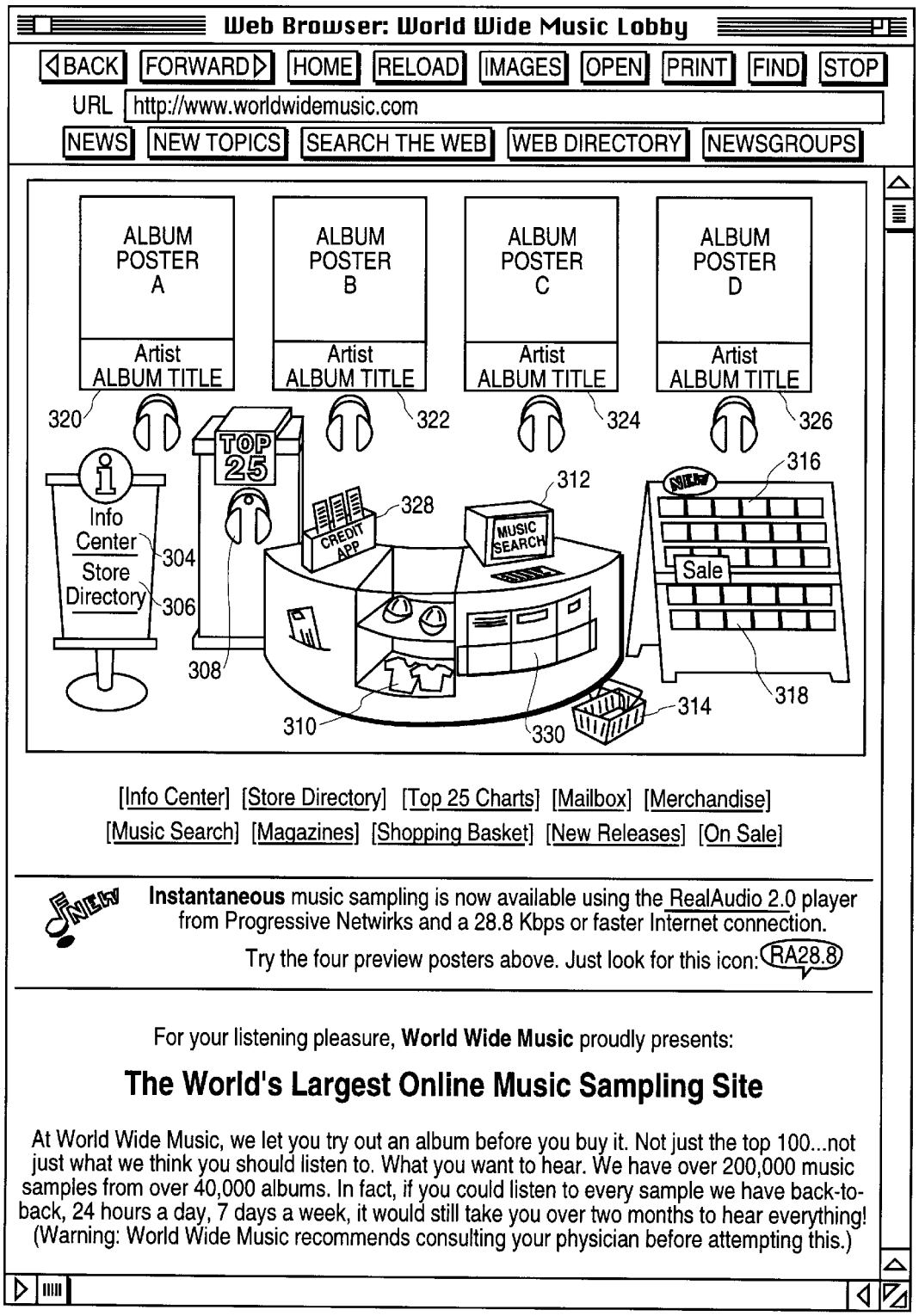
Figure 39:
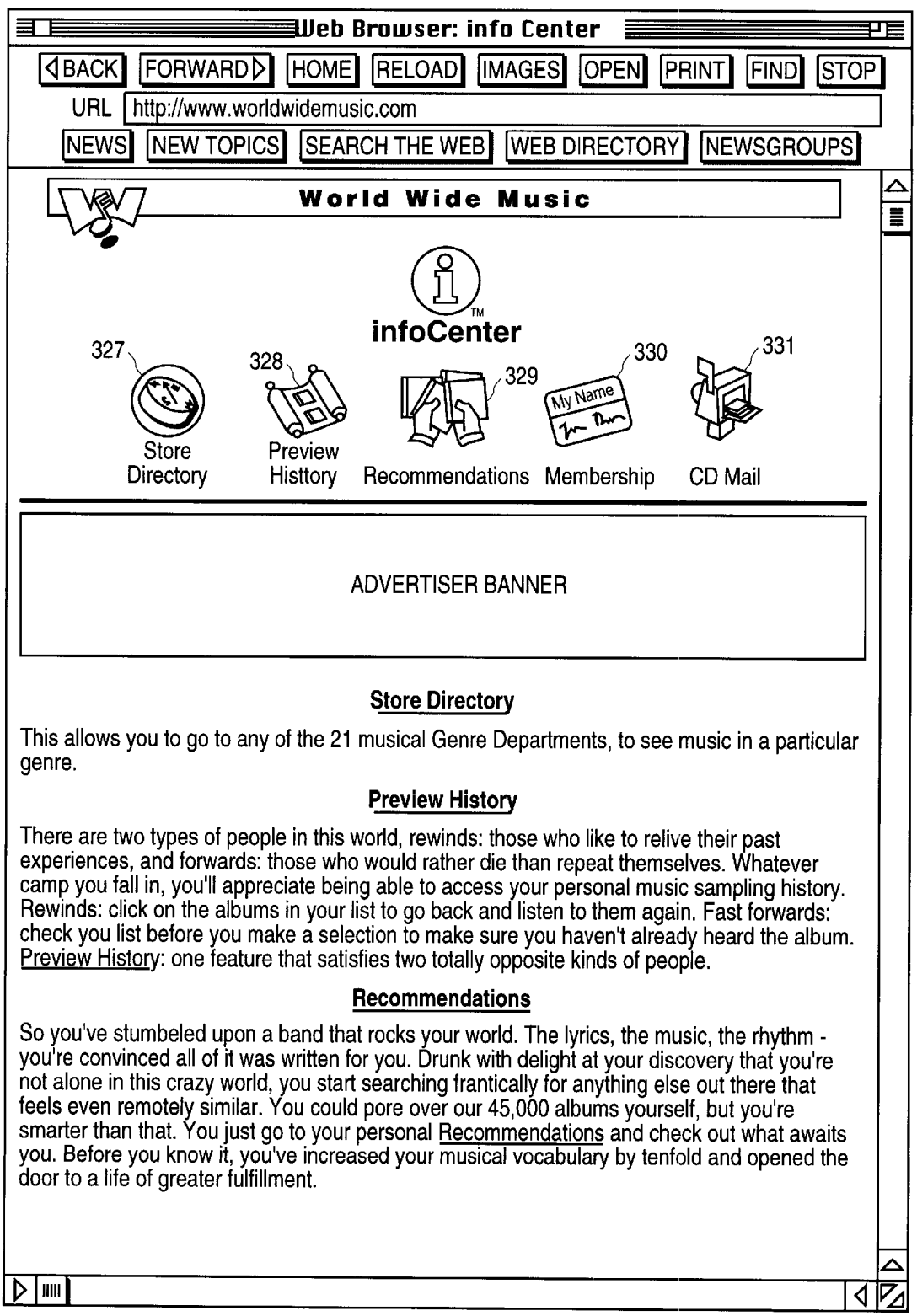

FIG. 38 illustrates the lobby of the virtual retail music store with hot zones for providing web site users with quick and easy access to various departments of the store and the ability to engage various options. Hot zones 304 and 306 allow web site users to access the stores information center and store directory. The information center 304, illustrated in FIG. 39, provides the web site user with the ability to access particular features of the web site, such as the "Store Directory" (hot zone 327), "Preview History" (hot zone 328) which allows the web site user to preview her previous music selections, the "Recommendations" feature (hot zone 329) which allows the web site user to view recommendations on particular musical works. It is contemplated that the web server can create a profile of the web site user to determine works that will interested the user. This feature can combine the prior selections and ratings of the web site user and combine this information with the web site user's demographic information to determine other albums that may be of interest to the web site user. The "Membership" feature (hot zone 330) allows the web site user to become a member of the World Wide Music system. The "CD mail" feature (hot zone 331) sends the user e-mail on events or products of interest based upon the user's prior previews. For example, the CDmail feature can provide the user with an e-mail notifying her that a new Madonna album has just been released and can be sampled on the web site.

Figure 40:
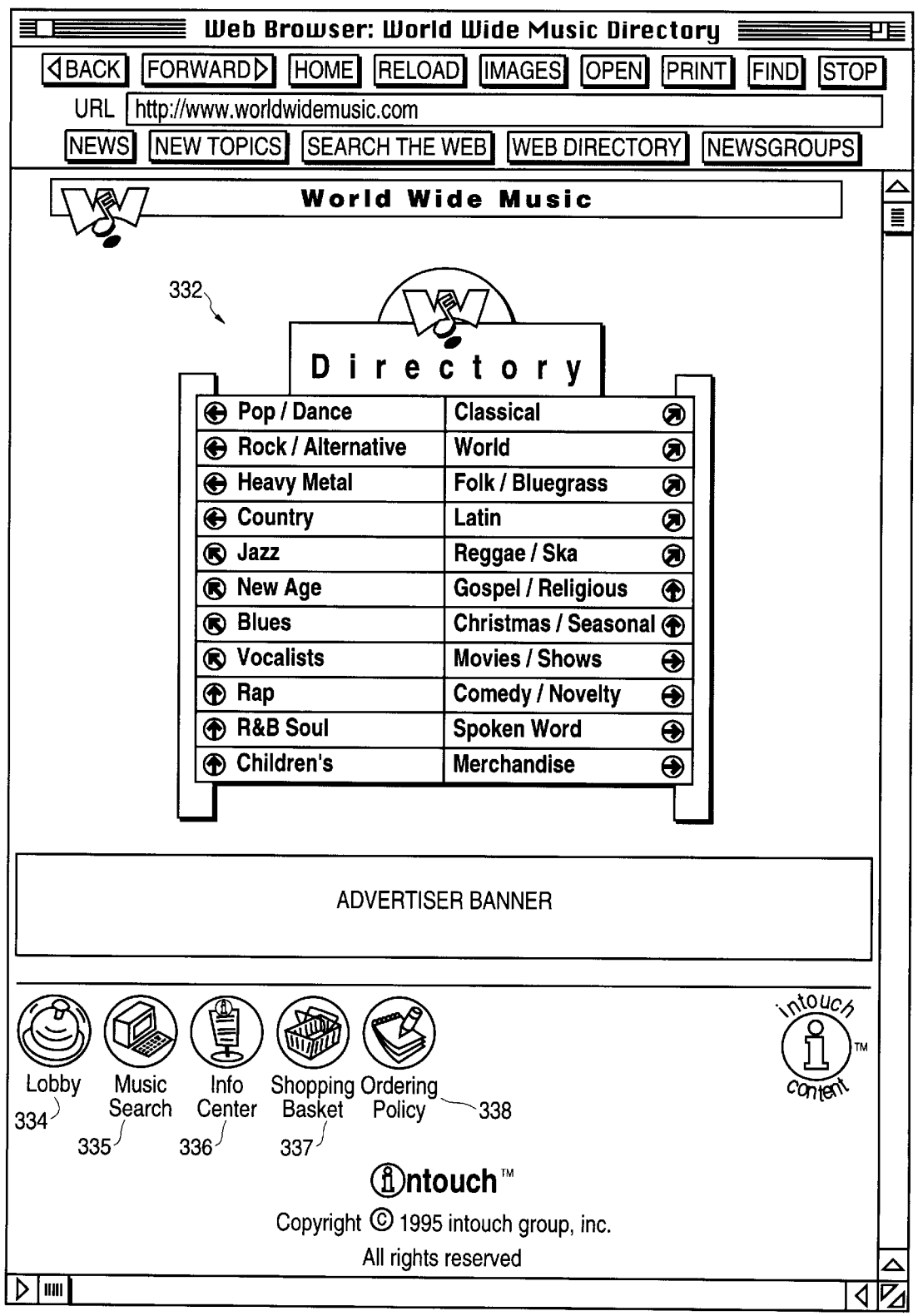

FIG. 40 illustrates the "Store Directory" accessible by selecting hot zone 327. This directory includes the different music departments within the virtual retail store divided by musical genre. A web site user can visit (i.e., access) any of these departments by selecting one of the genres 332 shown on the screen. Also illustrated in this screen are five hot zones 334–338 which allow provide the web site user with quick access to specific departments. For example, hot zone 334 allows the web site user to go back to the lobby, hot zone 335 allows the web site user to perform a music search, hot zone 336 allows the web site user to visit the information center which provides the web site user with information about the World Wide Music virtual retail store, hot zone 337 allows the web site user to see what she has in her shopping basket and hot zone 338 provides the web site user with information on ordering specific products. It should be noted that each of the different hot zones illustrated in the lobby of FIG. 38 can be provided at the bottom of the web site screens similarly to hot zones 334–338.

Figure 41:
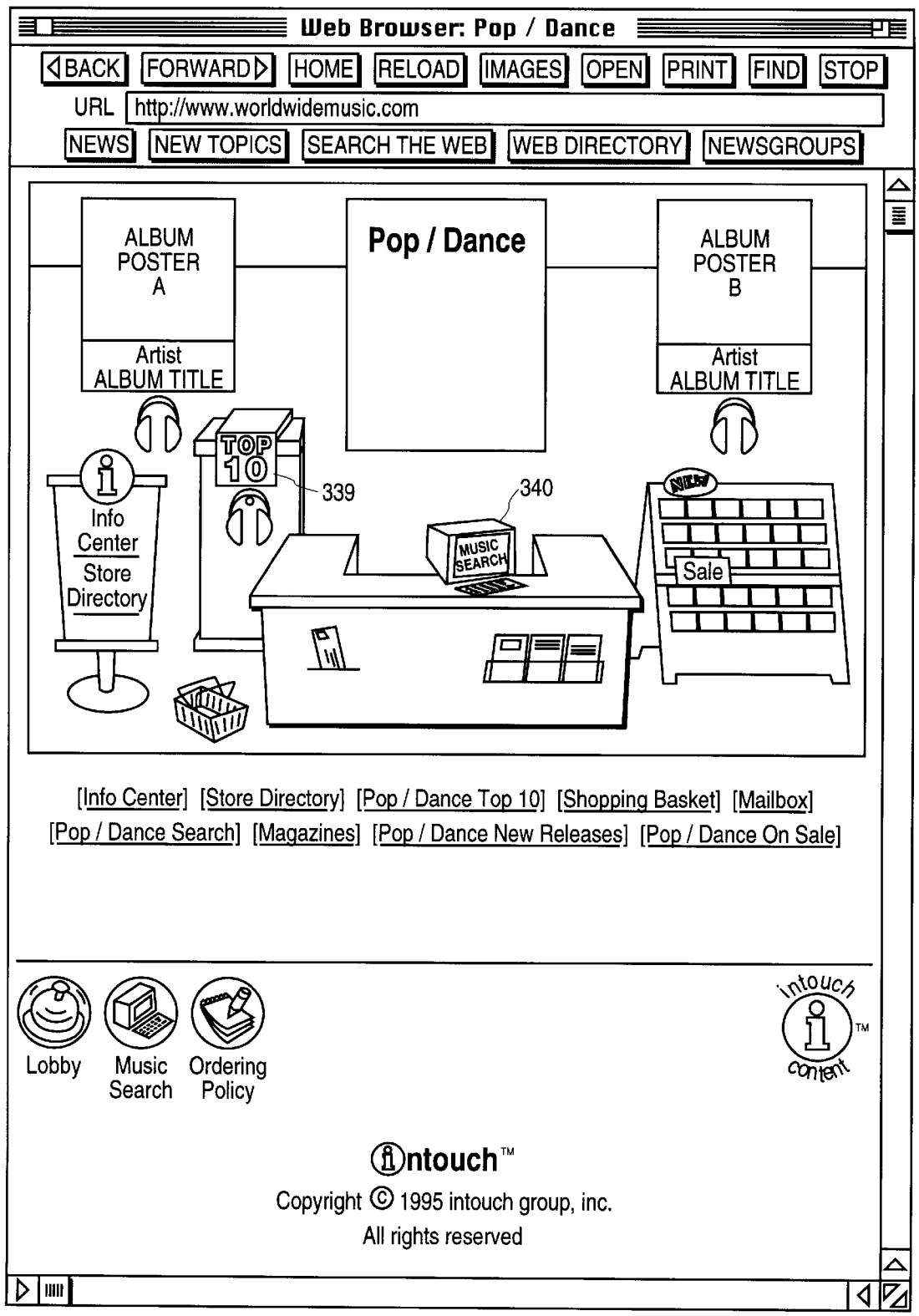

FIG. 41 illustrates the "Pop/Dance" department which can be accessed by selecting the "Pop/Dance" genre illustrated in FIG. 40. This department is similar to the main lobby illustrated in FIG. 38 with similar hot zones except that here, the different features relate to the pop/dance genre. For example, the "Top 10" hot zone 339 will provide the web site user with a list of the top ten pop/dance tracks. Similarly, selecting the "Music Search" hot zone 340 will allow the web site user to perform a search of only pop/dance works.

Figure 42:
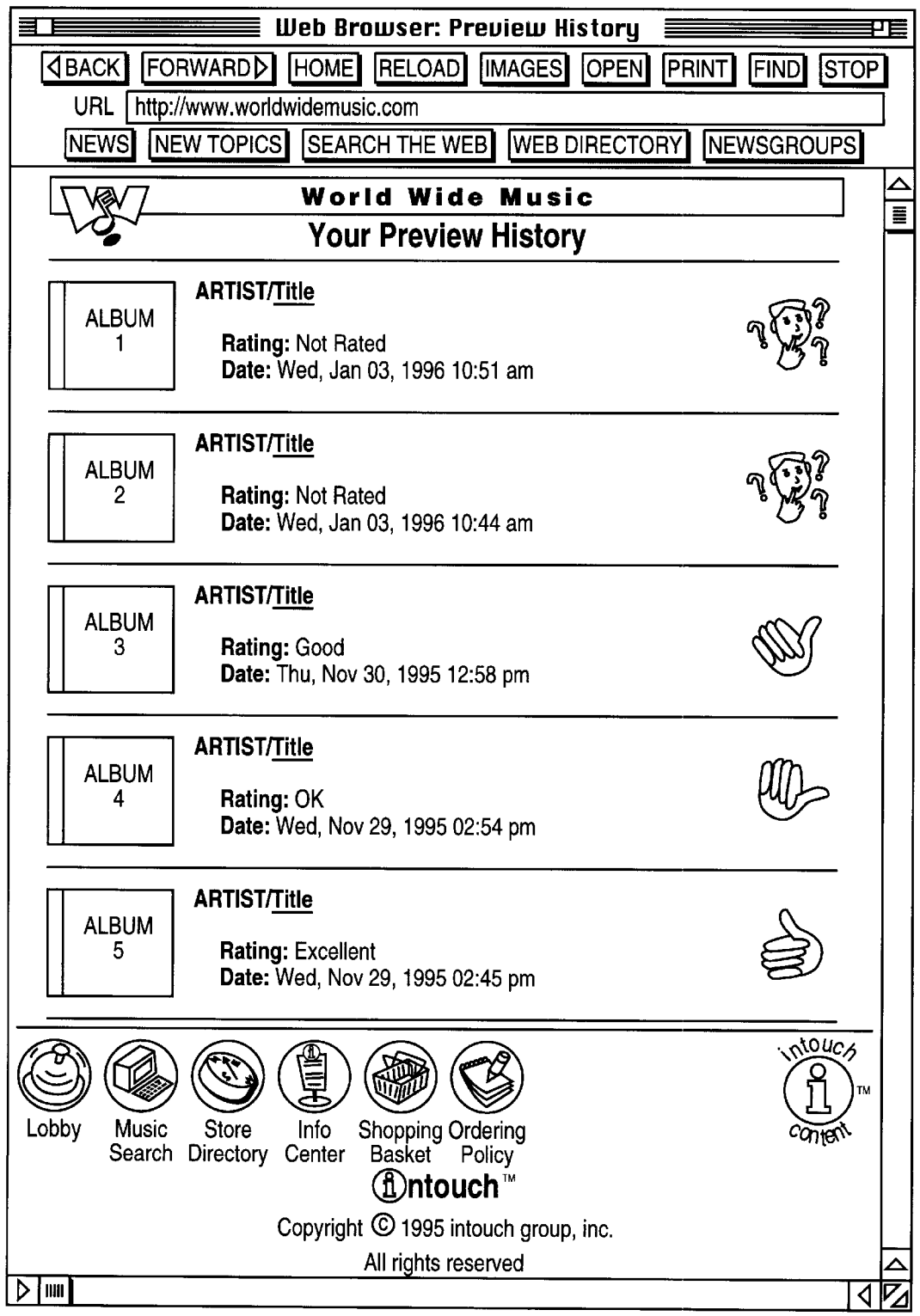

FIG. 42 illustrates the "Preview History" screen accessible by selecting hot zone 328 from FIG. 39. Here, a list of the musical selections previewed by the web site user is provided including the rating given by the web site user.

Figure 43:
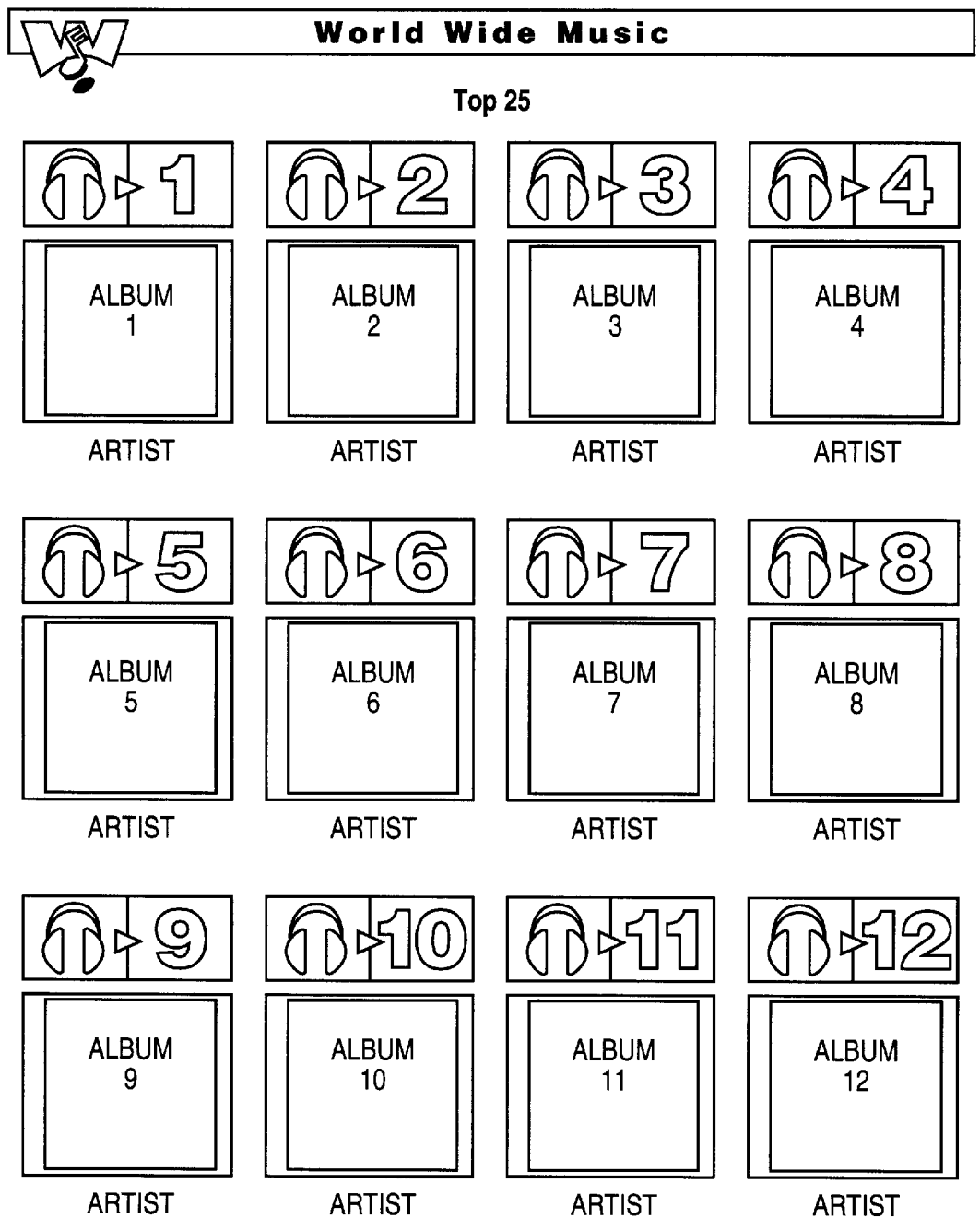
Figure 44:
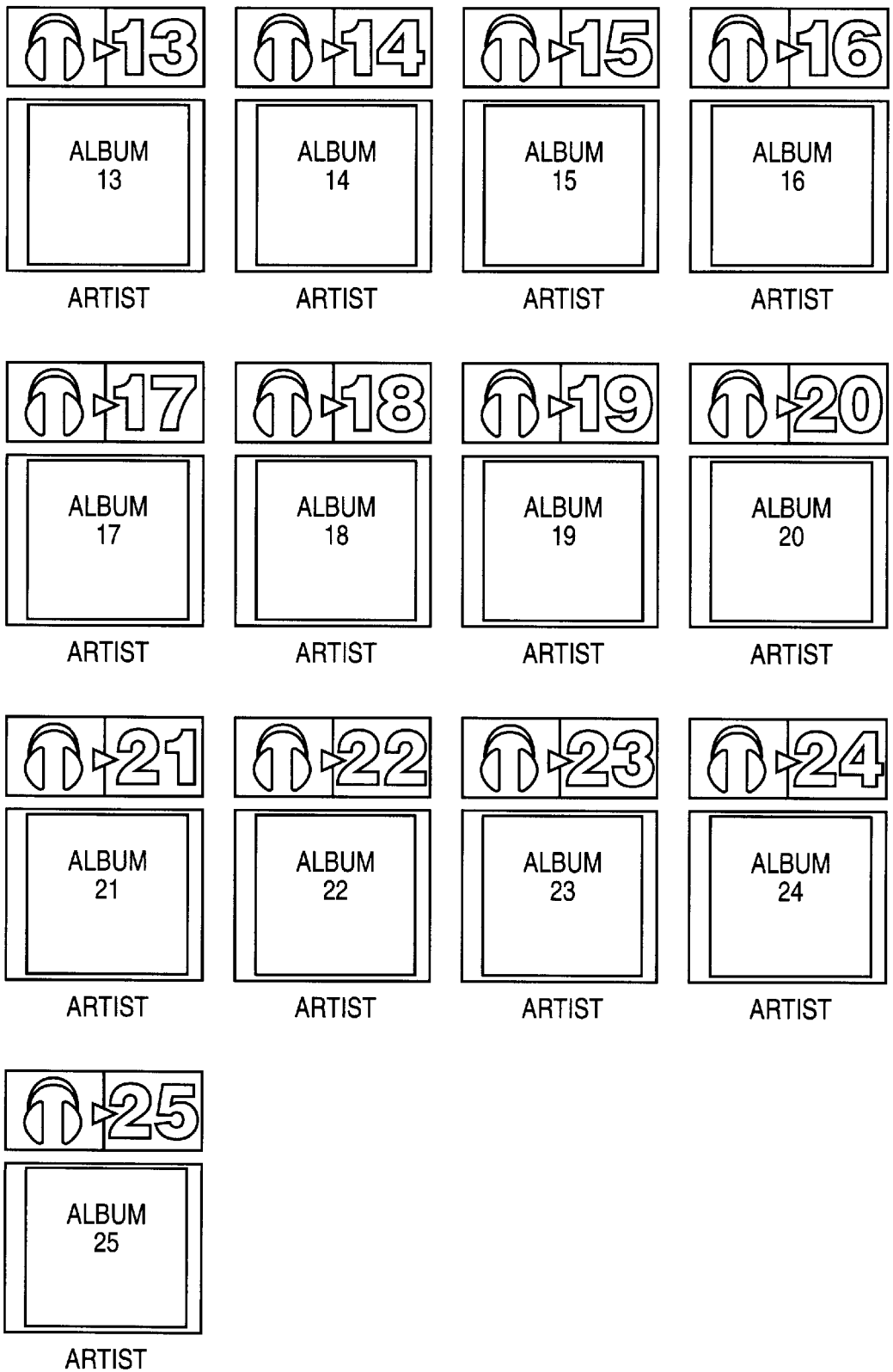

Referring back to FIG. 38, hot zone, 308 provides access to the "Top 25" albums or songs on a certain music chart. FIGS. 43–45 illustrate a sample Top 25 screen illustrating album covers of the top 25 albums.

Referring back to FIG. 38, hot zone 310 provides access to the "Merchandise" department providing merchandise which the web site user can purchase. Hot zone 312 provides access to the "Music Search" feature of the web site illustrated in FIGS. 46–50. This allows web site users to search for a particular musical work using a number of different formats.

Figure 46:
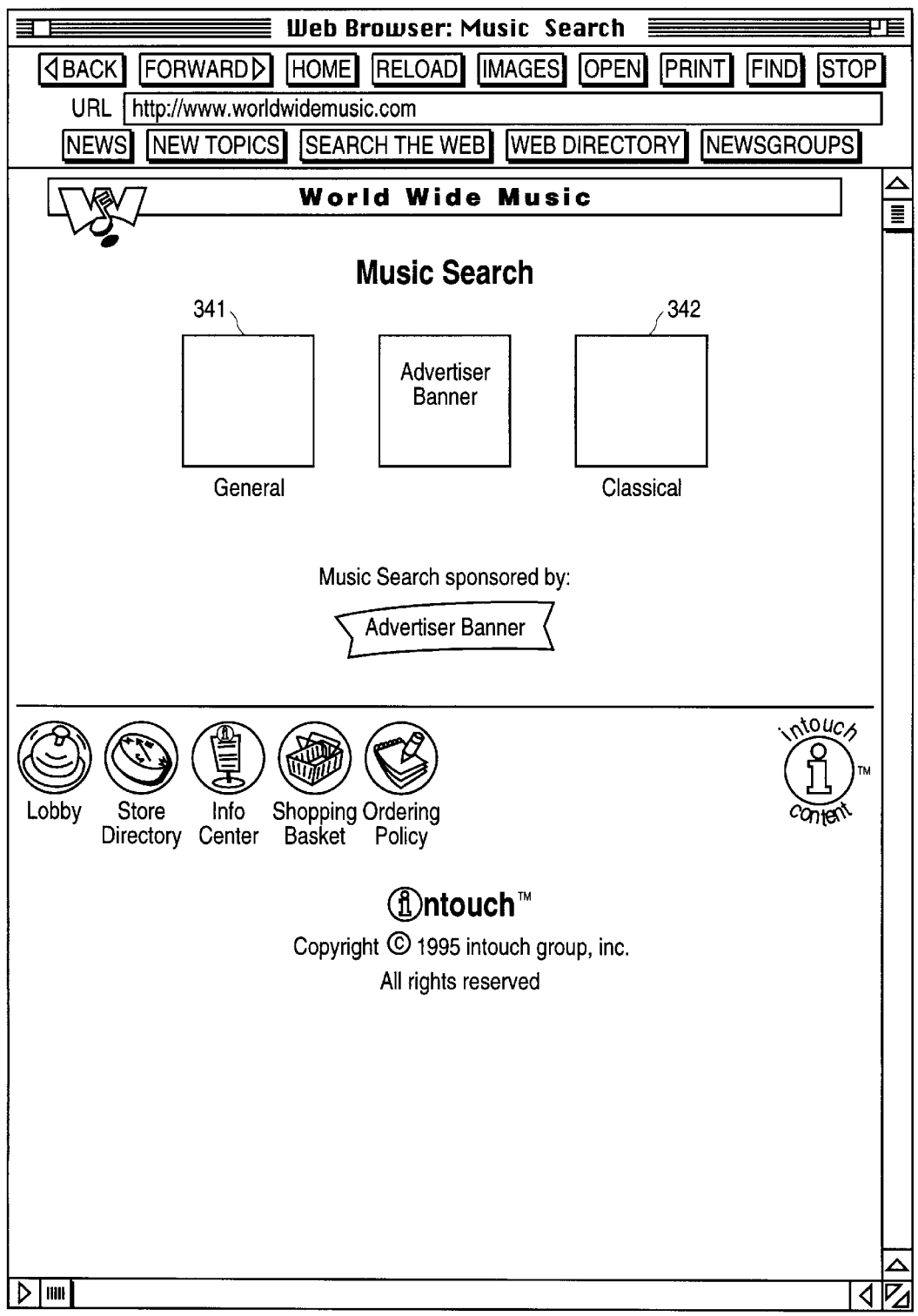
Figure 47:
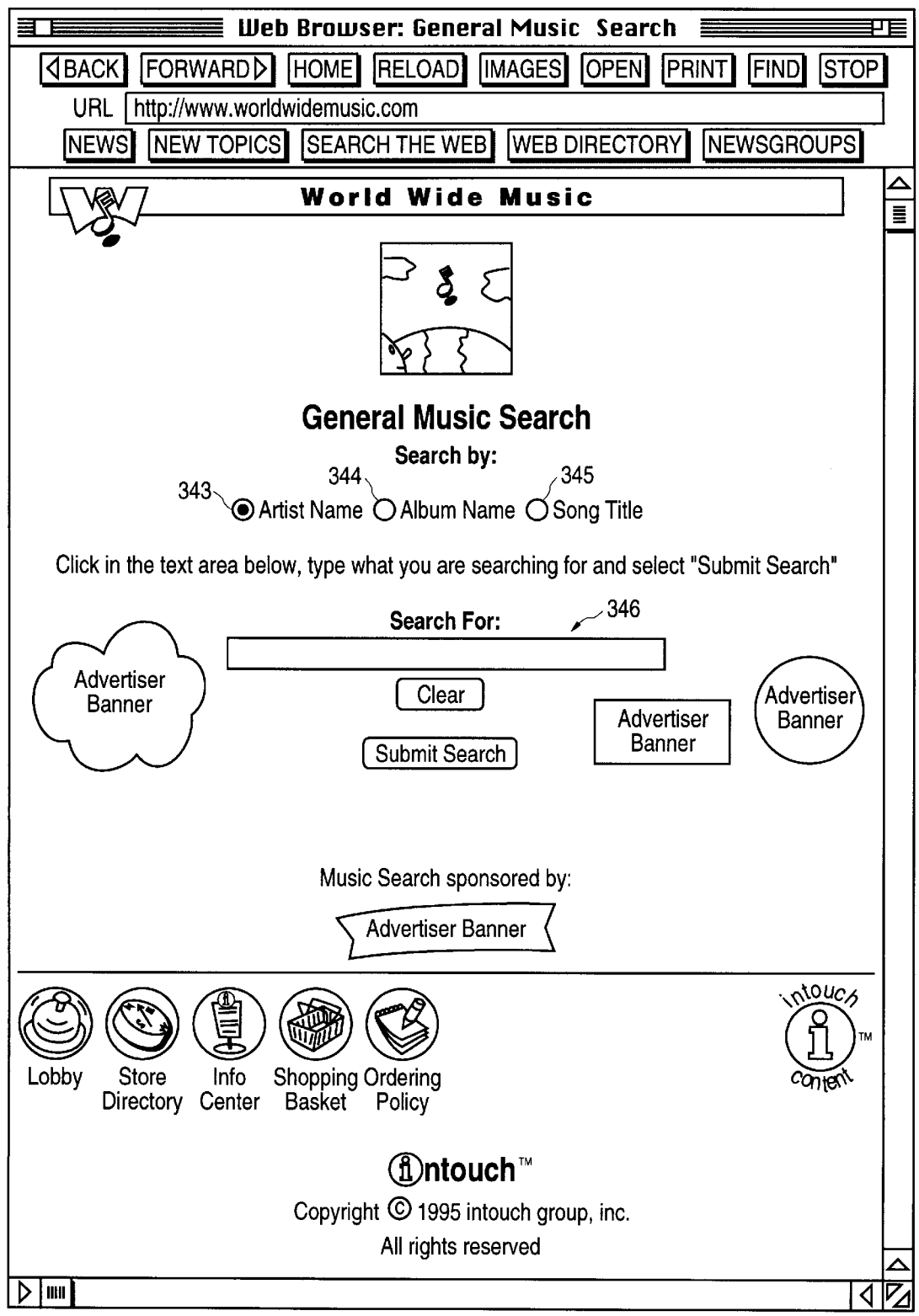

FIG. 46 illustrates the starting music search screen wherein a web site user is able to search the different categories generally or by a specific genre such as classical music. The web site user can select a general search (hot zone 341) which will take her to the general search screen illustrated in FIG. 47. Here a web site user can perform a key word search. For example, the web site user can select a search by artist name (hot zone 343), album name (hot zone 344) or song title (hot zone 345) and then enter the search terms in the "Search For" field 346.

It should be noted that, as described above for the kiosk-based network embodiment, once a particular musical piece (i.e. song or album) is selected, the proper data corresponding to that selection must be called from memory. Although these musical pieces can be identified by any identification scheme, the preferred embodiment incorporates the product code established by the manufacturer or distributor. This allows for convenient and efficient ordering of the musical pieces once a purchase order is submitted. Therefore, even though a user may input an album or song title, the web site will translate that request into the corresponding product code in order to call the appropriate data.

Figure 48:
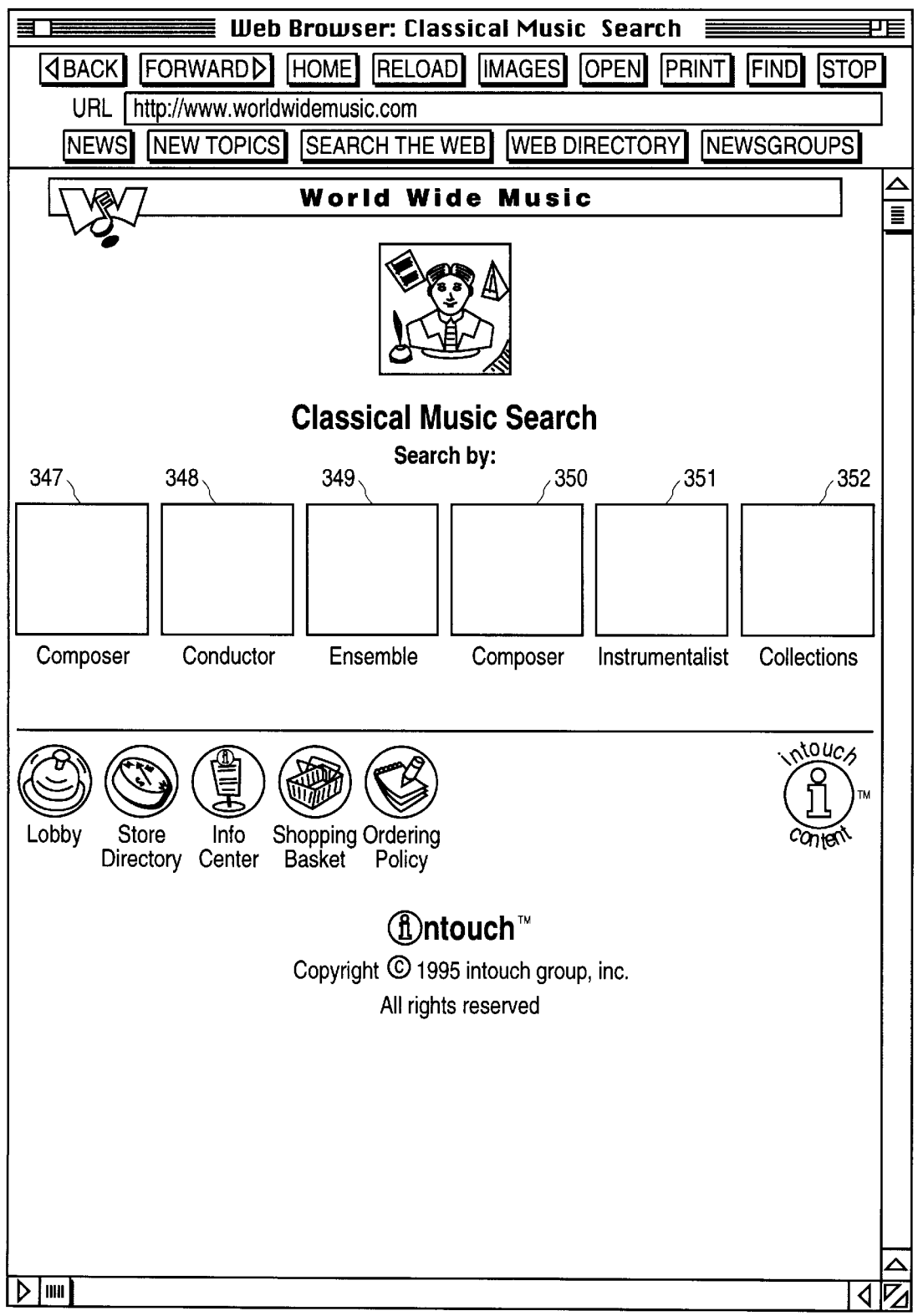
Figure 49:
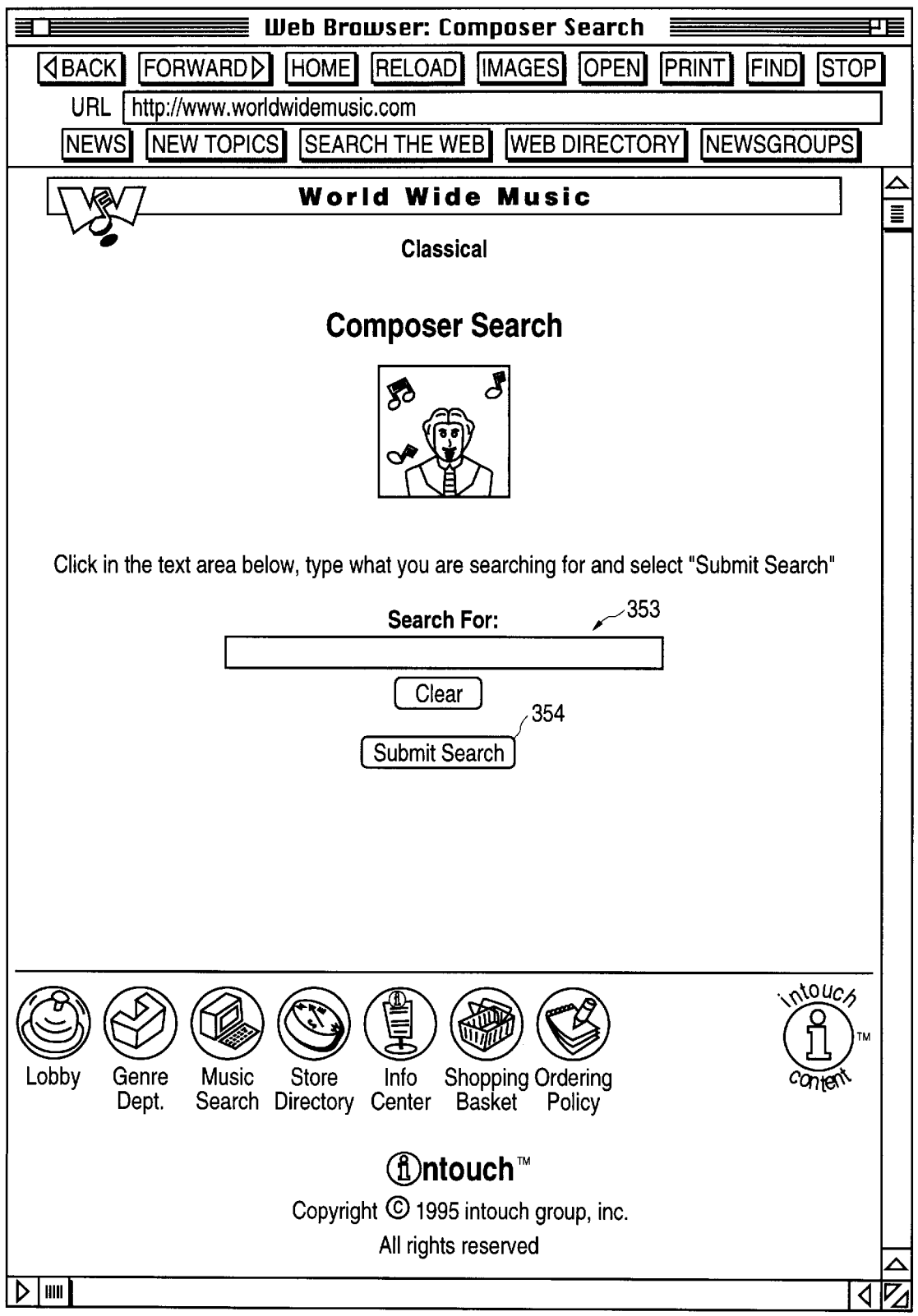

If a user decides to search the "Classical" genre, the classical search screen illustrated in FIG. 48 will be provided. This screen prompts the user to select particular search parameters. For example, the user can search by "Composer" (hot zone 347), "Conductor" (hot zone 348). "Ensemble" (hot zone 349), "Instrumentalist" (hot zone 350), "Vocalist" (hot zone 351) and "Collections" (hot zone 352). Once the user has selected a particular parameter (i.e. Composer), the corresponding search screen (i.e. see FIG. 49 for the Composer search screen) allows her to search by key word by entering the key terms in the "Search For" field 353 and selecting "Submit Search" (hot zone 354).

Figure 50:
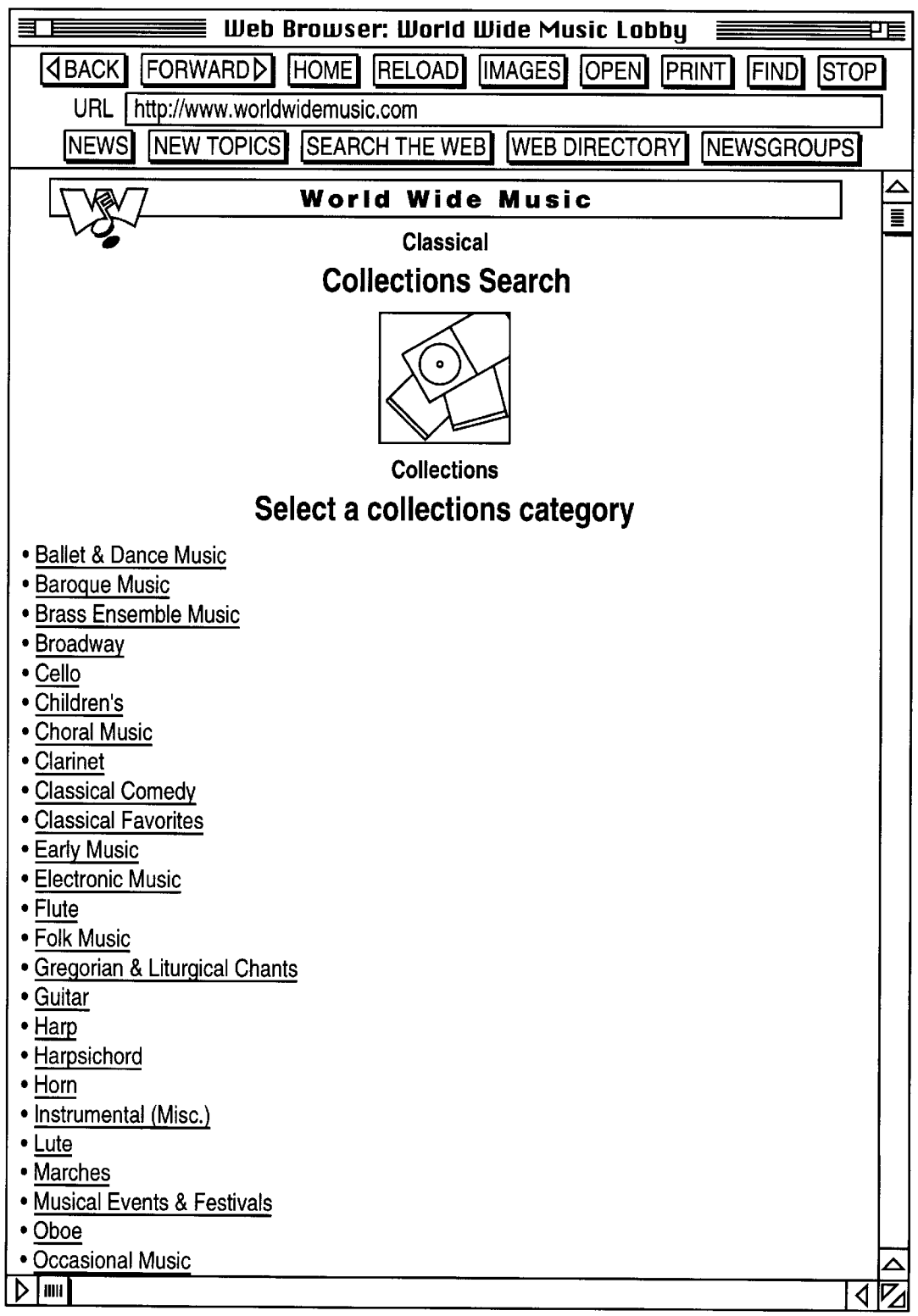

FIG. 50 illustrates the different collections categories within which the user can perform her search.

Referring back to FIG. 38, hot zone 330 allows a user to view particular magazines. FIG. 51 illustrates covers of magazines 550–552 (i.e., Virtual City and Wired) which can be viewed.

Figure 52:
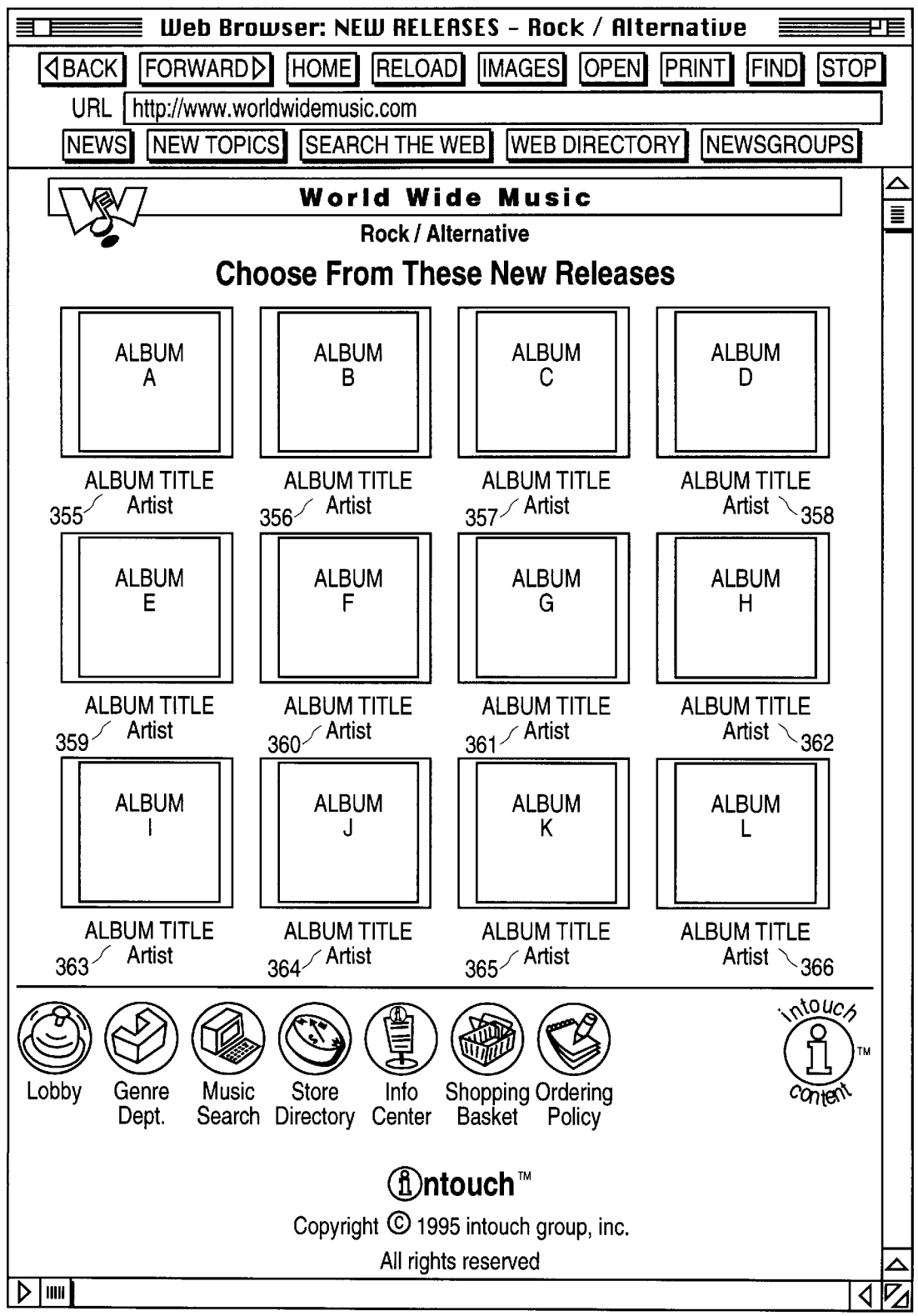

Referring back to FIG. 38, hot zone 316 allows a user to view new music releases. For example, FIG. 52 illustrates a sample new release screen for the rock/alternative genre. Of course, from this screen a user is able to click on any of the albums (hot zones 355–366) to view specific information about the particular album and to sample portions of selected tracks from that album.

Figure 53:
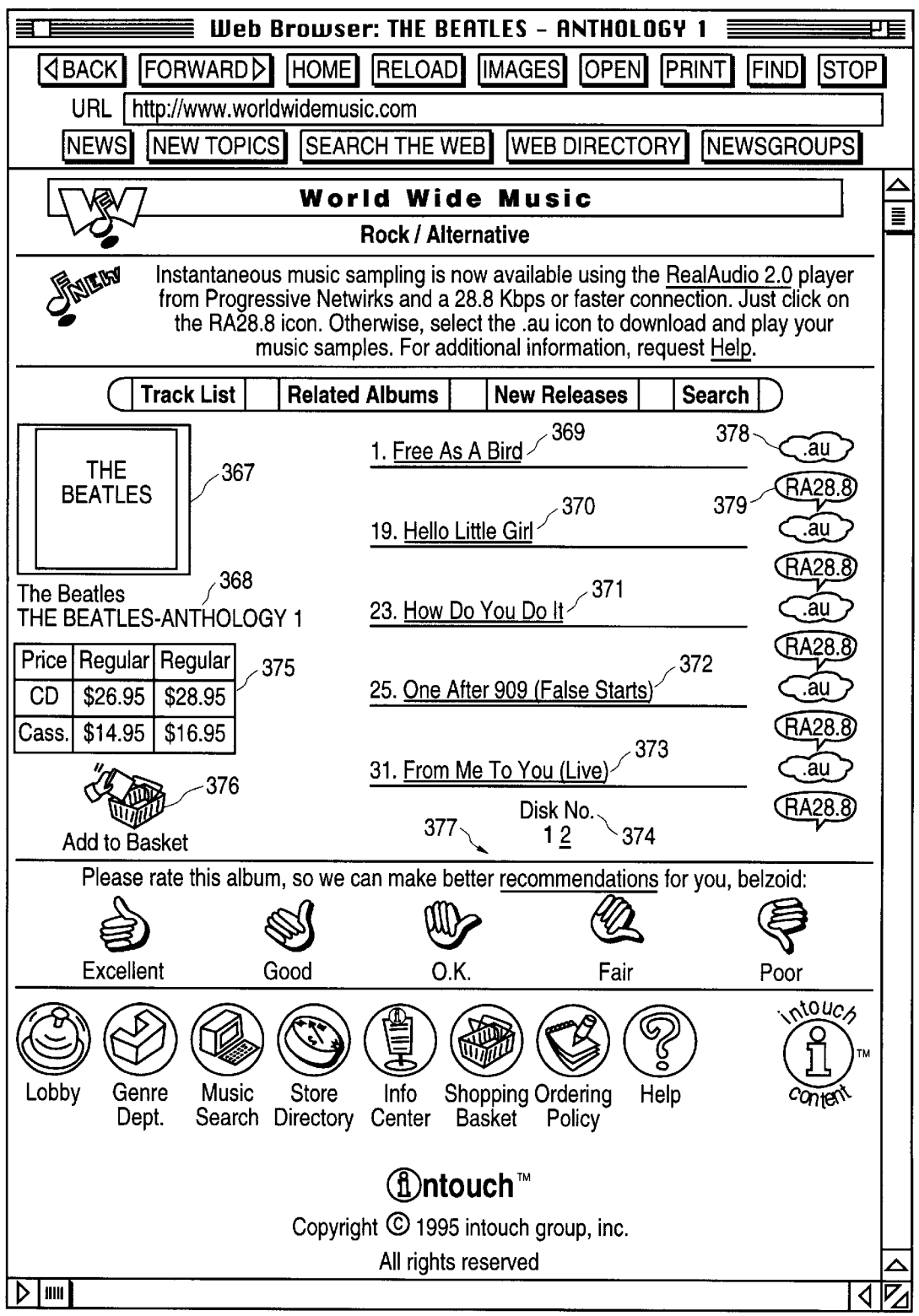

Referring back to FIG. 38, hot zones 320–326 illustrate featured albums which can be previewed by the user. For example, FIG. 53 illustrates an album preview screen for the "Beatles Anthology 1" album which provides an image of the album cover (hot zone 367), information on the album (hot zone 368), the price of the album (hot zone 375), selected tracks which may be sampled (hot zones 369–373), the disk being previewed (hot zone 374) and a request that the user rate the album (hot zone 377). Hot zone 376 allows the user to include this album in her shopping basket for use in purchasing selected items.

Next to each track pre-recorded track title are two hot zones 378 and 379. Hot zone 378 allows the user to download the music sample for playback by the user. Hot zone 379 allows the user to use the RealAudio 2.0 player to directly sample the musical recording.

Figure 54:
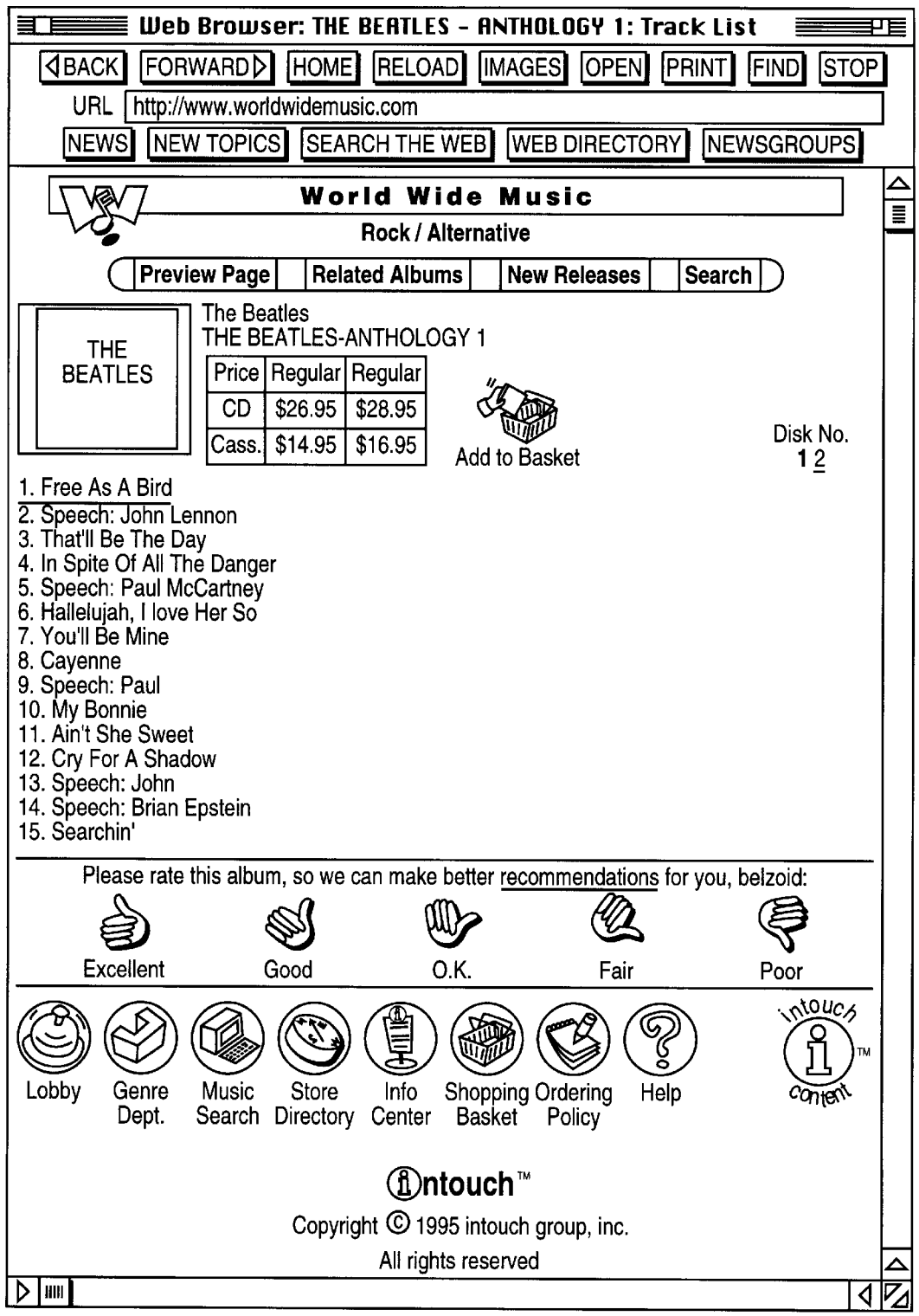
Figure 55:
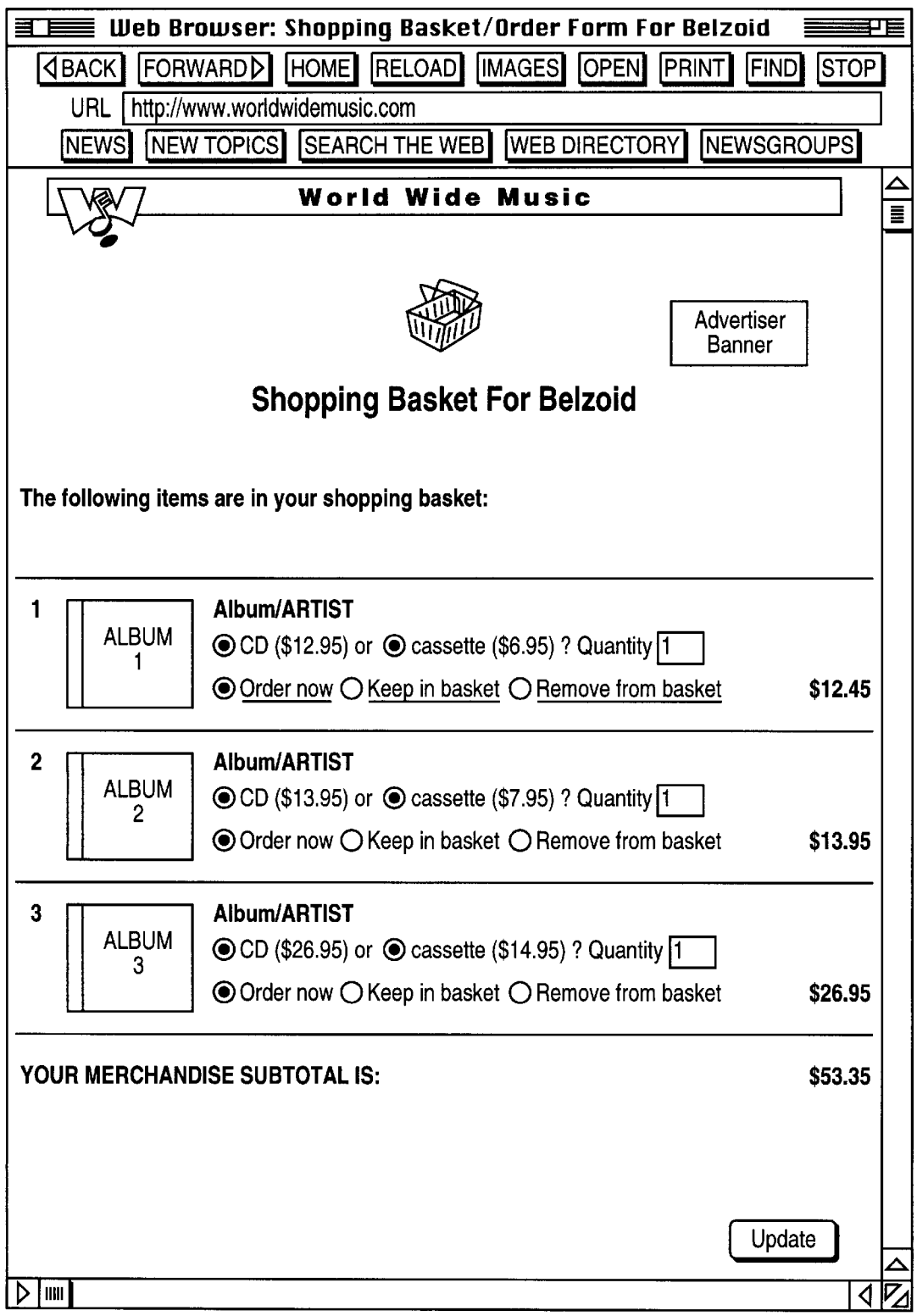

FIG. 54 illustrates the track list for the album illustrated in FIG. 53. This screen allows the user to view the entire track list for particular albums including those tracks that have not been sampled. It should be noted that illustrated here, those tracks that have been sampled are underlined.

Figure 57:
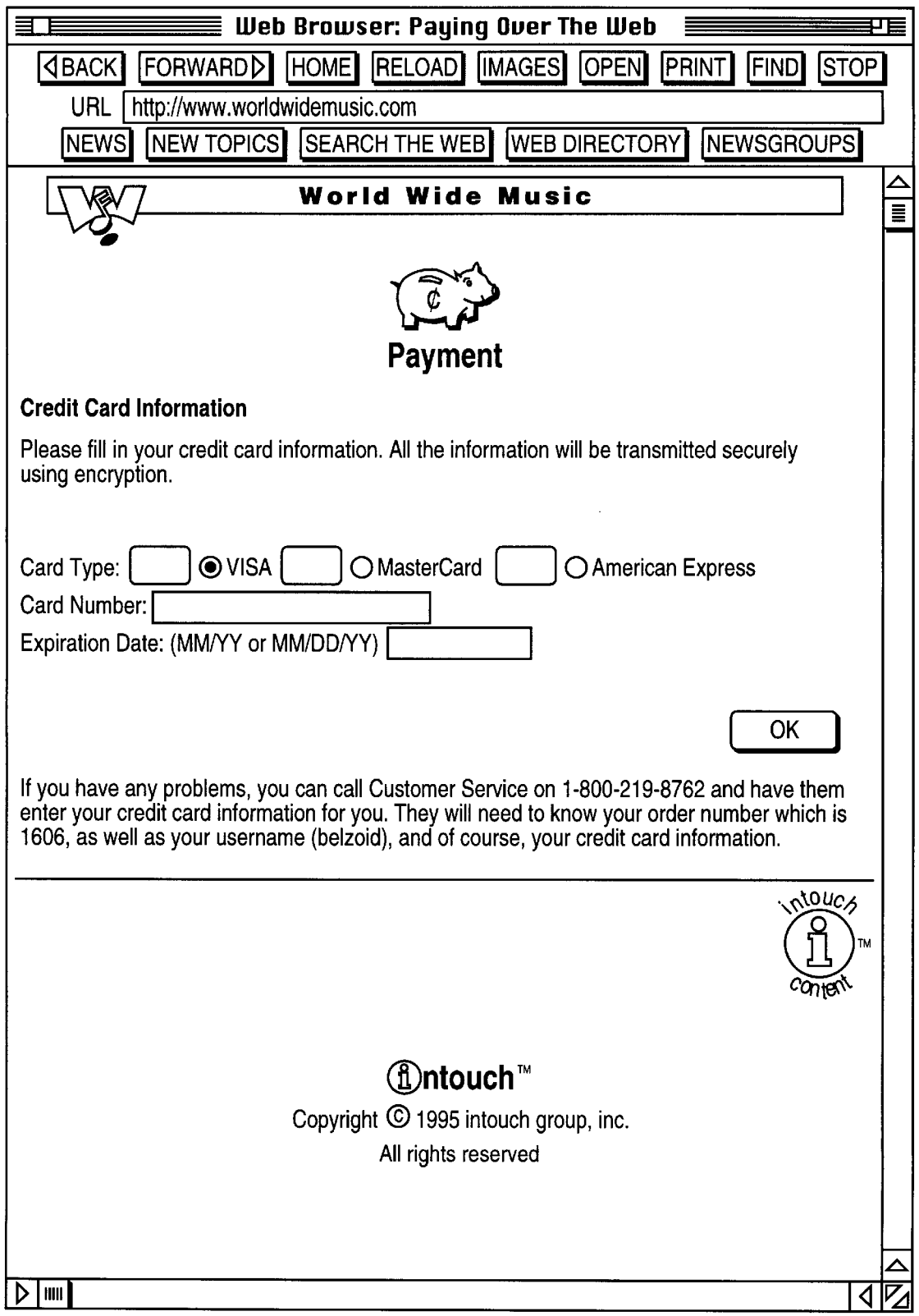

Referring back to FIG. 38, hot zone 314 allows a user to view her shopping basket which contains items he or she has selected for purchase. Selecting this hot zone takes the user to FIG. 55 which itemizes the contents of the user's shopping basket including a running total of the selected items. FIG. 56 illustrates an order form which prompts the user for information regarding where and how the selected items should be shipped. FIG. 57 allows the user to select a particular credit payment method (i.e., Visa or MasterCard).

Video Rental Embodiment

An alternate preferred embodiment contemplates the incorporation of the present invention with videos for aiding video renters. It is further contemplated that this alternate preferred embodiment incorporate both the network and stand-alone kiosk embodiments described above. In this embodiment, the system allows users to choose from a bank of different movie clips (i.e. movie trailers) in order to assist them in making their rental selections.

A common problem among many video renters is that they arc faced with a wide selection of movies about which they do not have much information. While they may be familiar with many of the big name movies, or recently released movies, some of the more obscure movies may be completely unknown. For this reason, many of these movies may go unrented because of fear by the customer of renting a movie they will not like. In fact, the only practical source of information the customer has access to regarding these movies is what is written on the video box cover. What is therefore needed is a method for providing customers with access to a preview of the movie so that they can make a more informed decision as to whether they will enjoy a particular movie.

The present invention satisfies this need by providing for a bank of movie previews and possible critical reviews that the customer can view in much the same manner as music recordings as discussed above. The customer can select a particular video box cover and access the point-of-preview web site in order to view a preview of the particular movie. By scanning the box cover (i.e. the box cover's bar code) or typing the movie title into the system, the customer can view a short preview (i.e. film trailer) of the movie. If the customer likes the preview, the system can also be programmed to provide the customer with other similar movie titles which may be of interest to the customer.

Alternatively, if a customer does not have a particular movie in mind, he or she may input movie categories such as "Action," "Drama" or "Comedy." This will allow the customer to narrow her selections to only those movies within a specific category. Further query limitations can include movies including particular actors, directors or producers. This allows customers to further narrow the focus of their search based upon the type of movie they may be interested in. Once the customer has narrowed her choices, he or she can preview the selected choices.

It should be noted that while the present invention has been described in detail by way of illustration and example for purposes of clarity of understanding, it will be understood by those skilled in the art that certain changes and modifications may be made to the above-described embodiments without departing from the spirit of the invention and scope of the appended claims.

What is claimed is:

1. A method for enabling a remote user to preview a portion of a pre-recorded music product from a network web site containing pre-selected portions of different pre-recorded music products, using a computer, a computer display and a telecommunications link between the remote user's computer and the network web site, the method comprising the steps of:

a) using the remote user's computer to establish a telecommunications link to the network web site wherein the network web site comprises (i) a central host server coupled to a communications network for retrieving and transmitting the pre-selected portion of the pre-recorded music product upon request by a remote user and (ii) a central storage device for storing pre-selected portions of a plurality of different pre-recorded music products;

b) transmitting user identification data from the remote user's computer to the central host server thereby allowing the central host server to identify and track the user's progress through the network web site;

c) choosing at least one pre-selected portion of the pre-recorded music products from the central host server;

d) receiving the chosen pre-selected portion of the pre-recorded products; and e) interactively previewing the received chosen pre-selected portion of the pre-recorded music product.

2. The method of claim 1 further comprising the step of rating the chosen pre-selected portion of the pre-recorded music products.

3. The method of claim 1 wherein the central memory device comprises a plurality of compact disc-read only memory (CD-ROMs).

4. The method of claim 1 wherein the central memory device comprises a RAID array drive.

5. A method for enabling a remote user to preview a portion of a pre-recorded music product from a network web site containing pre-selected portions of different pre-recorded music products, using a computer, a computer display and a telecommunications link between the remote user's computer and the network web site, the method comprising the steps of:

a) using the remote user's computer to establish a telecommunications link to the network web site wherein the network web site comprises (i) a central host server coupled to a communications network for retrieving and transmitting the pre-selected portion of the pre-recorded music product upon request by a remote user and (ii) a central storage device for storing pre-selected portions of a plurality of different pre-recorded music products;

b) transmitting user identification data from the remote user's computer to the central host server thereby allowing the central host server to identify and track the user's progress through the network web site;

c) choosing at least one pre-selected portion of the pre-recorded music products wherein the portion of the pre-recorded product is identified by a product code;

d) receiving the chosen pre-selected portion of the pre-recorded music products; and e) interactively previewing the received chosen pre-selected portion of the pre-recorded music product.

6. A network web site for allowing a remote user to preview a pre-selected portion of a pre-recorded music product, using a computer, a computer display and a telecommunications link between the remote user's computer and the network web site, the network web site comprising:

a) a central host server coupled to a communications network for retrieving and transmitting the pre-selected portion of the pre-recorded music product upon request by the remote user;

b) a central storage device for storing pre-selected portions of a plurality of different pre-recorded music products, the central storage device coupled to the central host server;

c) identification (ID) means for recognizing a user ID which specifically identifies the user to the central host server; and d) control means for providing the user with interactive control over the preview of the pre-selected portion of the pre-recorded music products.

7. The network web site of claim 6 wherein the portions of the plurality of different pre-selected pre-recorded music products are identified and called from the central storage device using unique product codes.

8. The network web site of claim 6 further comprising purchasing means for allowing the user to place an order for purchasing at least one music product.

9. The network web site of claim 6 further comprising a listing means for providing the user with dynamic lists of the pre-selected portions of the plurality of different pre-recorded music products that have been previewed the most.

10. The network web site of claim 6 further comprising a recording means for providing the user with a record of previous previews by the user.

11. The network web site of claim 6 further comprising a ratings means for prompting the user for a rating of a particular one of the pre-selected portions of the plurality of different pre-recorded music products and storing the user's rating.

12. The network web site of claim 11 further comprising a first market research means for correlating the user rating with the user ID, for compiling market research data.

13. The network web site of claim 6 further comprising a second market research means for correlating the user ID with all previews performed by the user, for compiling market research data.

14. A network web site for allowing a remote user to preview a pre-selected portion of a pre-recorded music product, using a computer, a computer display and a telecommunications link between the remote user's computer and the network web site, the network web site comprising:

a) a central host server coupled to a communications network for retrieving and transmitting the pre-selected portion of the pre-recorded music product upon request by a remote user;

b) a central storage device for storing pre-selected portions of a plurality of different pre-recorded music products, the central storage device coupled to the central host server;

c) identification (ID) means for recognizing a user ID which specifically identifies the user to the central host server;

d) control means for providing the user with interactive control over preview of the pre-selected portion of the pre-recorded music products; and e) means coupled to the central host server for collecting demographic information regarding the user.

15. The network web site of claim 14 further comprising a ratings means for prompting the user for a user rating of a particular one of the pre-selected portions of the plurality of different pre-recorded music products and storing the rating.

16. The network web site of claim 15 further comprising first market research means for correlating the user rating with the user ID, for compiling market research data.

17. The network web site of claim 14 further comprising a second market research means for correlating the user ID with all previews performed by the user, for compiling market research data.

18. The network web site of claim 14 wherein the demographic information is selected from the group of information types consisting of age, sex, income, ethnicity, education level, marital status, hobbies, and occupation.

* * * * *